United States Patent
Bartlett et al.

(10) Patent No.: US 10,734,703 B2
(45) Date of Patent: Aug. 4, 2020

(54) SYSTEM AND METHOD FOR INTEGRATING AND INTERNET OF THINGS (IOT) RADIO MODULE IN AN APPLIANCE

(71) Applicant: AFERO, INC., Los Altos, CA (US)

(72) Inventors: Scott Bartlett, Oakland, CA (US); Doug Kough, San Jose, CA (US); Joe Britt, Los Altos, CA (US); Nam La, San Jose, CA (US)

(73) Assignee: Afero, Inc., Los Altos, CA (US)

( * ) Notice: Subject to any disclaimer, the term of this patent is extended or adjusted under 35 U.S.C. 154(b) by 293 days.

(21) Appl. No.: 15/894,594

(22) Filed: Feb. 12, 2018

(65) Prior Publication Data

US 2019/0252759 A1 Aug. 15, 2019

(51) Int. Cl.
*H01Q 1/22* (2006.01)
*H01Q 1/12* (2006.01)
*H01Q 9/04* (2006.01)

(52) U.S. Cl.
CPC .......... *H01Q 1/225* (2013.01); *H01Q 1/1207* (2013.01); *H01Q 9/0407* (2013.01); *H01Q 1/2291* (2013.01)

(58) Field of Classification Search
CPC .... H01Q 1/1207; H01Q 1/225; H01Q 1/2291; H01Q 1/44; H01Q 9/0407; H01Q 9/0421; H04W 4/00; H04W 4/70; H04W 88/00
USPC .................. 702/62, 122, 130, 188; 342/458; 455/420
See application file for complete search history.

(56) References Cited

U.S. PATENT DOCUMENTS

| | | | |
|---|---|---|---|
| 8,526,935 B2* | 9/2013 | Besore | H01Q 1/2233 455/420 |
| 2012/0169543 A1* | 7/2012 | Sharma | H01Q 9/0421 342/458 |
| 2017/0063566 A1* | 3/2017 | Seminario | H04L 12/2816 |
| 2018/0166789 A1* | 6/2018 | Galla | H01Q 1/246 |
| 2018/0199386 A1* | 7/2018 | Yuan | H04W 76/10 |
| 2018/0261566 A1* | 9/2018 | Babcock | H01L 23/66 |

* cited by examiner

*Primary Examiner* — John H Le
(74) *Attorney, Agent, or Firm* — Nicholson De Vos Webster & Elliott LLP

(57) ABSTRACT

An apparatus and method are described for integration of an RF antenna in an appliance. For example, one embodiment of an apparatus includes: a dielectric having a specified length and width defining an area; a ground plane made of conductive material directly adjacent to the dielectric, the ground plane formed from one or more components of a handle or a door of a heating device; an antenna element made of conductive material forming a plane adjacent to the dielectric and parallel to the ground plane, the antenna having a first dimension defining a first end and a second end, the first end electrically coupled to the ground plane; and an antenna feed electrically coupled to the antenna element at specified distance from the first end, the distance from the first end selected in accordance with a wavelength of a radio frequency (RF) signal to be transmitted and/or received by the antenna.

27 Claims, 49 Drawing Sheets

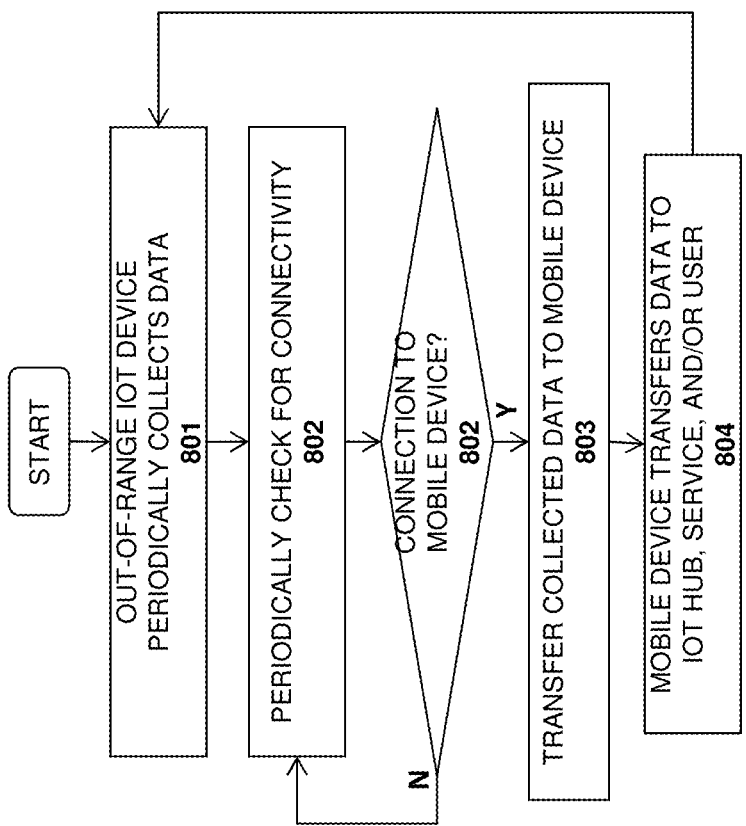

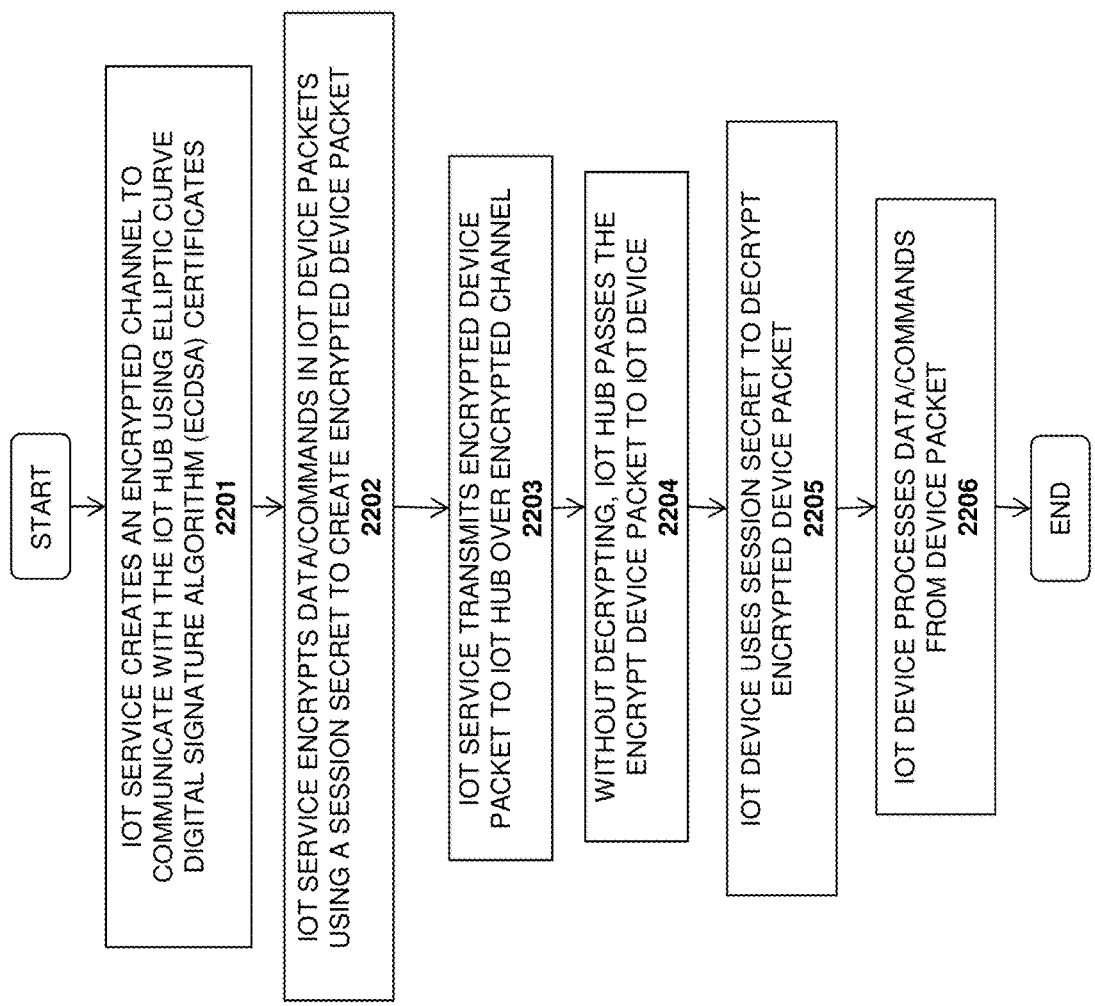

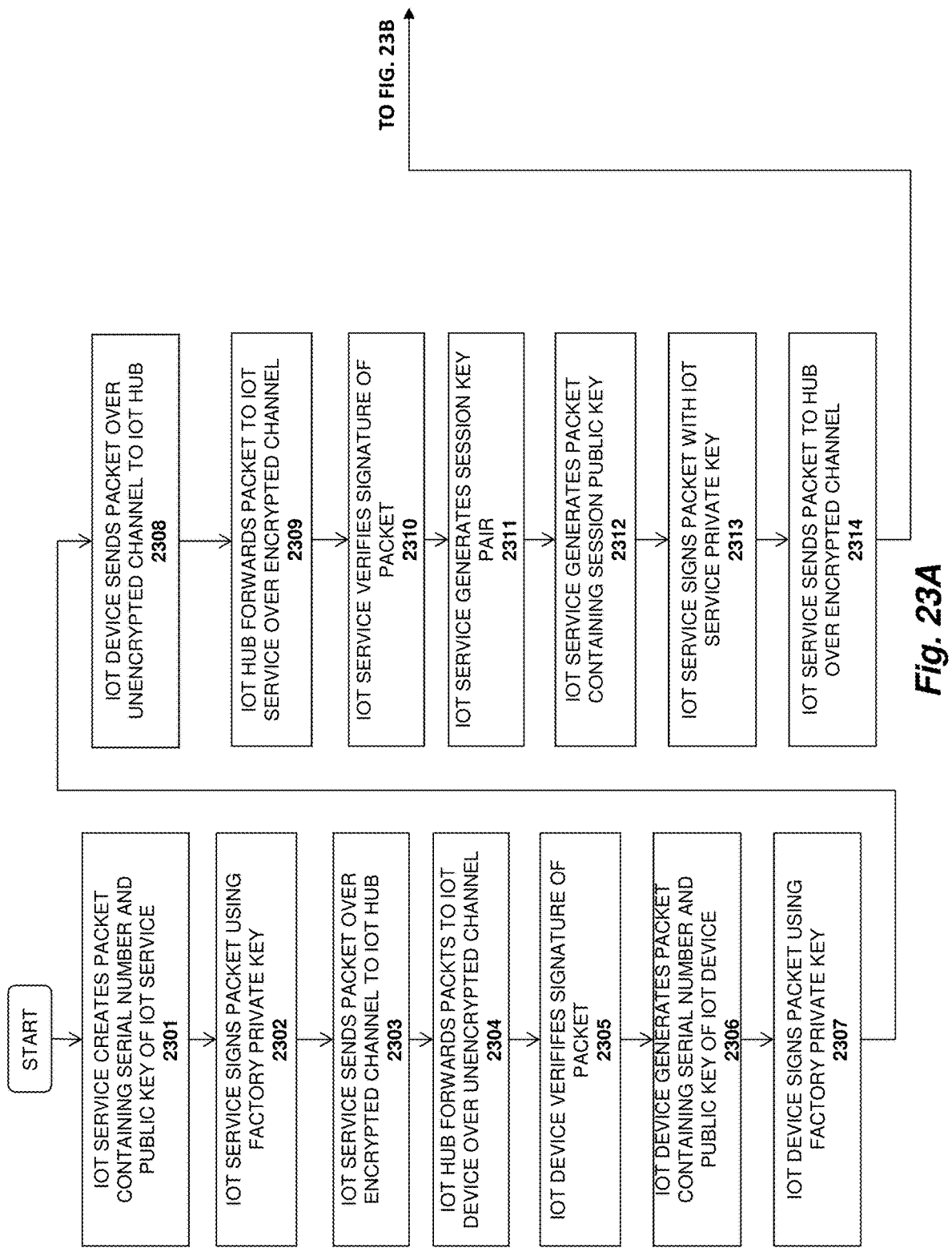

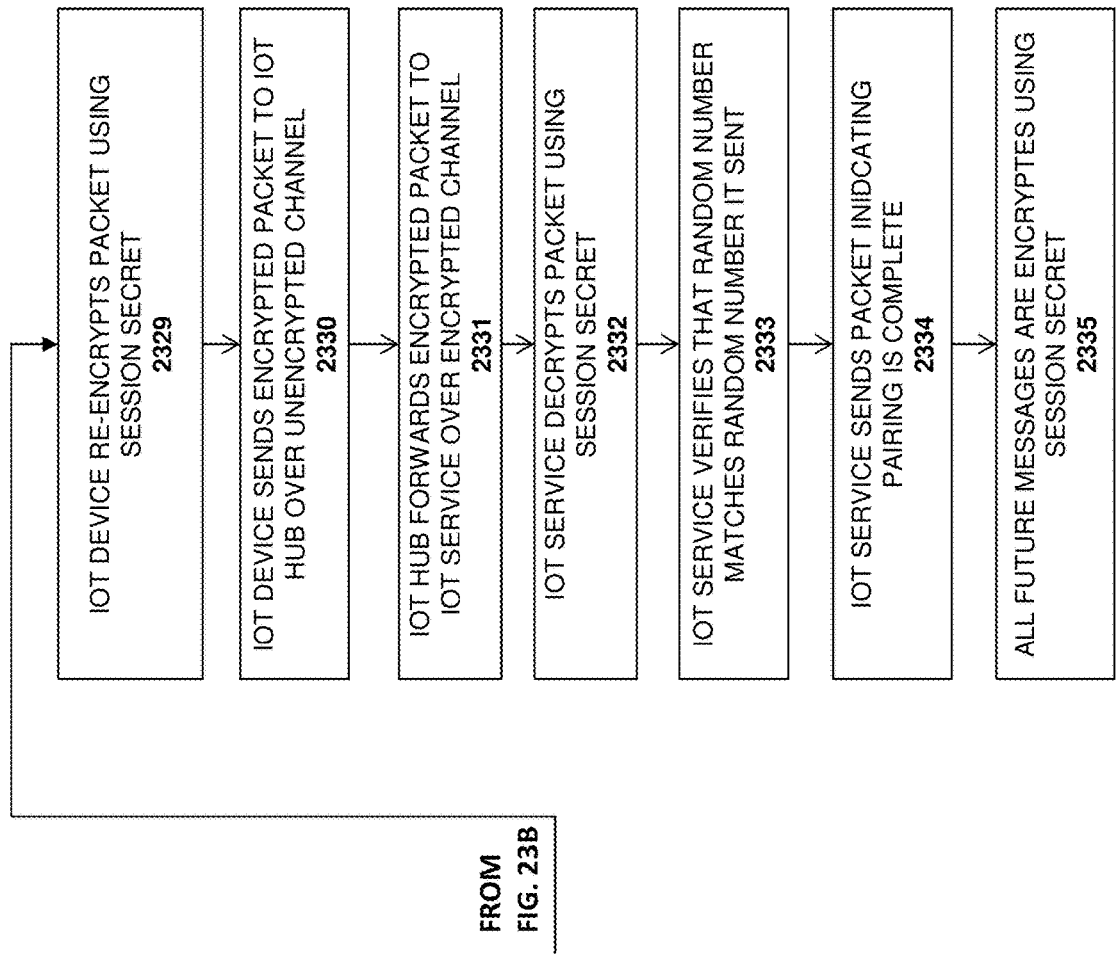

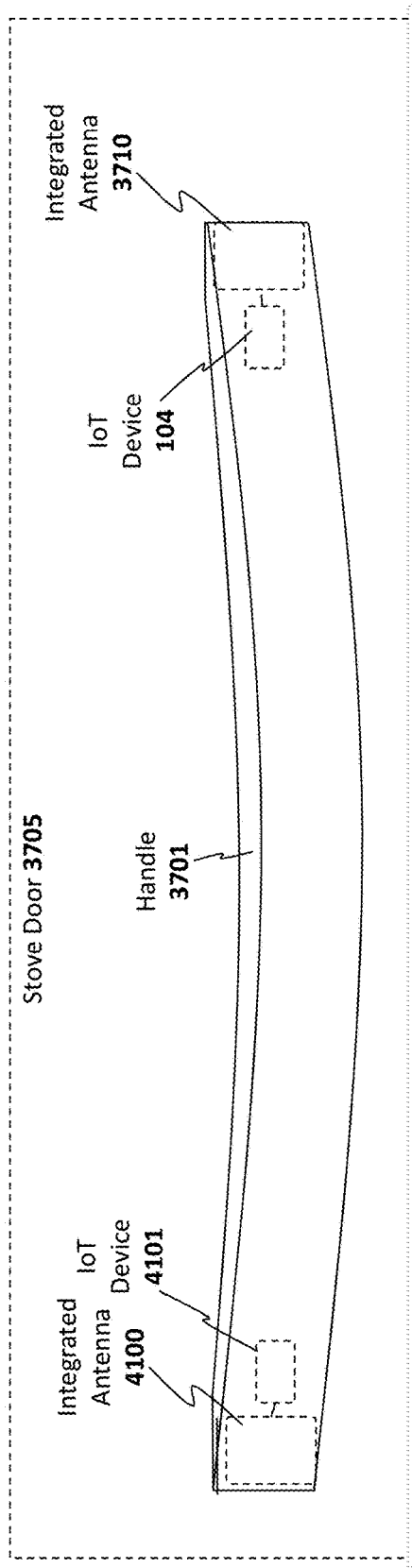
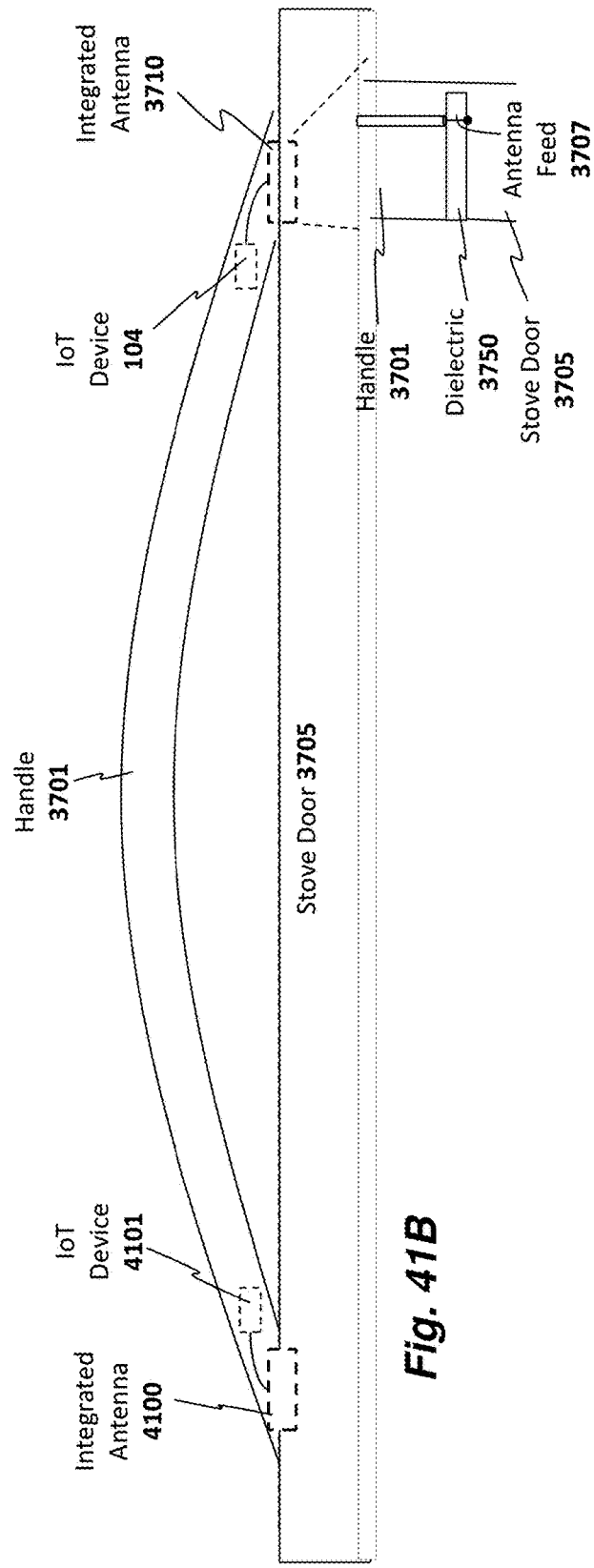
Fig. 41A
Fig. 41B

SYSTEM AND METHOD FOR INTEGRATING AND INTERNET OF THINGS (IOT) RADIO MODULE IN AN APPLIANCE

BACKGROUND

Field of the Invention

This invention relates generally to the field of computer systems. More particularly, the invention relates to a system and method for improving performance and managing temperature of a radio module used in a device.

Description of the Related Art

Appliances are typically large, metal boxes that present challenges for wireless connectivity within the radio frequency (RF) band because they do not provide clean places to site an antenna. Additionally, appliances such as ovens or ranges have thermal issues because their primary function of cooking food means that the ambient temperature inside the appliance enclosure may be greater than 85° C. and in some cases greater than 100° C. These temperatures present challenges for electronics and, in particular, for active electronics such as radio modules and micro-controller (MCUs) units. These applications typically require the use of components with extended industrial temperature ratings, raising the cost and limiting the choices available to engineers. Crystal accuracy is also a significant problem as the wide temperature swings require either expensive TCXOs (Temperature Compensated Crystal Oscillators) or XTALs (crystals) with tight manufacturing tolerances with a more limited lifetime.

Antenna designs are also complicated by the fact that wide temperature swings cause changes in tuning and performance, requiring the use of specialized materials in order to mitigate the effects of wide temperature extremes on antenna performance.

Thus, the wide temperature ranges seen in certain appliance applications present severe challenges for electronics, requiring the use of exotic and expensive materials, compromises in performance, and/or reductions in product lifetimes.

BRIEF DESCRIPTION OF THE DRAWINGS

A better understanding of the present invention can be obtained from the following detailed description in conjunction with the following drawings, in which:

FIG. 8 illustrates a method in accordance with one embodiment of the invention;

FIG. 22 illustrates a method in accordance with one embodiment of the invention; and FIGS. 23A-C illustrate a method for secure pairing in accordance with one embodiment of the invention

FIGS. 41A-B illustrate another embodiment with a second integrated antenna.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
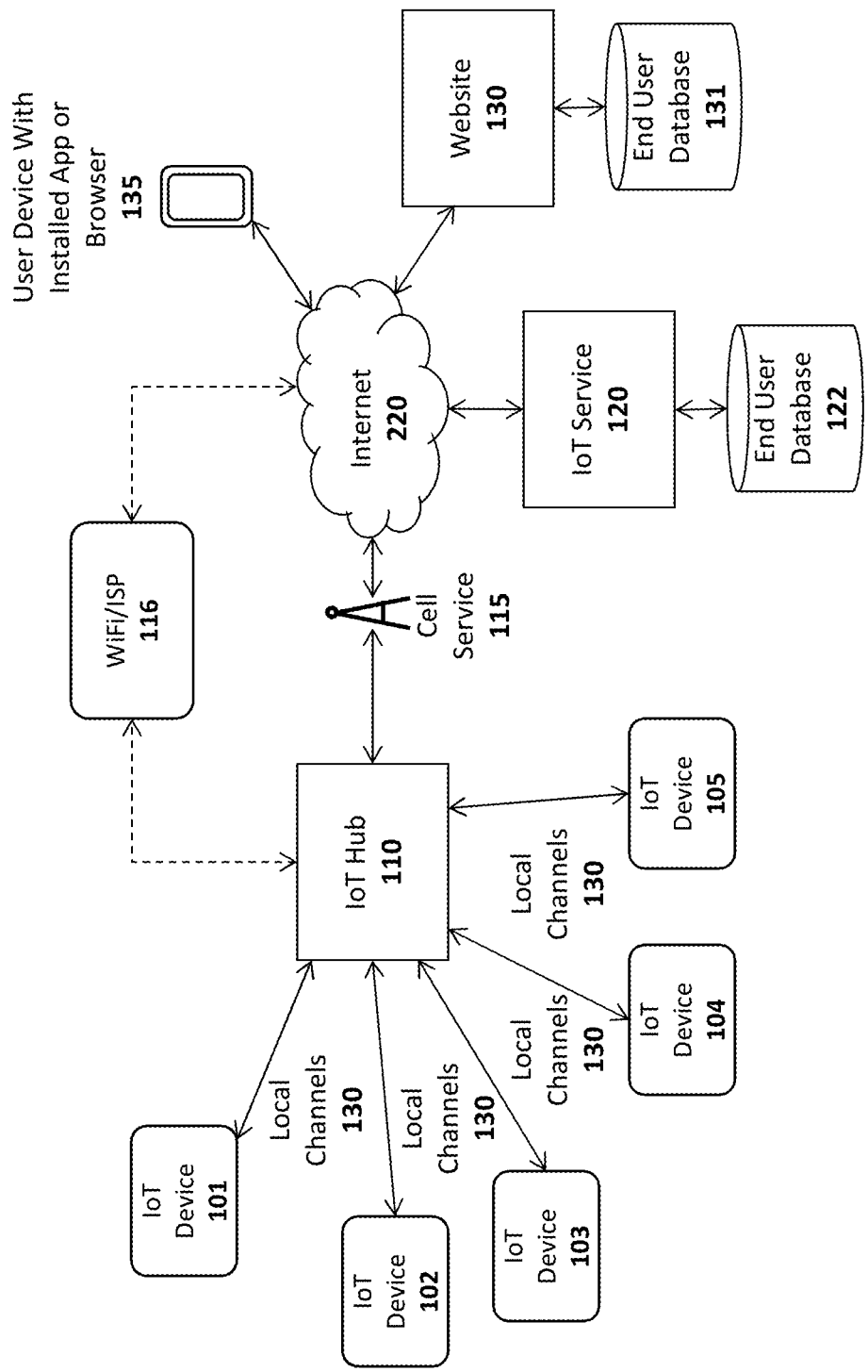
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectore, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
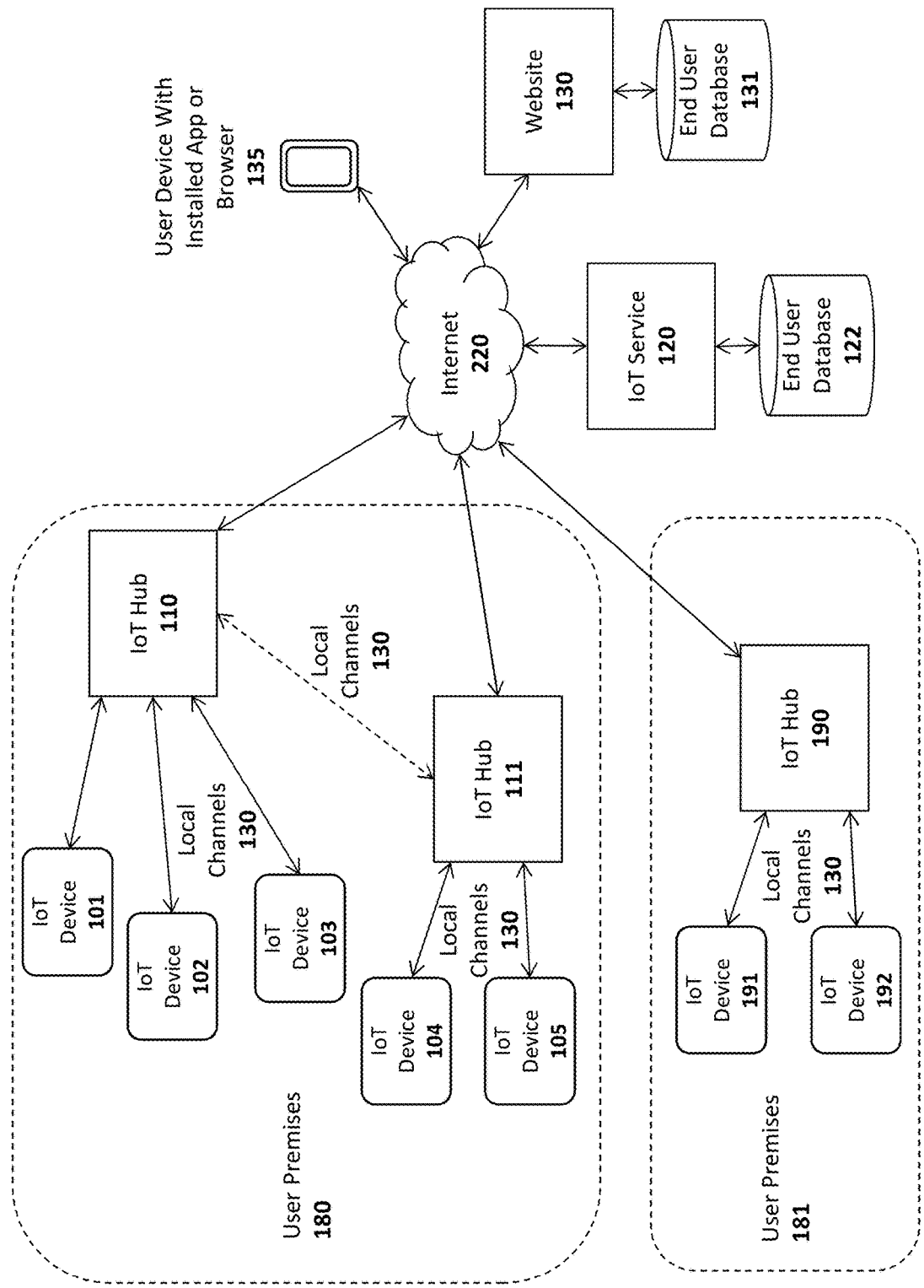

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
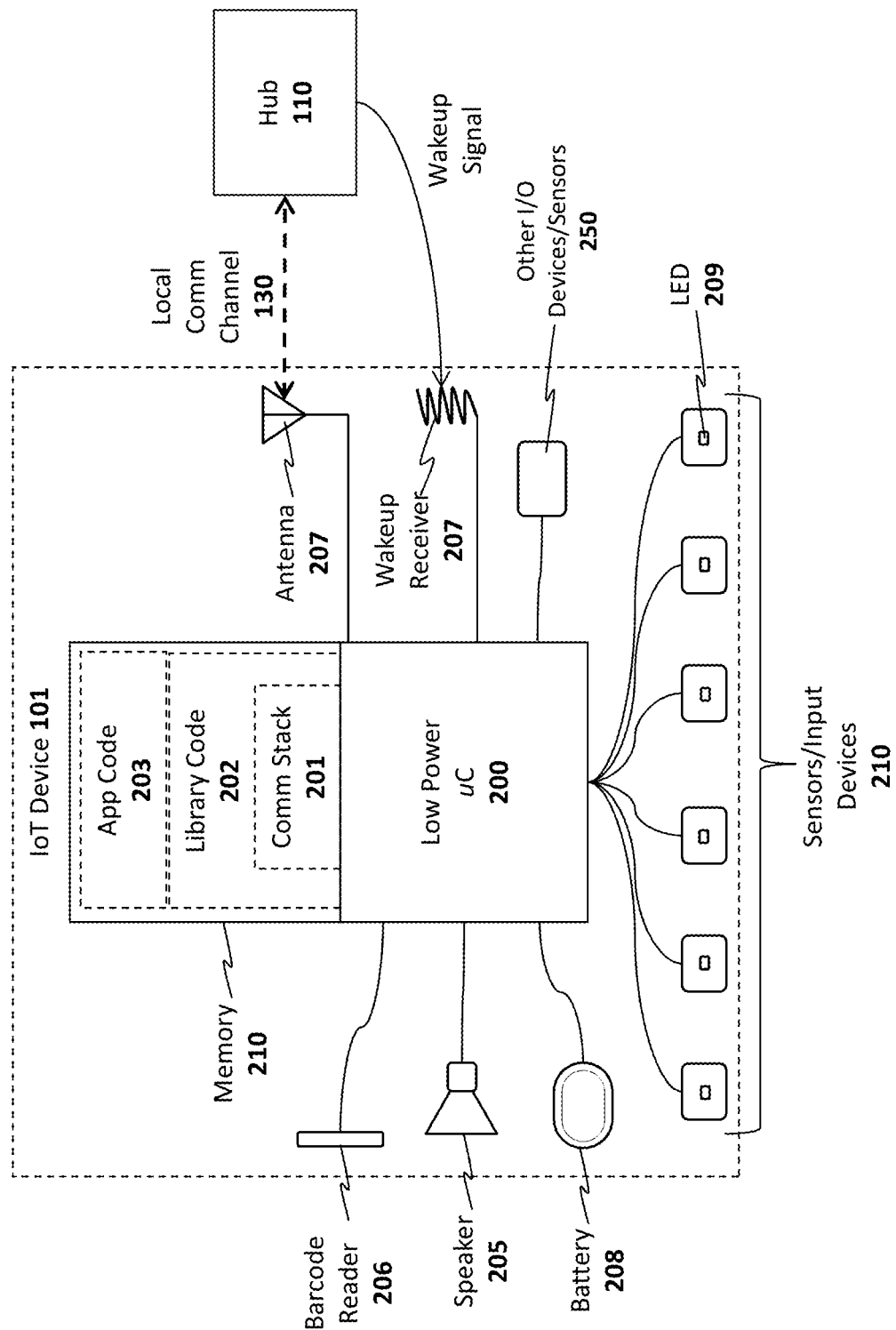
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
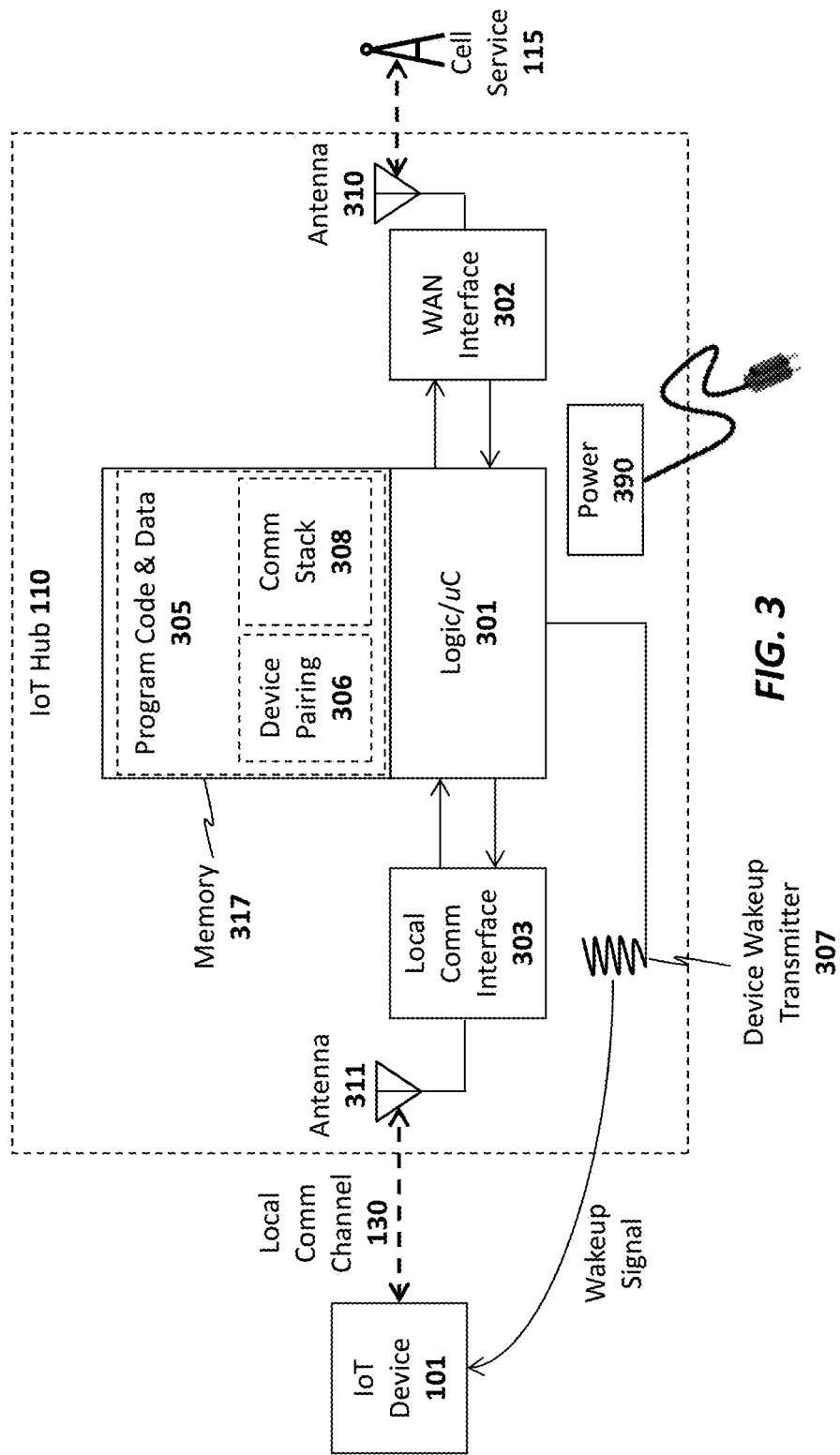
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
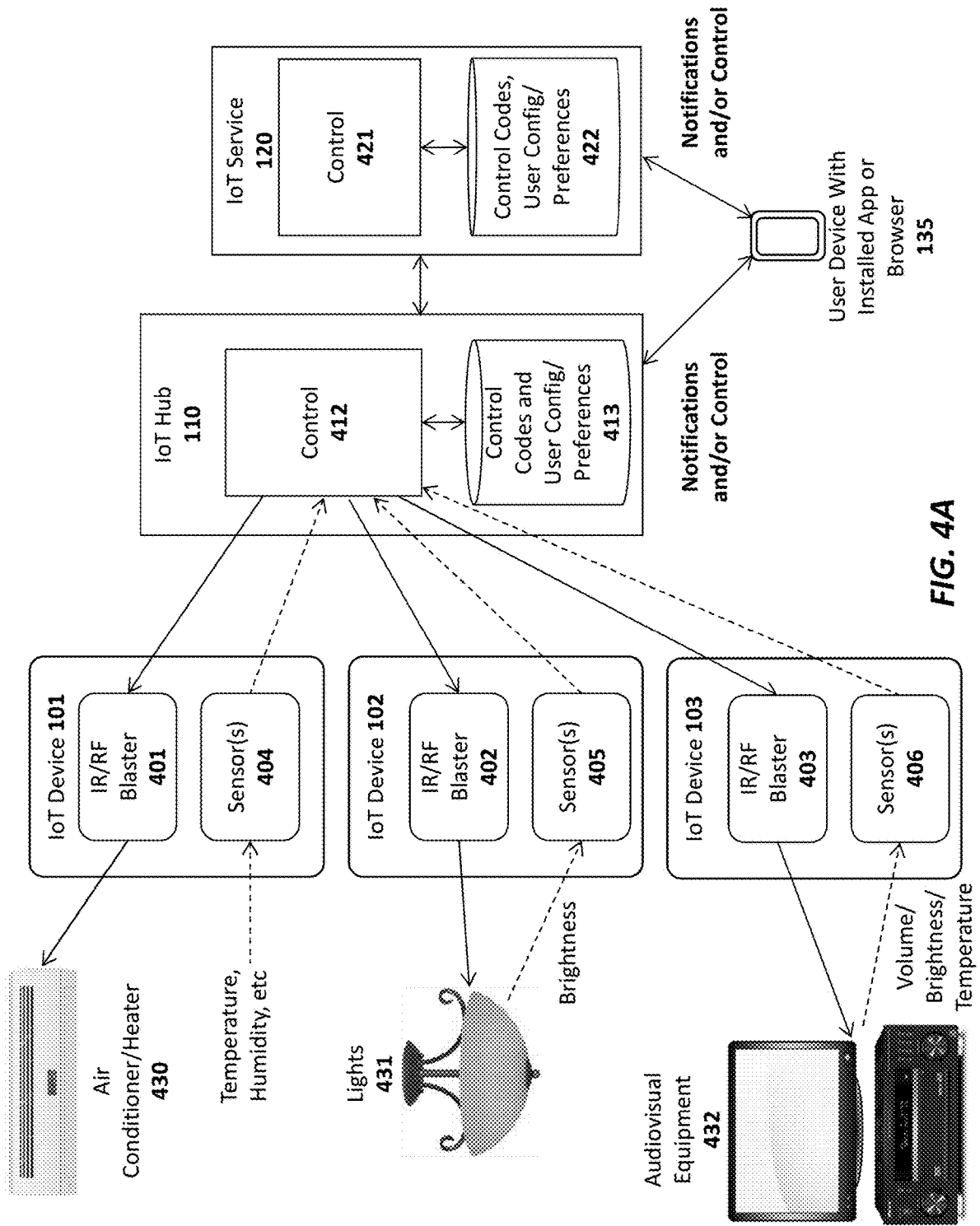
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
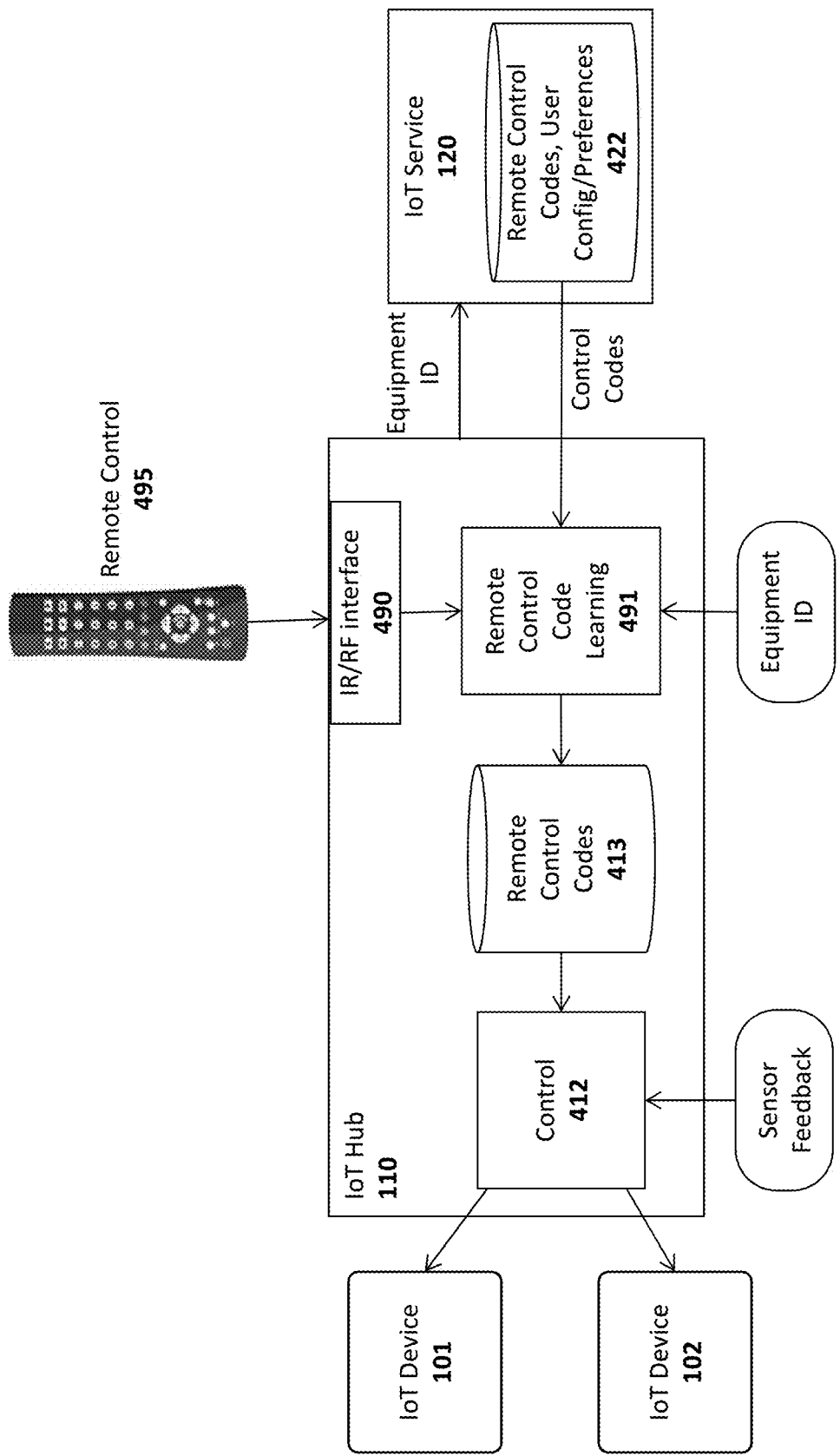

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
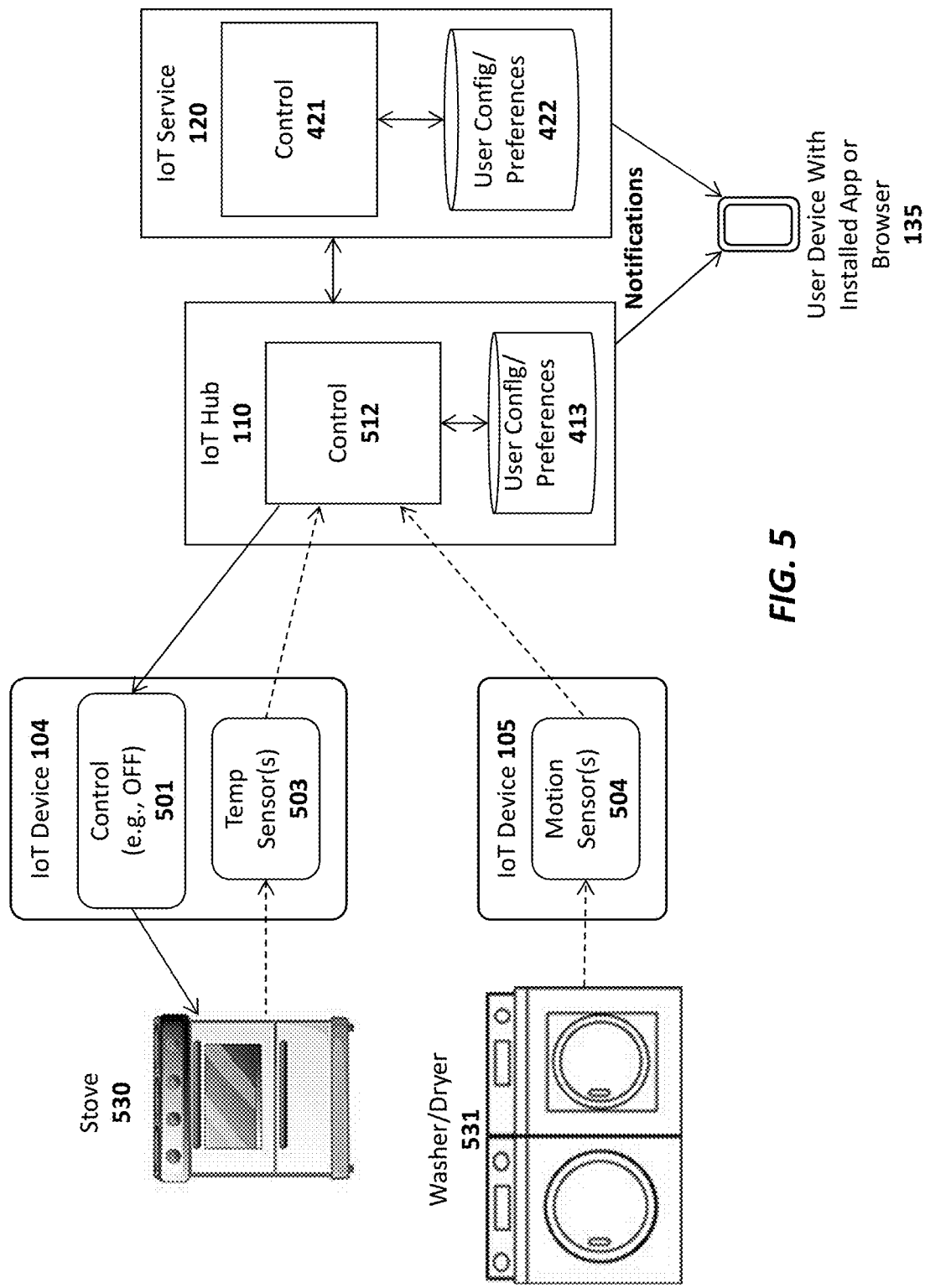
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Apparatus and Method for Communicating Data Through an Intermediary Device

As mentioned above, because the wireless technologies used to interconnect IoT devices such as Bluetooth LE are generally short range technologies, if the hub for an IoT implementation is outside the range of an IoT device, the IoT device will not be able to transmit data to the IoT hub (and vice versa).

To address this deficiency, one embodiment of the invention provides a mechanism for an IoT device which is outside of the wireless range of the IoT hub to periodically connect with one or more mobile devices when the mobile devices are within range. Once connected, the IoT device can transmit any data which needs to be provided to the IoT hub to the mobile device which then forwards the data to the IoT hub.

Figure 6:
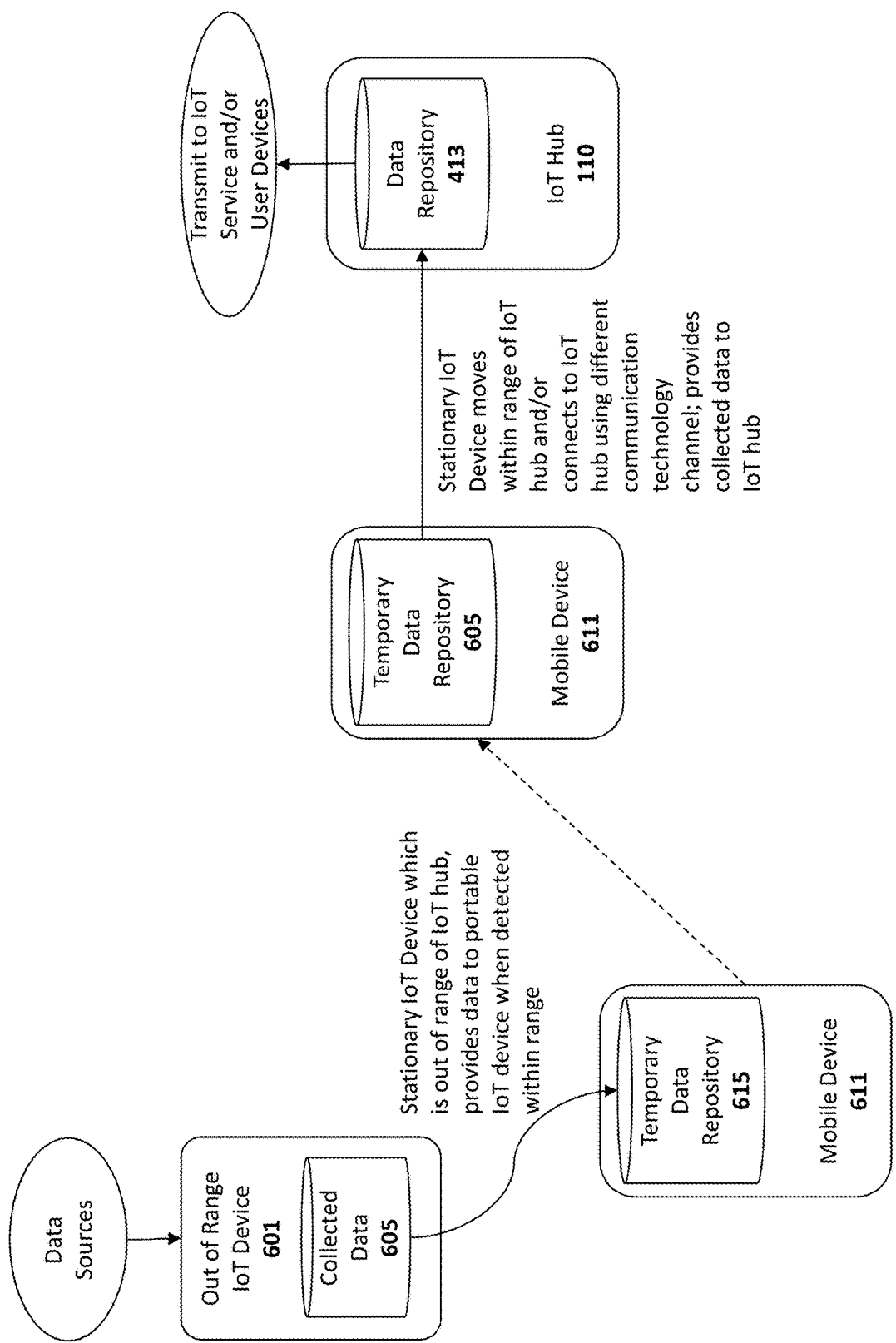
FIG. 6 illustrates one embodiment of a system in which an intermediary mobile device collects data from a stationary IoT device and provides the data to an IoT hub.

As illustrated in FIG. 6 one embodiment includes an IoT hub 110, an IoT device 601 which is out of range of the IoT hub 110 and a mobile device 611. The out of range IoT device 601 may include any form of IoT device capable of collecting and communicating data. For example, the IoT device 601 may comprise a data collection device configured within a refrigerator to monitor the food items available in the refrigerator, the users who consume the food items, and the current temperature. Of course, the underlying principles of the invention are not limited to any particular type of IoT device. The techniques described herein may be implemented using any type of IoT device including those used to collect and transmit data for smart meters, stoves, washers, dryers, lighting systems, HVAC systems, and audiovisual equipment, to name just a few.

Moreover, the mobile device In operation, the IoT device 611 illustrated in FIG. 6 may be any form of mobile device capable of communicating and storing data. For example, in one embodiment, the mobile device 611 is a smartphone with an app installed thereon to facilitate the techniques described herein. In another embodiment, the mobile device 611 comprises a wearable device such as a communication token affixed to a neckless or bracelet, a smartwatch or a fitness device. The wearable token may be particularly useful for elderly users or other users who do not own a smartphone device.

In operation, the out of range IoT device 601 may periodically or continually check for connectivity with a mobile device 611. Upon establishing a connection (e.g., as the result of the user moving within the vicinity of the refrigerator) any collected data 605 on the IoT device 601 is automatically transmitted to a temporary data repository 615 on the mobile device 611. In one embodiment, the IoT device 601 and mobile device 611 establish a local wireless communication channel using a low power wireless standard such as BTLE. In such a case, the mobile device 611 may initially be paired with the IoT device 601 using known pairing techniques.

Once the data has been transferred to the temporary data repository, the mobile device 611 will transmit the data once communication is established with the IoT hub 110 (e.g., when the user walks within the range of the IoT hub 110). The IoT hub may then store the data in a central data repository 413 and/or send the data over the Internet to one or more services and/or other user devices. In one embodiment, the mobile device 611 may use a different type of communication channel to provide the data to the IoT hub 110 (potentially a higher power communication channel such as WiFi).

Figure 7:
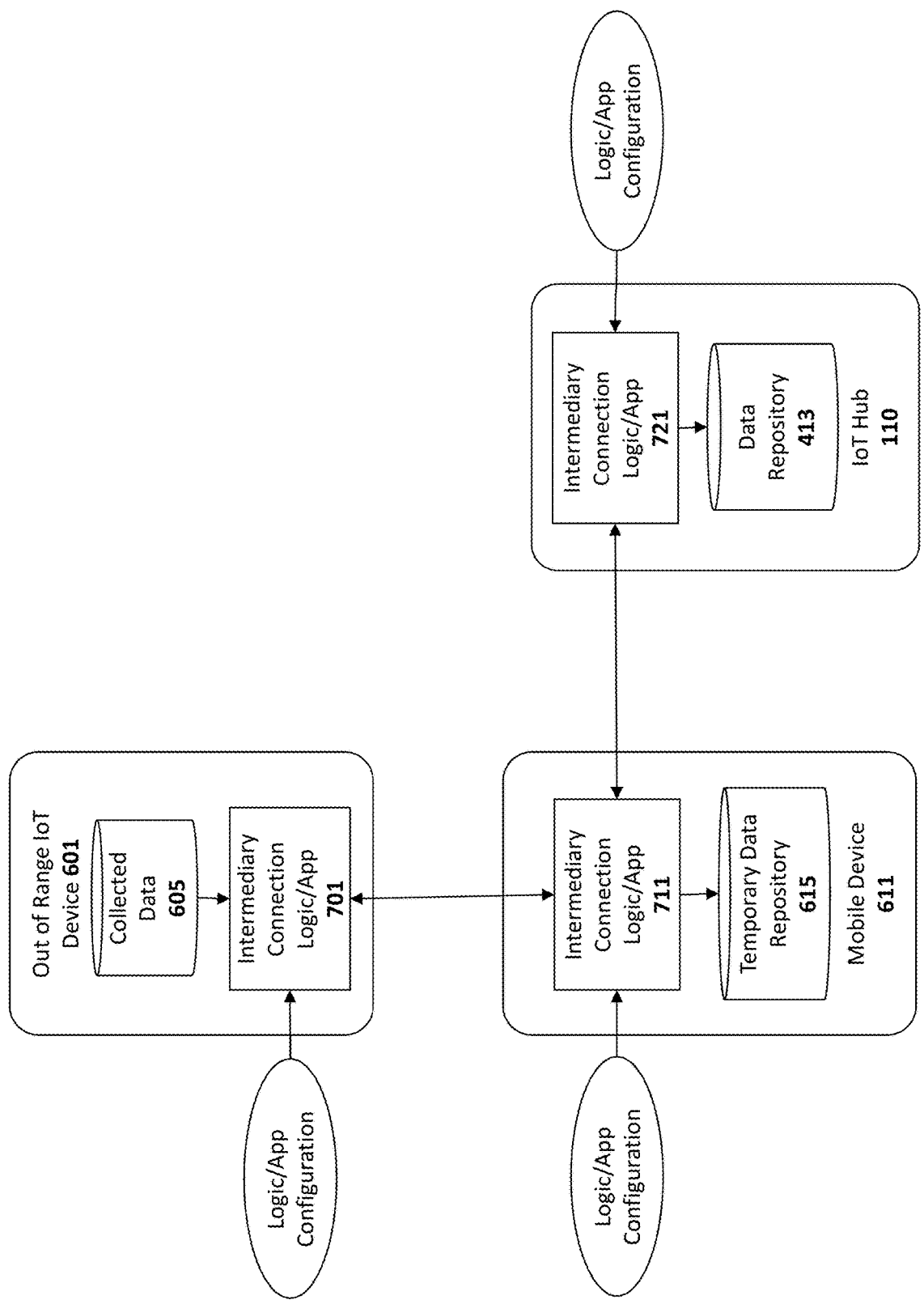
FIG. 7 illustrates intermediary connection logic implemented in one embodiment of the invention.

The out of range IoT device 601, the mobile device 611, and the IoT hub may all be configured with program code and/or logic to implement the techniques described herein. As illustrated in FIG. 7, for example, the IoT device 601 may be configured with intermediary connection logic and/or application, the mobile device 611 may be configured with an intermediary connection logic/application, and the IoT hub 110 may be configured with an intermediary connection logic/application 721 to perform the operations described herein. The intermediary connection logic/application on each device may be implemented in hardware, software, or any combination thereof. In one embodiment, the intermediary connection logic/application 701 of the IoT device 601 searches and establishes a connection with the intermediary connection logic/application 711 on the mobile device (which may be implemented as a device app) to transfer the data to the temporary data repository 615. The intermediary connection logic/application 701 on the mobile device 611 then forwards the data to the intermediary connection logic/application on the IoT hub, which stores the data in the central data repository 413.

As illustrated in FIG. 7, the intermediary connection logic/applications 701, 711, 721, on each device may be configured based on the application at hand. For example, for a refrigerator, the connection logic/application 701 may only need to transmit a few packets on a periodic basis. For other applications (e.g., temperature sensors), the connection logic/application 701 may need to transmit more frequent updates.

Rather than a mobile device 611, in one embodiment, the IoT device 601 may be configured to establish a wireless connection with one or more intermediary IoT devices, which are located within range of the IoT hub 110. In this embodiment, any IoT devices 601 out of range of the IoT hub may be linked to the hub by forming a "chain" using other IoT devices.

In addition, while only a single mobile device 611 is illustrated in FIGS. 6-7 for simplicity, in one embodiment, multiple such mobile devices of different users may be configured to communicate with the IoT device 601. Moreover, the same techniques may be implemented for multiple other IoT devices, thereby forming an intermediary device data collection system across the entire home.

Moreover, in one embodiment, the techniques described herein may be used to collect various different types of pertinent data. For example, in one embodiment, each time the mobile device 611 connects with the IoT device 601, the identity of the user may be included with the collected data 605. In this manner, the IoT system may be used to track the behavior of different users within the home. For example, if used within a refrigerator, the collected data 605 may then include the identify of each user who passes by fridge, each user who opens the fridge, and the specific food items consumed by each user. Different types of data may be collected from other types of IoT devices. Using this data the system is able to determine, for example, which user washes clothes, which user watches TV on a given day, the times at which each user goes to sleep and wakes up, etc. All of this crowd-sourced data may then be compiled within the data repository 413 of the IoT hub and/or forwarded to an external service or user.

Another beneficial application of the techniques described herein is for monitoring elderly users who may need assistance. For this application, the mobile device 611 may be a very small token worn by the elderly user to collect the information in different rooms of the user's home. Each time the user opens the refrigerator, for example, this data will be included with the collected data 605 and transferred to the IoT hub 110 via the token. The IoT hub may then provide the data to one or more external users (e.g., the children or other individuals who care for the elderly user). If data has not been collected for a specified period of time (e.g., 12 hours), then this means that the elderly user has not been moving around the home and/or has not been opening the refrigerator. The IoT hub 110 or an external service connected to the IoT hub may then transmit an alert notification to these other individuals, informing them that they should check on the elderly user. In addition, the collected data 605 may include other pertinent information such as the food being consumed by the user and whether a trip to the grocery store is needed, whether and how frequently the elderly user is watching TV, the frequency with which the elderly user washes clothes, etc.

In another implementation, the if there is a problem with an electronic device such as a washer, refrigerator, HVAC system, etc, the collected data may include an indication of a part that needs to be replaced. In such a case, a notification may be sent to a technician with a request to fix the problem. The technician may then arrive at the home with the needed replacement part.

A method in accordance with one embodiment of the invention is illustrated in FIG. 8. The method may be implemented within the context of the architectures described above, but is not limited to any particular architecture.

At 801, an IoT device which is out of range of the IoT hub periodically collects data (e.g., opening of the refrigerator door, food items used, etc). At 802 the IoT device periodically or continually checks for connectivity with a mobile device (e.g., using standard local wireless techniques for establishing a connection such as those specified by the BTLE standard). If the connection to the mobile device is established, determined at 802, then at 803, the collected data is transferred to the mobile device at 803. At 804, the mobile device transfers the data to the IoT hub, an external service and/or a user. As mentioned, the mobile device may transmit the data immediately if it is already connected (e.g., via a WiFi link).

Figure 9A:
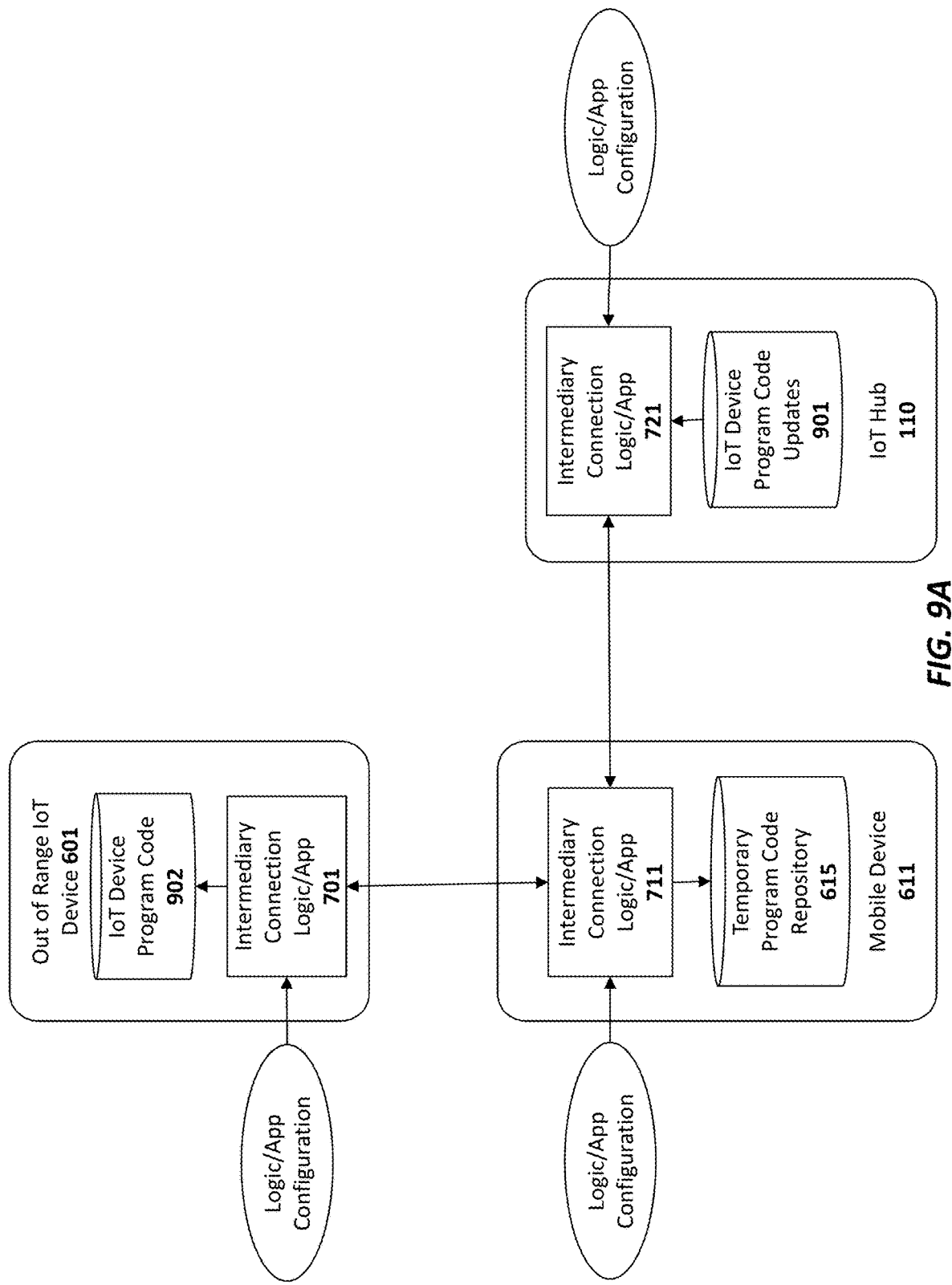
FIG. 9A illustrates an embodiment in which program code and data updates are provided to the IoT device.

In addition to collecting data from IoT devices, in one embodiment, the techniques described herein may be used to update or otherwise provide data to IoT devices. One example is shown in FIG. 9A, which shows an IoT hub 110 with program code updates 901 that need to be installed on an IoT device 601 (or a group of such IoT devices). The program code updates may include system updates, patches, configuration data and any other data needed for the IoT device to operate as desired by the user. In one embodiment, the user may specify configuration options for the IoT device 601 via a mobile device or computer which are then stored on the IoT hub 110 and provided to the IoT device using the techniques described herein. Specifically, in one embodiment, the intermediary connection logic/application 721 on the IoT hub 110 communicates with the intermediary connection logic/application 711 on the mobile device 611 to store the program code updates within a temporary storage 615. When the mobile device 611 enters the range of the IoT device 601, the intermediary connection logic/application 711 on the mobile device 611 connects with the intermediary/connection logic/application 701 on the IoT device 601 to provide the program code updates to the device. In one embodiment, the IoT device 601 may then enter into an automated update process to install the new program code updates and/or data.

Figure 9B:
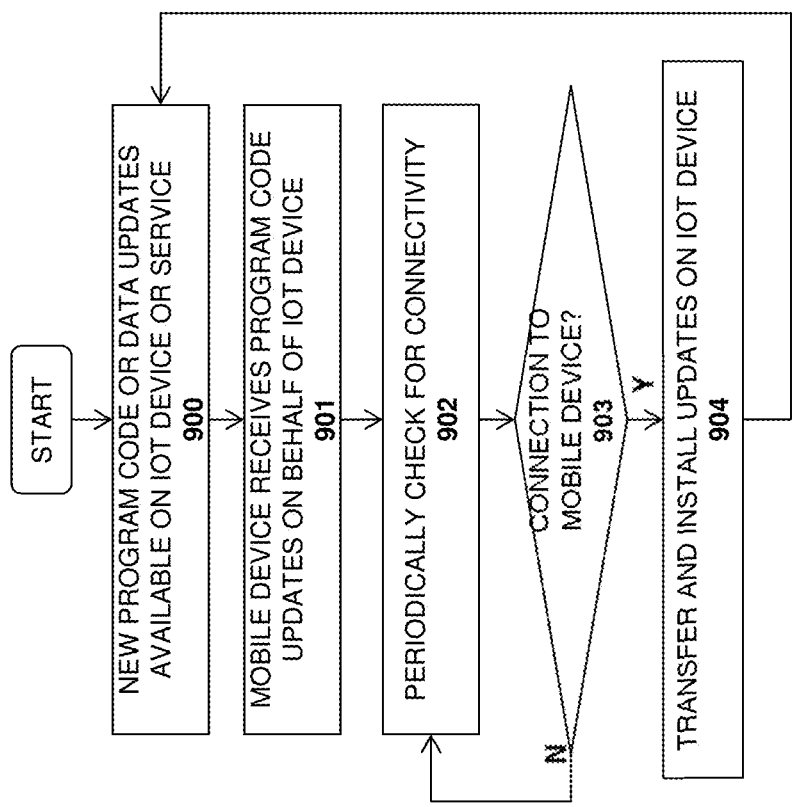
FIG. 9B illustrates an embodiment of a method in which program code and data updates are provided to the IoT device.

A method for updating an IoT device is shown in FIG. 9B. The method may be implemented within the context of the system architectures described above, but is not limited to any particular system architectures.

At 900 new program code or data updates are made available on the IoT hub and/or an external service (e.g., coupled to the mobile device over the Internet). At 901, the mobile device receives and stores the program code or data updates on behalf of the IoT device. The IoT device and/or mobile device periodically check to determine whether a connection has been established at 902. If a connection is established, determined at 903, then at 904 the updates are transferred to the IoT device and installed.

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 10-15 and associated text). Alternatively, the keys may be secured in a subscriber identify module (SIM) as discussed below.

Figure 10:
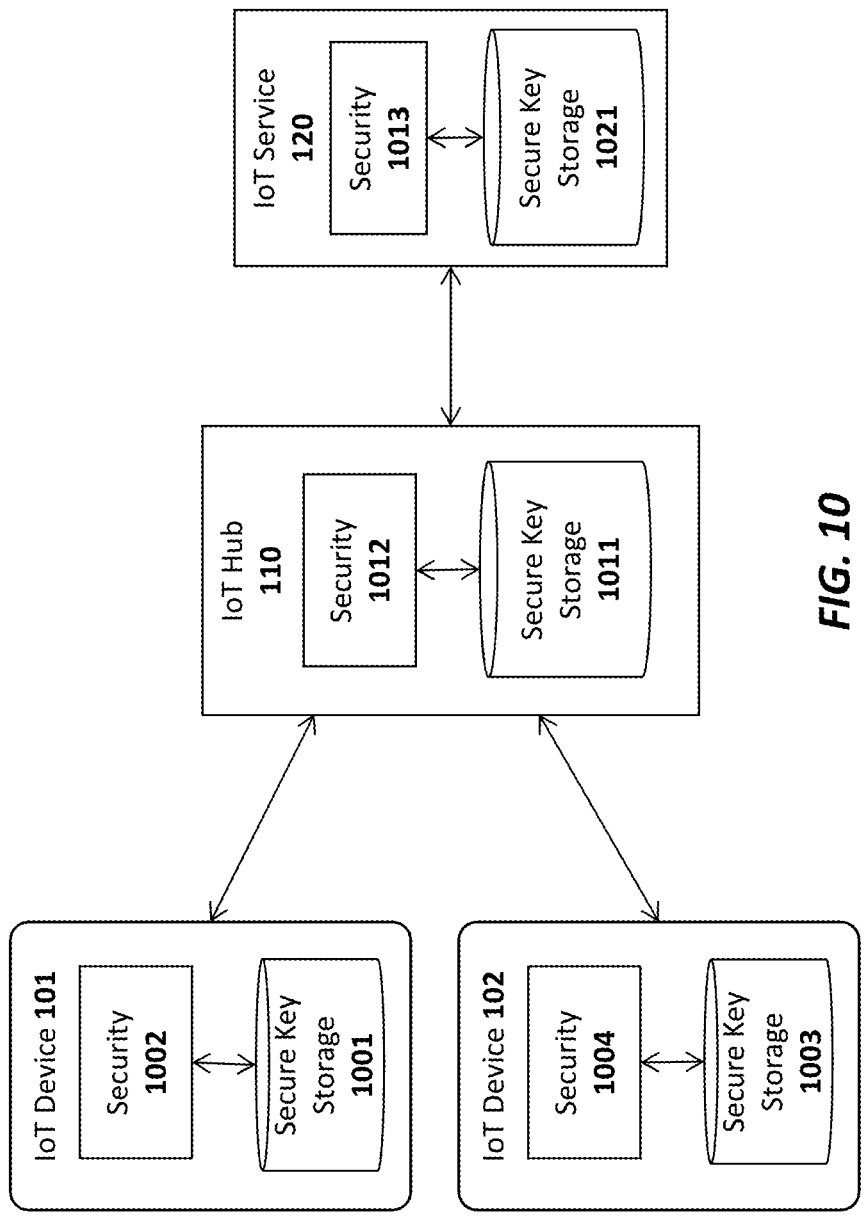
FIG. 10 illustrates a high level view of one embodiment of a security architecture.

FIG. 10 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 1001, 1003, respectively, for security storing each device's private key. Security logic 1002, 1304 then utilizes the securely stored private keys to perform the encryption/decryption operations described herein. Similarly, the IoT hub 110 includes a secure storage 1011 for storing the IoT hub private key and the public keys of the IoT devices 101-102 and the IoT service 120; as well as security logic 1012 for using the keys to perform encryption/decryption operations. Finally, the IoT service 120 may include a secure storage 1021 for security storing its own private key, the public keys of various IoT devices and IoT hubs, and a security logic 1013 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 1011.

By way of example, in one embodiment, when the IoT service 120 needs to transmit a command or data to an IoT device 101 (e.g., a command to unlock a door, a request to read a sensor, data to be processed/displayed by the IoT device, etc) the security logic 1013 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 1012 in the IoT hub is trusted, the service 120 could negotiate a session key with the hub security module 1312 and then the security module 1012 would negotiate a session key with each device 120. Messages from the service 120 would then be decrypted and verified in the hub security module 1012 before being re-encrypted for transmission to the device 101.

In one embodiment, to prevent a compromise on the hub security module 1012 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 1002 on the IoT device 101 uses the public key of the IoT hub 110 to encrypt data packets sent to the IoT hub 110. The security logic 1012 on the IoT hub 110 may then decrypt the data packets using the IoT hub's private key. Similarly, the security logic 1002 on the IoT device 101 and/or the security logic 1012 on the IoT hub 110 may encrypt data packets sent to the IoT service 120 using the public key of the IoT service 120 (which may then be decrypted by the security logic 1013 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 11:
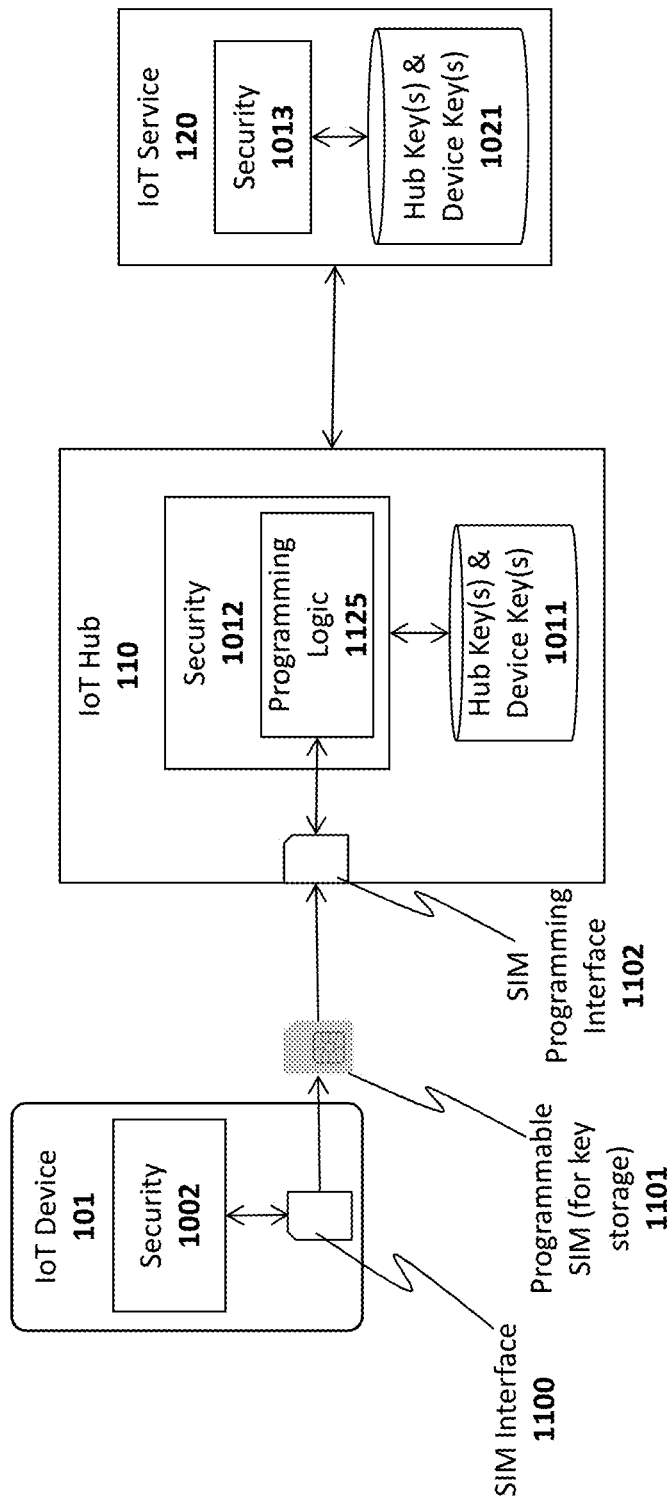
FIG. 11 illustrates one embodiment of an architecture in which a subscriber identity module (SIM) is used to store keys on IoT devices.

As illustrated in FIG. 11, in one embodiment, the secure key storage on each IoT device 101 is implemented using a programmable subscriber identity module (SIM) 1101. In this embodiment, the IoT device 101 may initially be provided to the end user with an un-programmed SIM card 1101 seated within a SIM interface 1100 on the IoT device 101. In order to program the SIM with a set of one or more encryption keys, the user takes the programmable SIM card 1101 out of the SIM interface 500 and inserts it into a SIM programming interface 1102 on the IoT hub 110. Programming logic 1125 on the IoT hub then securely programs the SIM card 1101 to register/pair the IoT device 101 with the IoT hub 110 and IoT service 120. In one embodiment, a public/private key pair may be randomly generated by the programming logic 1125 and the public key of the pair may then be stored in the IoT hub's secure storage device 411 while the private key may be stored within the programmable SIM 1101. In addition, the programming logic 525 may store the public keys of the IoT hub 110, the IoT service 120, and/or any other IoT devices 101 on the SIM card 1401 (to be used by the security logic 1302 on the IoT device 101 to encrypt outgoing data). Once the SIM 1101 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 11 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 1102 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 12A:
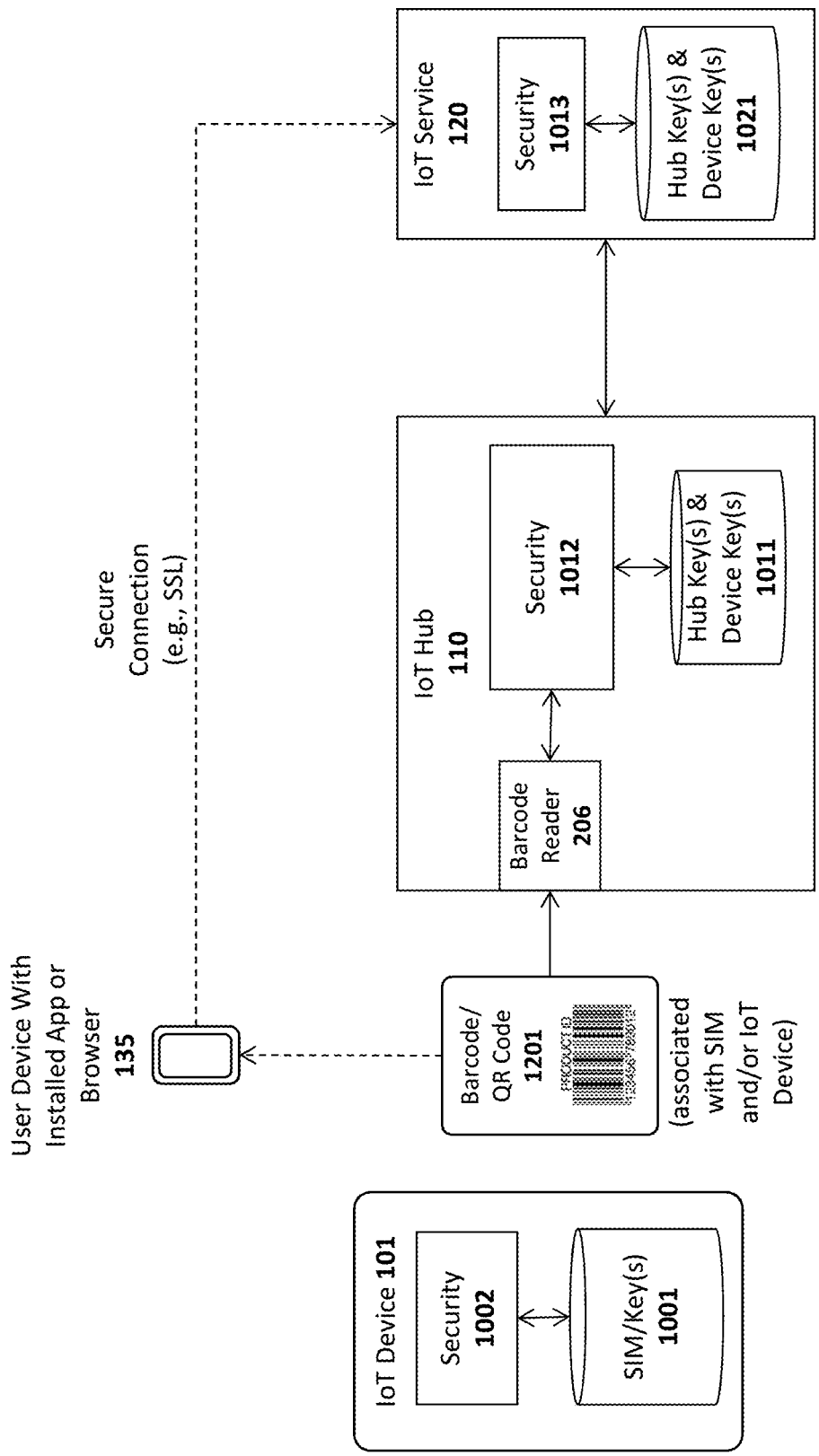
FIG. 12A illustrates one embodiment in which IoT devices are registered using barcodes or QR codes.

For example, as illustrated in FIG. 12A each IoT device 101 or SIM 401 may be packaged with a barcode or QR code 1501 uniquely identifying the IoT device 101 and/or SIM 1001. In one embodiment, the barcode or QR code 1201 comprises an encoded representation of the public key for the IoT device 101 or SIM 1001. Alternatively, the barcode or QR code 1201 may be used by the IoT hub 110 and/or IoT service 120 to identify or generate the public key (e.g., used as a pointer to the public key which is already stored in secure storage). The barcode or QR code 601 may be printed on a separate card (as shown in FIG. 12A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 1201 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 1501 may be used to pair each IoT device 101 with the IoT hub 110. For example, rather than using the standard wireless pairing process currently used to pair Bluetooth LE devices, a pairing code embedded within the barcode or QR code 1501 may be provided to the IoT hub 110 to pair the IoT hub with the corresponding IoT device.

Figure 12B:
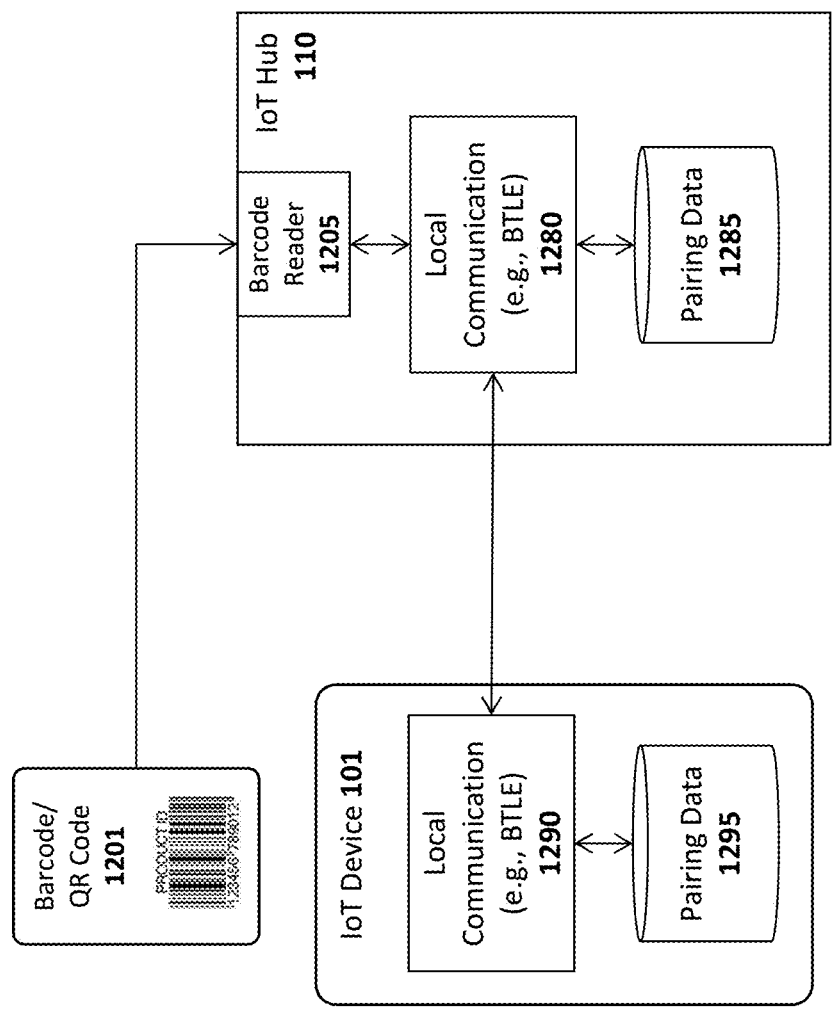
FIG. 12B illustrates one embodiment in which pairing is performed using barcodes or QR codes.

FIG. 12B illustrates one embodiment in which the barcode reader 206 on the IoT hub 110 captures the barcode/QR code 1201 associated with the IoT device 101. As mentioned, the barcode/QR code 1201 may be printed directly on the IoT device 101 or may be printed on a separate card provided with the IoT device 101. In either case, the barcode reader 206 reads the pairing code from the barcode/QR code 1201 and provides the pairing code to the local communication module 1280. In one embodiment, the local communication module 1280 is a Bluetooth LE chip and associated software, although the underlying principles of the invention are not limited to any particular protocol standard. Once the pairing code is received, it is stored in a secure storage containing pairing data 1285 and the IoT device 101 and IoT hub 110 are automatically paired. Each time the IoT hub is paired with a new IoT device in this manner, the pairing data for that pairing is stored within the secure storage 685. In one embodiment, once the local communication module 1280 of the IoT hub 110 receives the pairing code, it may use the code as a key to encrypt communications over the local wireless channel with the IoT device 101.

Similarly, on the IoT device 101 side, the local communication module 1590 stores pairing data within a local secure storage device 1595 indicating the pairing with the IoT hub. The pairing data 1295 may include the pre-programmed pairing code identified in the barcode/QR code 1201. The pairing data 1295 may also include pairing data received from the local communication module 1280 on the IoT hub 110 required for establishing a secure local communication channel (e.g., an additional key to encrypt communication with the IoT hub 110).

Thus, the barcode/QR code 1201 may be used to perform local pairing in a far more secure manner than current wireless pairing protocols because the pairing code is not transmitted over the air. In addition, in one embodiment, the same barcode/QR code 1201 used for pairing may be used to identify encryption keys to build a secure connection from the IoT device 101 to the IoT hub 110 and from the IoT hub 110 to the IoT service 120.

Figure 13:
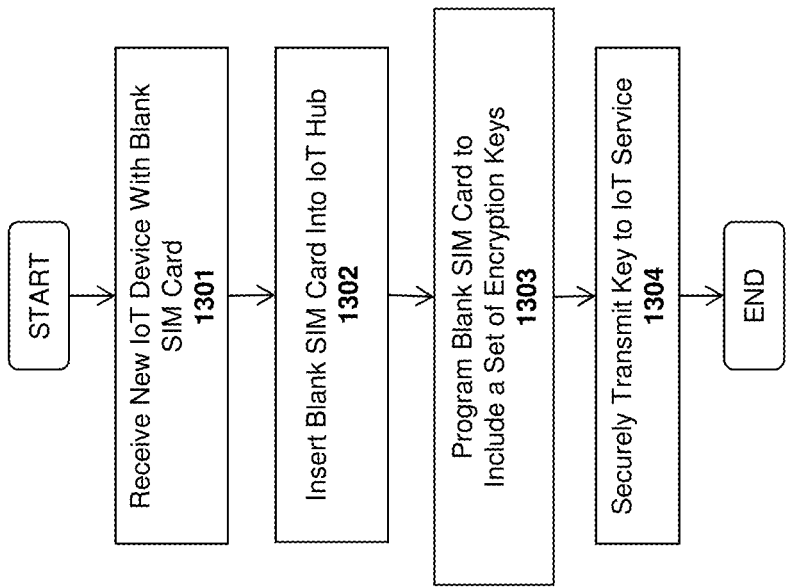
FIG. 13 illustrates one embodiment of a method for programming a SIM using an IoT hub.

A method for programming a SIM card in accordance with one embodiment of the invention is illustrated in FIG. 13. The method may be implemented within the system architecture described above, but is not limited to any particular system architecture.

At 1301, a user receives a new IoT device with a blank SIM card and, at 1602, the user inserts the blank SIM card into an IoT hub. At 1303, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 1304, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 13.

Figure 14:
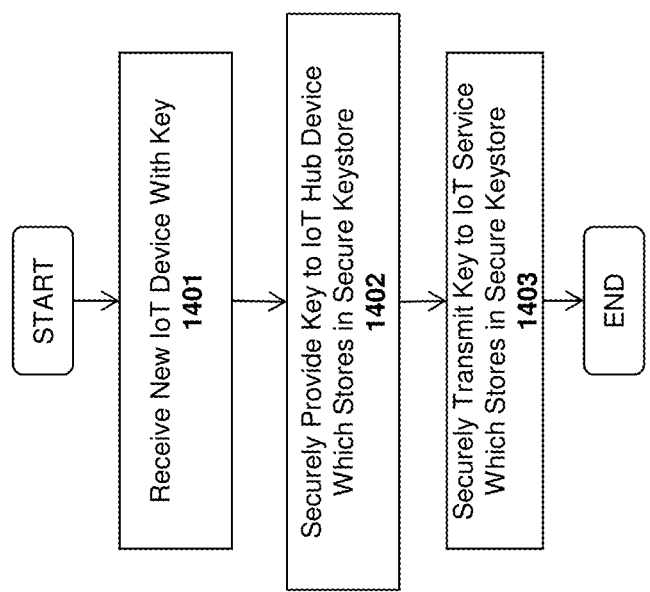
FIG. 14 illustrates one embodiment of a method for registering an IoT device with an IoT hub and IoT service.

A method for integrating a new IoT device into a network is illustrated in FIG. 14. The method may be implemented within the system architecture described above, but is not limited to any particular system architecture.

At 1401, a user receives a new IoT device to which an encryption key has been pre-assigned. At 1402, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or bowser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 803, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 15:
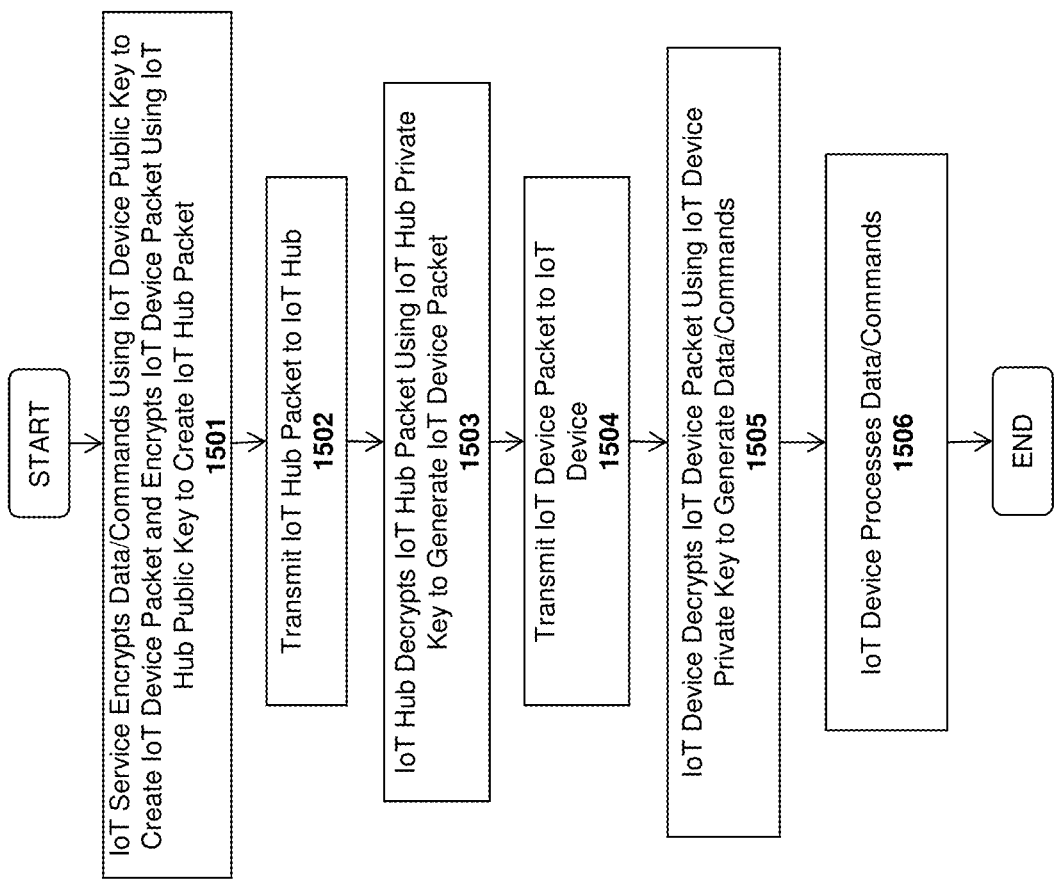
FIG. 15 illustrates one embodiment of a method for encrypting data to be transmitted to an IoT device.

A method for securely communicating commands/data to an IoT device using public/private keys is illustrated in FIG. 15. The method may be implemented within the system architecture described above, but is not limited to any particular system architecture.

At 1501, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1502, the IoT service transmits the IoT hub packet to the IoT hub. At 1503, the IoT hub decrypts the IoT hub packet using the IoT hub's private key to generate the IoT device packet. At 1504 it then transmits the IoT device packet to the IoT device which, at 1505, decrypts the IoT device packet using the IoT device private key to generate the data/commands. At 1506, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Apparatus and Method for Establishing Secure Communication Channels in an Internet of Things (IoT) System In one embodiment of the invention, encryption and decryption of data is performed between the IoT service 120 and each IoT device 101, regardless of the intermediate devices used to support the communication channel (e.g., such as the user's mobile device 611 and/or the IoT hub 110). One embodiment which communicates via an IoT hub 110 is illustrated in FIG. 16A and another embodiment which does not require an IoT hub is illustrated in FIG. 16B.

Figure 16A:
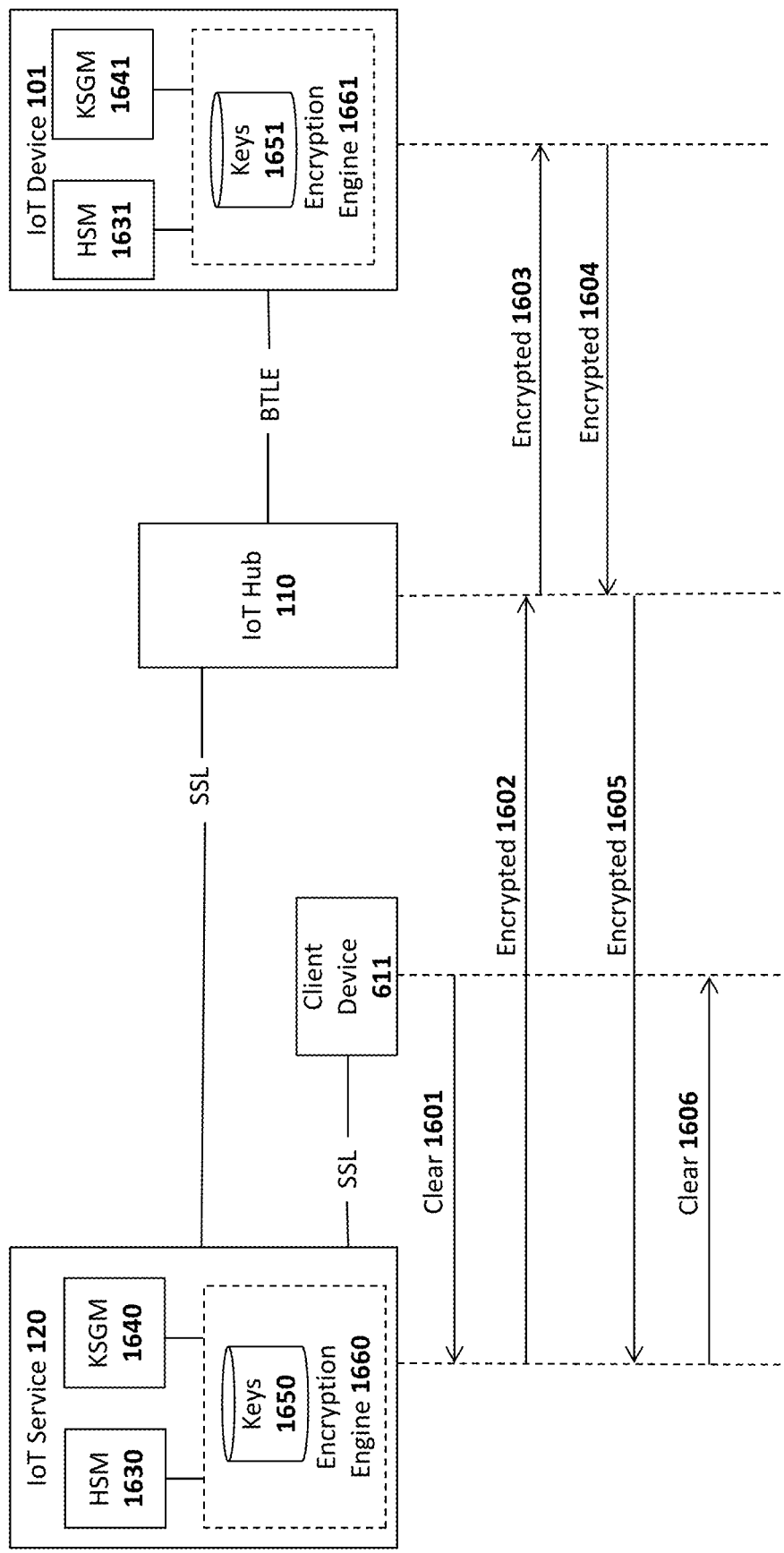
FIGS. 16A-B illustrate different embodiments of the invention for encrypting data between an IoT service and an IoT device.
Figure 16B:
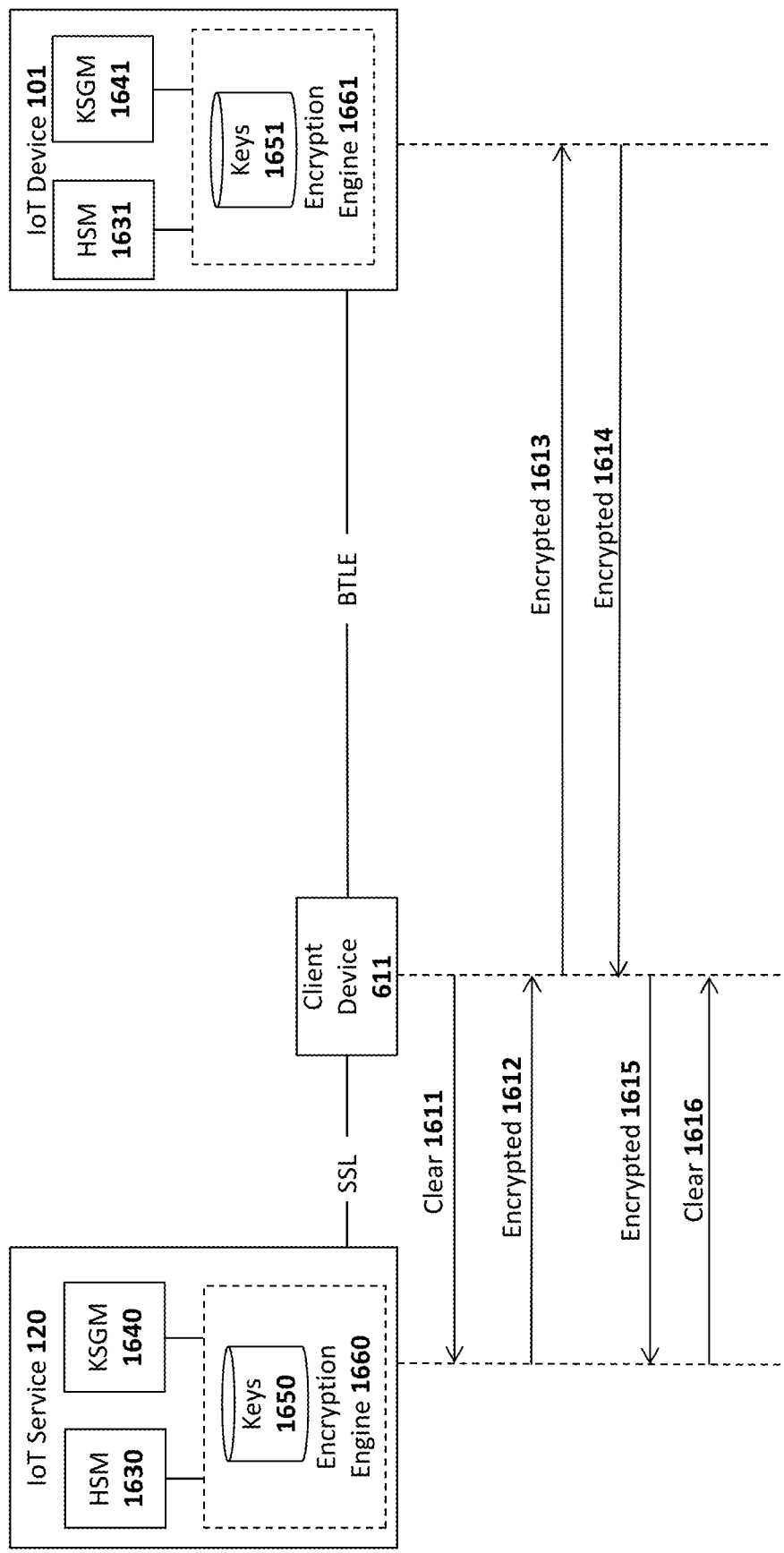

Turning first to FIG. 16A, the IoT service 120 includes an encryption engine 1660 which manages a set of "service session keys" 1650 and each IoT device 101 includes an encryption engine 1661 which manages a set of "device session keys" 1651 for encrypting/decrypting communication between the IoT device 101 and IoT service 120. The encryption engines may rely on different hardware modules when performing the security/encryption techniques described herein including a hardware security module 1630-1631 for (among other things) generating a session public/private key pair and preventing access to the private session key of the pair and a key stream generation module 1640-1641 for generating a key stream using a derived secret. In one embodiment, the service session keys 1650 and the device session keys 1651 comprise related public/private key pairs. For example, in one embodiment, the device session keys 1651 on the IoT device 101 include a public key of the IoT service 120 and a private key of the IoT device 101. As discussed in detail below, in one embodiment, to establish a secure communication session, the public/private session key pairs, 1650 and 1651, are used by each encryption engine, 1660 and 1661, respectively, to generate the same secret which is then used by the SKGMs 1640-1641 to generate a key stream to encrypt and decrypt communication between the IoT service 120 and the IoT device 101. Additional details associated with generation and use of the secret in accordance with one embodiment of the invention are provided below.

In FIG. 16A, once the secret has been generated using the keys 1650-1651, the client will always send messages to the IoT device 101 through the IoT service 120, as indicated by Clear transaction 1611. "Clear" as used herein is meant to indicate that the underlying message is not encrypted using the encryption techniques described herein. However, as illustrated, in one embodiment, a secure sockets layer (SSL) channel or other secure channel (e.g., an Internet Protocol Security (IPSEC) channel) is established between the client device 611 and IoT service 120 to protect the communication. The encryption engine 1660 on the IoT service 120 then encrypts the message using the generated secret and transmits the encrypted message to the IoT hub 110 at 1602. Rather than using the secret to encrypt the message directly, in one embodiment, the secret and a counter value are used to generate a key stream, which is used to encrypt each message packet. Details of this embodiment are described below with respect to FIG. 17.

As illustrated, an SSL connection or other secure channel may be established between the IoT service 120 and the IoT hub 110. The IoT hub 110 (which does not have the ability to decrypt the message in one embodiment) transmits the encrypted message to the IoT device at 1603 (e.g., over a Bluetooth Low Energy (BTLE) communication channel). The encryption engine 1661 on the IoT device 101 may then decrypt the message using the secret and process the message contents. In an embodiment which uses the secret to generate a key stream, the encryption engine 1661 may generate the key stream using the secret and a counter value and then use the key stream for decryption of the message packet.

The message itself may comprise any form of communication between the IoT service 120 and IoT device 101. For example, the message may comprise a command packet instructing the IoT device 101 to perform a particular function such as taking a measurement and reporting the result back to the client device 611 or may include configuration data to configure the operation of the IoT device 101.

If a response is required, the encryption engine 1661 on the IoT device 101 uses the secret or a derived key stream to encrypt the response and transmits the encrypted response to the IoT hub 110 at 1604, which forwards the response to the IoT service 120 at 1605. The encryption engine 1660 on the IoT service 120 then decrypts the response using the secret or a derived key stream and transmits the decrypted response to the client device 611 at 1606 (e.g., over the SSL or other secure communication channel).

FIG. 16B illustrates an embodiment which does not require an IoT hub. Rather, in this embodiment, communication between the IoT device 101 and IoT service 120 occurs through the client device 611 (e.g., as in the embodiments described above with respect to FIGS. 6-9B). In this embodiment, to transmit a message to the IoT device 101 the client device 611 transmits an unencrypted version of the message to the IoT service 120 at 1611. The encryption engine 1660 encrypts the message using the secret or the derived key stream and transmits the encrypted message back to the client device 611 at 1612. The client device 611 then forwards the encrypted message to the IoT device 101 at 1613, and the encryption engine 1661 decrypts the message using the secret or the derived key stream. The IoT device 101 may then process the message as described herein. If a response is required, the encryption engine 1661 encrypts the response using the secret and transmits the encrypted response to the client device 611 at 1614, which forwards the encrypted response to the IoT service 120 at 1615. The encryption engine 1660 then decrypts the response and transmits the decrypted response to the client device 611 at 1616.

Figure 17:
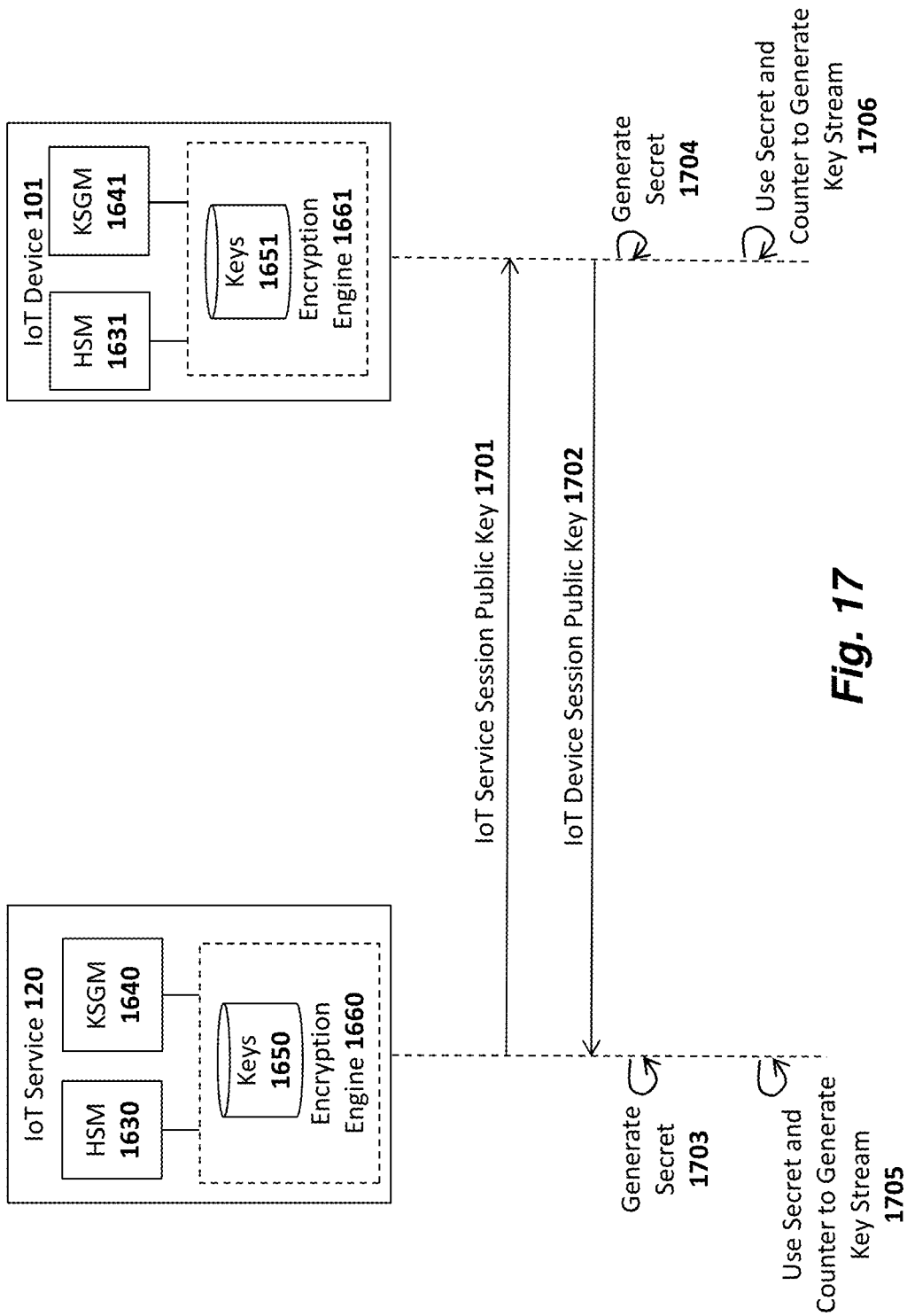
FIG. 17 illustrates embodiments of the invention for performing a secure key exchange, generating a common secret, and using the secret to generate a key stream.

FIG. 17 illustrates a key exchange and key stream generation which may initially be performed between the IoT service 120 and the IoT device 101. In one embodiment, this key exchange may be performed each time the IoT service 120 and IoT device 101 establish a new communication session. Alternatively, the key exchange may be performed and the exchanged session keys may be used for a specified period of time (e.g., a day, a week, etc). While no intermediate devices are shown in FIG. 17 for simplicity, communication may occur through the IoT hub 110 and/or the client device 611.

In one embodiment, the encryption engine 1660 of the IoT service 120 sends a command to the HSM 1630 (e.g., which may be such as a CloudHSM offered by Amazon®) to generate a session public/private key pair. The HSM 1630 may subsequently prevent access to the private session key of the pair. Similarly, the encryption engine on the IoT device 101 may transmit a command to the HSM 1631 (e.g., such as an Atecc508 HSM from Atmel Corporation®) which generates a session public/private key pair and prevents access to the session private key of the pair. Of course, the underlying principles of the invention are not limited to any specific type of encryption engine or manufacturer.

In one embodiment, the IoT service 120 transmits its session public key generated using the HSM 1630 to the IoT device 101 at 1701. The IoT device uses its HSM 1631 to generate its own session public/private key pair and, at 1702, transmits its public key of the pair to the IoT service 120. In one embodiment, the encryption engines 1660-1661 use an Elliptic curve Diffie-Hellman (ECDH) protocol, which is an anonymous key agreement that allows two parties with an elliptic curve public-private key pair, to establish a shared secret. In one embodiment, using these techniques, at 1703, the encryption engine 1660 of the IoT service 120 generates the secret using the IoT device session public key and its own session private key. Similarly, at 1704, the encryption engine 1661 of the IoT device 101 independently generates the same secret using the IoT service 120 session public key and its own session private key. More specifically, in one embodiment, the encryption engine 1660 on the IoT service 120 generates the secret according to the formula secret=IoT device session pub key*IoT service session private key, where "*" means that the IoT device session public key is point-multiplied by the IoT service session private key. The encryption engine 1661 on the IoT device 101 generates the secret according to the formula secret=IoT service session pub key*IoT device session private key, where the IoT service session public key is point multiplied by the IoT device session private key. In the end, the IoT service 120 and IoT device 101 have both generated the same secret to be used to encrypt communication as described below. In one embodiment, the encryption engines 1660-1661 rely on a hardware module such as the KSGMs 1640-1641 respectively to perform the above operations for generating the secret.

Once the secret has been determined, it may be used by the encryption engines 1660 and 1661 to encrypt and decrypt data directly. Alternatively, in one embodiment, the encryption engines 1660-1661 send commands to the KSGMs 1640-1641 to generate a new key stream using the secret to encrypt/decrypt each data packet (i.e., a new key stream data structure is generated for each packet). In particular, one embodiment of the key stream generation module 1640-1641 implements a Galois/Counter Mode (GCM) in which a counter value is incremented for each data packet and is used in combination with the secret to generate the key stream. Thus, to transmit a data packet to the IoT service 120, the encryption engine 1661 of the IoT device 101 uses the secret and the current counter value to cause the KSGMs 1640-1641 to generate a new key stream and increment the counter value for generating the next key stream. The newly-generated key stream is then used to encrypt the data packet prior to transmission to the IoT service 120. In one embodiment, the key stream is XORed with the data to generate the encrypted data packet. In one embodiment, the IoT device 101 transmits the counter value with the encrypted data packet to the IoT service 120. The encryption engine 1660 on the IoT service then communicates with the KSGM 1640 which uses the received counter value and the secret to generate the key stream (which should be the same key stream because the same secret and counter value are used) and uses the generated key stream to decrypt the data packet.

In one embodiment, data packets transmitted from the IoT service 120 to the IoT device 101 are encrypted in the same manner. Specifically, a counter is incremented for each data packet and used along with the secret to generate a new key stream. The key stream is then used to encrypt the data (e.g., performing an XOR of the data and the key stream) and the encrypted data packet is transmitted with the counter value to the IoT device 101. The encryption engine 1661 on the IoT device 101 then communicates with the KSGM 1641 which uses the counter value and the secret to generate the same key stream which is used to decrypt the data packet. Thus, in this embodiment, the encryption engines 1660-1661 use their own counter values to generate a key stream to encrypt data and use the counter values received with the encrypted data packets to generate a key stream to decrypt the data.

In one embodiment, each encryption engine 1660-1661 keeps track of the last counter value it received from the other and includes sequencing logic to detect whether a counter value is received out of sequence or if the same counter value is received more than once. If a counter value is received out of sequence, or if the same counter value is received more than once, this may indicate that a replay attack is being attempted. In response, the encryption engines 1660-1661 may disconnect from the communication channel and/or may generate a security alert.

Figure 18:
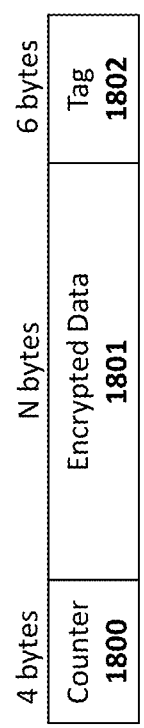
FIG. 18 illustrates a packet structure in accordance with one embodiment of the invention.

FIG. 18 illustrates an exemplary encrypted data packet employed in one embodiment of the invention comprising a 4-byte counter value 1800, a variable-sized encrypted data field 1801, and a 6-byte tag 1802. In one embodiment, the tag 1802 comprises a checksum value to validate the decrypted data (once it has been decrypted).

As mentioned, in one embodiment, the session public/private key pairs 1650-1651 exchanged between the IoT service 120 and IoT device 101 may be generated periodically and/or in response to the initiation of each new communication session.

One embodiment of the invention implements additional techniques for authenticating sessions between the IoT service 120 and IoT device 101. In particular, in one embodiment, hierarchy of public/private key pairs is used including a master key pair, a set of factory key pairs, and a set of IoT service key pairs, and a set of IoT device key pairs. In one embodiment, the master key pair comprises a root of trust for all of the other key pairs and is maintained in a single, highly secure location (e.g., under the control of the organization implementing the IoT systems described herein). The master private key may be used to generate signatures over (and thereby authenticate) various other key pairs such as the factory key pairs. The signatures may then be verified using the master public key. In one embodiment, each factory which manufactures IoT devices is assigned its own factory key pair which may then be used to authenticate IoT service keys and IoT device keys. For example, in one embodiment, a factory private key is used to generate a signature over IoT service public keys and IoT device public keys. These signature may then be verified using the corresponding factory public key. Note that these IoT service/device public keys are not the same as the "session" public/private keys described above with respect to FIGS. 16A-B. The session public/private keys described above are temporary (i.e., generated for a service/device session) while the IoT service/device key pairs are permanent (i.e., generated at the factory).

With the foregoing relationships between master keys, factory keys, service/device keys in mind, one embodiment of the invention performs the following operations to provide additional layers of authentication and security between the IoT service 120 and IoT device 101:

A. In one embodiment, the IoT service 120 initially generates a message containing the following:
1. The IoT service's unique ID:
    The IoT service's serial number;
    a Timestamp;
    The ID of the factory key used to sign this unique ID;
    a Class of the unique ID (i.e., a service);
    IoT service's public key
    The signature over the unique ID.
2. The Factory Certificate including:
    A timestamp
    The ID of the master key used to sign the certificate
    The factory public key
    The signature of the Factory Certificate
3. IoT service session public key (as described above with respect to FIGS. 16A-B)

4. IoT service session public key signature (e.g., signed with the IoT service's private key)

B. In one embodiment, the message is sent to the IoT device on the negotiation channel (described below). The IoT device parses the message and:
1. Verifies the signature of the factory certificate (only if present in the message payload)
2. Verifies the signature of the unique ID using the key identified by the unique ID
3. Verifies the IoT service session public key signature using the IoT service's public key from the unique ID
4. Saves the IoT service's public key as well as the IoT service's session public key
5. Generates the IoT device session key pair C. The IoT device then generates a message containing the following:
1. IoT device's unique ID
   IoT device serial number
   Timestamp
   ID of factory key used to sign this unique ID
   Class of unique ID (i.e., IoT device)
   IoT device's public key
   Signature of unique ID
2. IoT device's session public key
3. Signature of (IoT device session public key+IoT service session public key) signed with IoT device's key D. This message is sent back to the IoT service. The IoT service parses the message and:
1. Verifies the signature of the unique ID using the factory public key
2. Verifies the signature of the session public keys using the IoT device's public key
3. Saves the IoT device's session public key E. The IoT service then generates a message containing a signature of (IoT device session public key+IoT service session public key) signed with the IoT service's key.

F The IoT device parses the message and:
1. Verifies the signature of the session public keys using the IoT service's public key
2. Generates the key stream from the IoT device session private key and the IoT service's session public key
3. The IoT device then sends a "messaging available" message.

G. The IoT service then does the following:
1. Generates the key stream from the IoT service session private key and the IoT device's session public key
2. Creates a new message on the messaging channel which contains the following:
   Generates and stores a random 2 byte value
   Set attribute message with the boomerang attribute Id (discussed below) and the random value H. The IoT device receives the message and:
1. Attempts to decrypt the message
2. Emits an Update with the same value on the indicated attribute Id I. The IoT service recognizes the message payload contains a boomerang attribute update and:
1. Sets its paired state to true
2. Sends a pairing complete message on the negotiator channel J. IoT device receives the message and sets his paired state to true While the above techniques are described with respect to an "IoT service" and an "IoT device," the underlying principles of the invention may be implemented to establish a secure communication channel between any two devices including user client devices, servers, and Internet services.

The above techniques are highly secure because the private keys are never shared over the air (in contrast to current Bluetooth pairing techniques in which a secret is transmitted from one party to the other). An attacker listening to the entire conversation will only have the public keys, which are insufficient to generate the shared secret. These techniques also prevent a man-in-the-middle attack by exchanging signed public keys. In addition, because GCM and separate counters are used on each device, any kind of "replay attack" (where a man in the middle captures the data and sends it again) is prevented. Some embodiments also prevent replay attacks by using asymmetrical counters.

Techniques for Exchanging Data and Commands without Formally Pairing Devices

GATT is an acronym for the Generic Attribute Profile, and it defines the way that two Bluetooth Low Energy (BTLE) devices transfer data back and forth. It makes use of a generic data protocol called the Attribute Protocol (ATT), which is used to store Services, Characteristics and related data in a simple lookup table using 16-bit Characteristic IDs for each entry in the table. Note that while the "characteristics" are sometimes referred to as "attributes."

On Bluetooth devices, the most commonly used characteristic is the devices "name" (having characteristic ID 10752 (0x2A00)). For example, a Bluetooth device may identify other Bluetooth devices within its vicinity by reading the "Name" characteristic published by those other Bluetooth devices using GATT. Thus, Bluetooth device have the inherent ability to exchange data without formally pairing/bonding the devices (note that "paring" and "bonding" are sometimes used interchangeably; the remainder of this discussion will use the term "pairing").

One embodiment of the invention takes advantage of this capability to communicate with BTLE-enabled IoT devices without formally pairing with these devices. Pairing with each individual IoT device would extremely inefficient because of the amount of time required to pair with each device and because only one paired connection may be established at a time.

Figure 19:
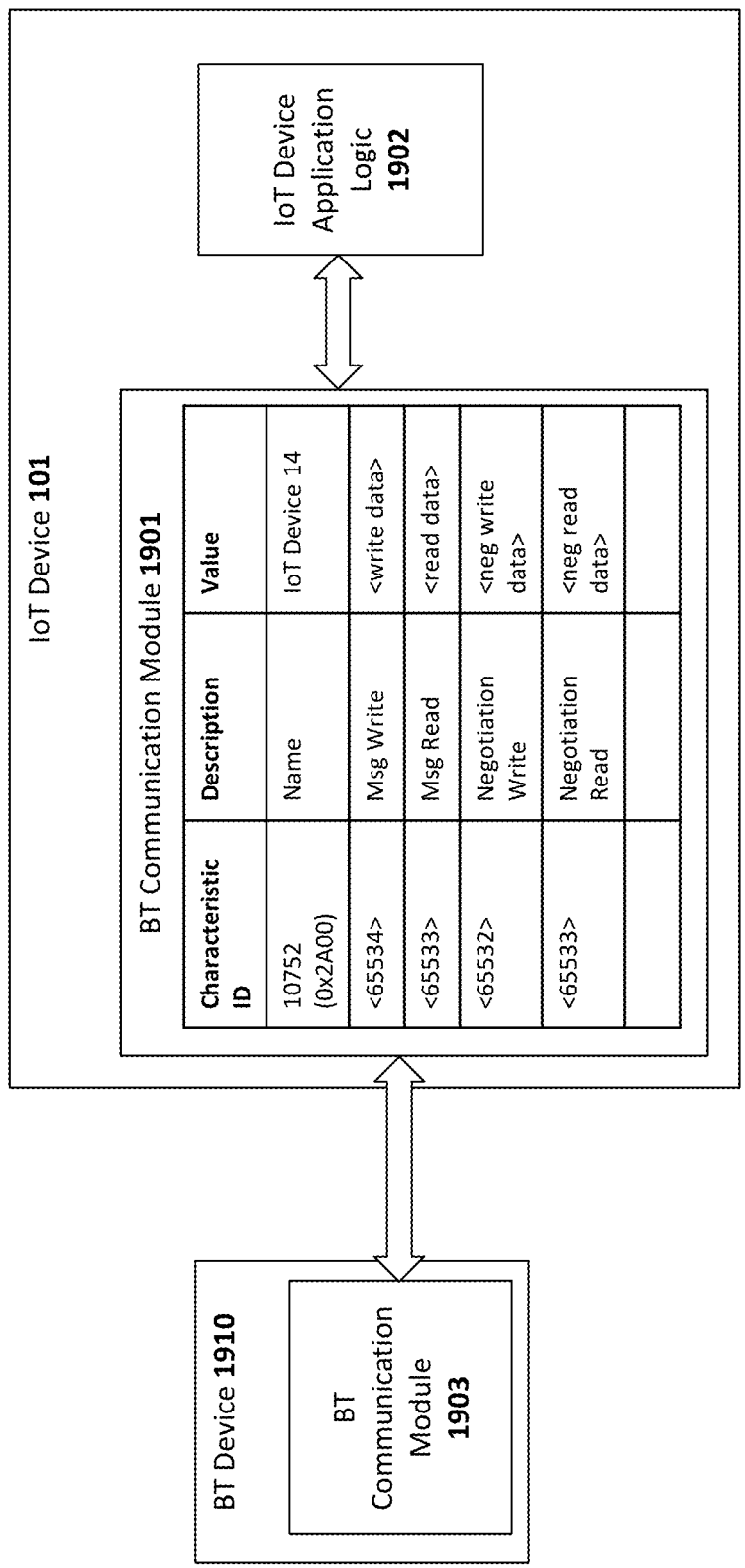
FIG. 19 illustrates techniques employed in one embodiment for writing and reading data to/from an IoT device without formally pairing with the IoT device.

FIG. 19 illustrates one particular embodiment in which a Bluetooth (BT) device 1910 establishes a network socket abstraction with a BT communication module 1901 of an IoT device 101 without formally establishing a paired BT connection. The BT device 1910 may be included in an IoT hub 110 and/or a client device 611 such as shown in FIG. 16A. As illustrated, the BT communication module 1901 maintains a data structure containing a list of characteristic IDs, names associated with those characteristic IDs and values for those characteristic IDs. The value for each characteristic may be stored within a 20-byte buffer identified by the characteristic ID in accordance with the current BT standard. However, the underlying principles of the invention are not limited to any particular buffer size.

In the example in FIG. 19, the "Name" characteristic is a BT-defined characteristic which is assigned a specific value of "IoT Device 14." One embodiment of the invention specifies a first set of additional characteristics to be used for negotiating a secure communication channel with the BT device 1910 and a second set of additional characteristics to be used for encrypted communication with the BT device 1910. In particular, a "negotiation write" characteristic, identified by characteristic ID <65532> in the illustrated example, may be used to transmit outgoing negotiation messages and the "negotiation read" characteristic, identified by characteristic ID <65533> may be used to receive incoming negotiation messages. The "negotiation messages" may include messages used by the BT device 1910 and the BT communication module 1901 to establish a secure communication channel as described herein. By way of example, in FIG. 17, the IoT device 101 may receive the IoT service session public key 1701 via the "negotiation read" characteristic <65533>. The key 1701 may be transmitted from the IoT service 120 to a BTLE-enabled IoT hub 110 or client device 611 which may then use GATT to write the key 1701 to the negotiation read value buffer identified by characteristic ID <65533>. IoT device application logic 1902 may then read the key 1701 from the value buffer identified by characteristic ID <65533> and process it as described above (e.g., using it to generate a secret and using the secret to generate a key stream, etc).

If the key 1701 is greater than 20 bytes (the maximum buffer size in some current implementations), then it may be written in 20-byte portions. For example, the first 20 bytes may be written by the BT communication module 1903 to characteristic ID <65533> and read by the IoT device application logic 1902, which may then write an acknowledgement message to the negotiation write value buffer identified by characteristic ID <65532>. Using GATT, the BT communication module 1903 may read this acknowledgement from characteristic ID <65532> and responsively write the next 20 bytes of the key 1701 to the negotiation read value buffer identified by characteristic ID <65533>. In this manner, a network socket abstraction defined by characteristic IDs <65532> and <65533> is established for exchanging negotiation messages used to establish a secure communication channel.

In one embodiment, once the secure communication channel is established, a second network socket abstraction is established using characteristic ID <65534> (for transmitting encrypted data packets from IoT device 101) and characteristic ID <65533> (for receiving encrypted data packets by IoT device). That is, when BT communication module 1903 has an encrypted data packet to transmit (e.g., such as encrypted message 1603 in FIG. 16A), it starts writing the encrypted data packet, 20 bytes at a time, using the message read value buffer identified by characteristic ID <65533>. The IoT device application logic 1902 will then read the encrypted data packet, 20 bytes at a time, from the read value buffer, sending acknowledgement messages to the BT communication module 1903 as needed via the write value buffer identified by characteristic ID <65532>.

In one embodiment, the commands of GET, SET, and UPDATE described below are used to exchange data and commands between the two BT communication modules 1901 and 1903. For example, the BT communication module 1903 may send a packet identifying characteristic ID <65533> and containing the SET command to write into the value field/buffer identified by characteristic ID <65533> which may then be read by the IoT device application logic 1902. To retrieve data from the IoT device 101, the BT communication module 1903 may transmit a GET command directed to the value field/buffer identified by characteristic ID <65534>. In response to the GET command, the BT communication module 1901 may transmit an UPDATE packet to the BT communication module 1903 containing the data from the value field/buffer identified by characteristic ID <65534>. In addition, UPDATE packets may be transmitted automatically, in response to changes in a particular attribute on the IoT device 101. For example, if the IoT device is associated with a lighting system and the user turns on the lights, then an UPDATE packet may be sent to reflect the change to the on/off attribute associated with the lighting application.

Figure 20:
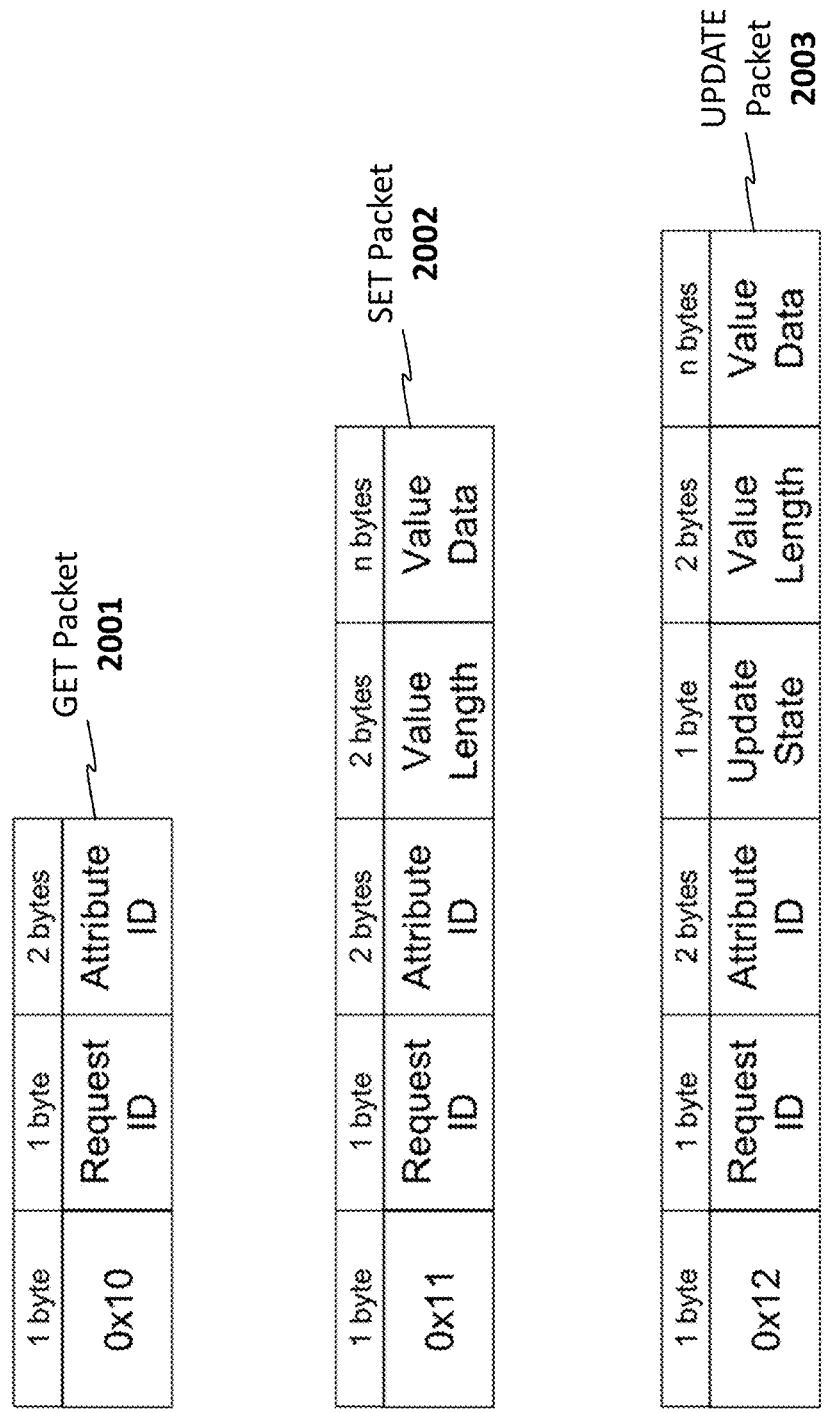
FIG. 20 illustrates an exemplary set of command packets employed in one embodiment of the invention.

FIG. 20 illustrates exemplary packet formats used for GET, SET, and UPDATE in accordance with one embodiment of the invention. In one embodiment, these packets are transmitted over the message write <65534> and message read <65533> channels following negotiation. In the GET packet 2001, a first 1-byte field includes a value (0×10) which identifies the packet as a GET packet. A second 1-byte field includes a request ID, which uniquely identifies the current GET command (i.e., identifies the current transaction with which the GET command is associated). For example, each instance of a GET command transmitted from a service or device may be assigned a different request ID. This may be done, for example, by incrementing a counter and using the counter value as the request ID. However, the underlying principles of the invention are not limited to any particular manner for setting the request ID.

A 2-byte attribute ID identifies the application-specific attribute to which the packet is directed. For example, if the GET command is being sent to IoT device 101 illustrated in FIG. 19, the attribute ID may be used to identify the particular application-specific value being requested. Returning to the above example, the GET command may be directed to an application-specific attribute ID such as power status of a lighting system, which comprises a value identifying whether the lights are powered on or off (e.g., 1=on, 0=off). If the IoT device 101 is a security apparatus associated with a door, then the value field may identify the current status of the door (e.g., 1=opened, 0=closed). In response to the GET command, a response may be transmitting containing the current value identified by the attribute ID.

The SET packet 2002 and UPDATE packet 2003 illustrated in FIG. 20 also include a first 1-byte field identifying the type of packet (i.e., SET and UPDATE), a second 1-byte field containing a request ID, and a 2-byte attribute ID field identifying an application-defined attribute. In addition, the SET packet includes a 2-byte length value identifying the length of data contained in an n-byte value data field. The value data field may include a command to be executed on the IoT device and/or configuration data to configure the operation of the IoT device in some manner (e.g., to set a desired parameter, to power down the IoT device, etc). For example, if the IoT device 101 controls the speed of a fan, the value field may reflect the current fan speed.

The UPDATE packet 2003 may be transmitted to provide an update of the results of the SET command. The UPDATE packet 2003 includes a 2-byte length value field to identify the length of the n-byte value data field which may include data related to the results of the SET command. In addition, a 1-byte update state field may identify the current state of the variable being updated. For example, if the SET command attempted to turn off a light controlled by the IoT device, the update state field may indicate whether the light was successfully turned off.

Figure 21:
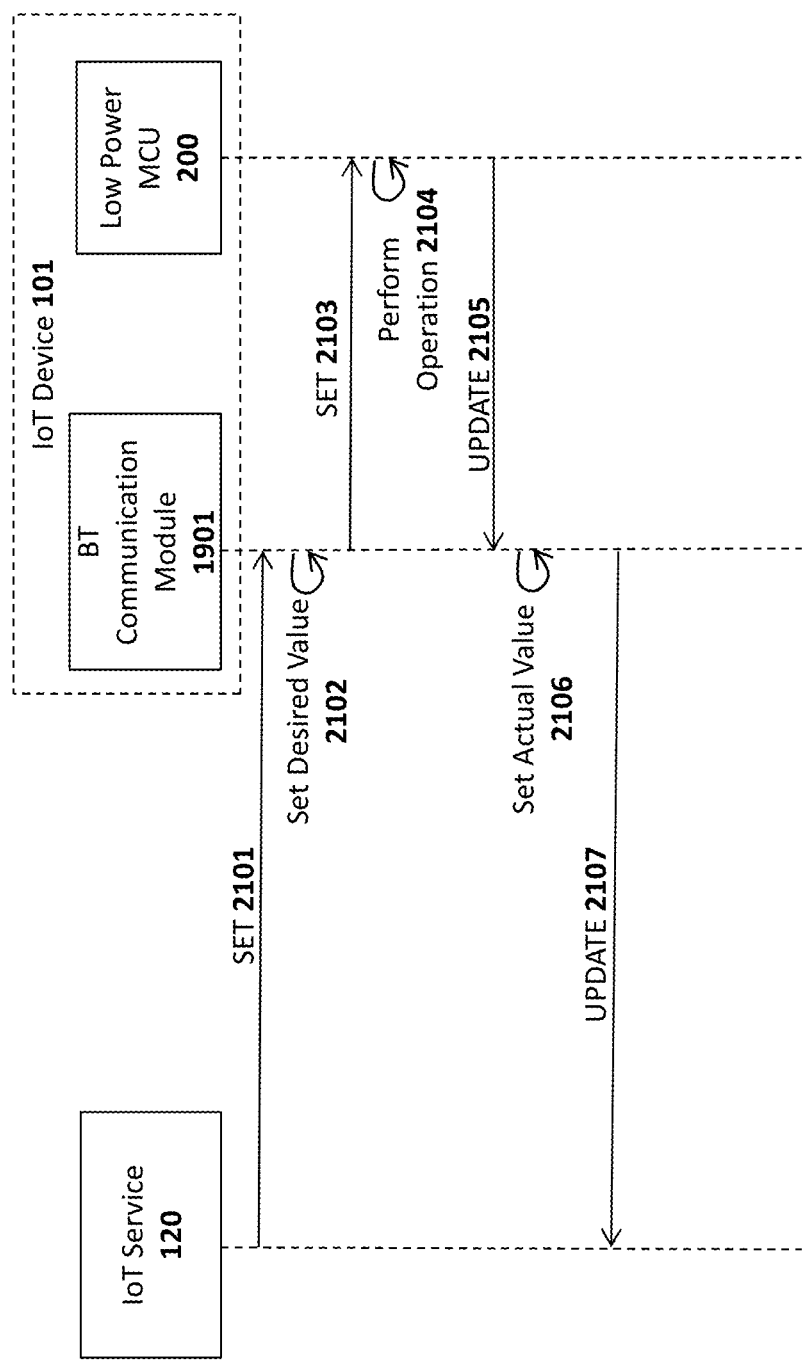
FIG. 21 illustrates an exemplary sequence of transactions using command packets.

FIG. 21 illustrates an exemplary sequence of transactions between the IoT service 120 and an IoT device 101 involving the SET and UPDATE commands. Intermediary devices such as the IoT hub and the user's mobile device are not shown to avoid obscuring the underlying principles of the invention. At 2101, the SET command 2101 is transmitted form the IoT service to the IoT device 101 and received by the BT communication module 1901 which responsively updates the GATT value buffer identified by the characteristic ID at 2102. The SET command is read from the value buffer by the low power microcontroller (MCU) 200 at 2103 (or by program code being executed on the low power MCU such as IoT device application logic 1902 shown in FIG. 19). At 2104, the MCU 200 or program code performs an operation in response to the SET command. For example, the SET command may include an attribute ID specifying a new configuration parameter such as a new temperature or may include a state value such as on/off (to cause the IoT device to enter into an "on" or a low power state). Thus, at 2104, the new value is set in the IoT device and an UPDATE command is returned at 2105 and the actual value is updated in a GATT value field at 2106. In some cases, the actual value will be equal to the desired value. In other cases, the updated value may be different (i.e., because it may take time for the IoT device 101 to update certain types of values). Finally, at 2107, the UPDATE command is transmitted back to the IoT service 120 containing the actual value from the GATT value field.

FIG. 22 illustrates a method for implementing a secure communication channel between an IoT service and an IoT device in accordance with one embodiment of the invention. The method may be implemented within the context of the network architectures described above but is not limited to any specific architecture.

At 2201, the IoT service creates an encrypted channel to communicate with the IoT hub using elliptic curve digital signature algorithm (ECDSA) certificates. At 2202, the IoT service encrypts data/commands in IoT device packets using the a session secret to create an encrypted device packet. As mentioned above, the session secret may be independently generated by the IoT device and the IoT service. At 2203, the IoT service transmits the encrypted device packet to the IoT hub over the encrypted channel. At 2204, without decrypting, the IoT hub passes the encrypted device packet to the IoT device. At 22-5, the IoT device uses the session secret to decrypt the encrypted device packet. As mentioned, in one embodiment this may be accomplished by using the secret and a counter value (provided with the encrypted device packet) to generate a key stream and then using the key stream to decrypt the packet. At 2206, the IoT device then extracts and processes the data and/or commands contained within the device packet.

Thus, using the above techniques, bi-directional, secure network socket abstractions may be established between two BT-enabled devices without formally pairing the BT devices using standard pairing techniques. While these techniques are described above with respect to an IoT device 101 communicating with an IoT service 120, the underlying principles of the invention may be implemented to negotiate and establish a secure communication channel between any two BT-enabled devices.

Figure 23B:
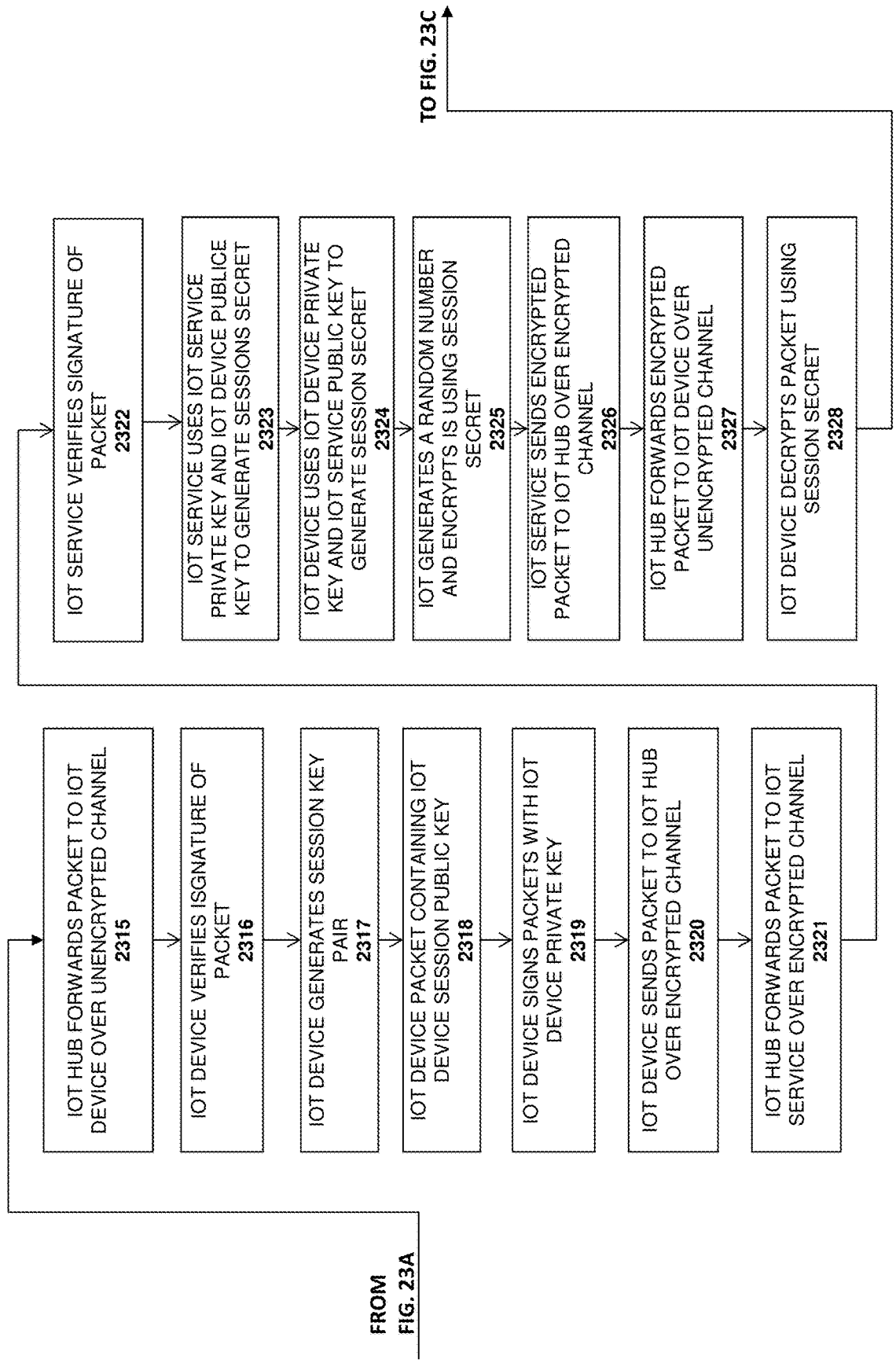

FIGS. 23A-C illustrate a detailed method for pairing devices in accordance with one embodiment of the invention. The method may be implemented within the context of the system architectures described above, but is not limited to any specific system architectures.

At 2301, the IoT Service creates a packet containing serial number and public key of the IoT Service. At 2302, the IoT Service signs the packet using the factory private key. At 2303, the IoT Service sends the packet over an encrypted channel to the IoT hub and at 2304 the IoT hub forwards the packet to IoT device over an unencrypted channel. At 2305, the IoT device verifies the signature of packet and, at 2306, the IoT device generates a packet containing the serial number and public key of the IoT Device. At 2307, the IoT device signs the packet using the factory private key and at 2308, the IoT device sends the packet over the unencrypted channel to the IoT hub.

At 2309, the IoT hub forwards the packet to the IoT service over an encrypted channel and at 2310, the IoT Service verifies the signature of the packet. At 2311, the IoT Service generates a session key pair, and at 2312 the IoT Service generates a packet containing the session public key. The IoT Service then signs the packet with IoT Service private key at 2313 and, at 2314, the IoT Service sends the packet to the IoT hub over the encrypted channel.

Turning to FIG. 23B, the IoT hub forwards the packet to the IoT device over the unencrypted channel at 2315 and, at 2316, the IoT device verifies the signature of packet. At 2317 the IoT device generates session key pair (e.g., using the techniques described above), and, at 2318, an IoT device packet is generated containing the IoT device session public key. At 2319, the IoT device signs the IoT device packet with IoT device private key. At 2320, the IoT device sends the packet to the IoT hub over the unencrypted channel and, at 2321, the IoT hub forwards the packet to the IoT service over an encrypted channel.

At 2322, the IoT service verifies the signature of the packet (e.g., using the IoT device public key) and, at 2323, the IoT service uses the IoT service private key and the IoT device public key to generate the session secret (as described in detail above). At 2324, the IoT device uses the IoT device private key and IoT service public key to generate the session secret (again, as described above) and, at 2325, the IoT device generates a random number and encrypts it using the session secret. At 2326, the IoT service sends the encrypted packet to IoT hub over the encrypted channel. At 2327, the IoT hub forwards the encrypted packet to the IoT device over the unencrypted channel. At 2328, the IoT device decrypts the packet using the session secret.

Turning to FIG. 23C, the IoT device re-encrypts the packet using the session secret at 2329 and, at 2330, the IoT device sends the encrypted packet to the IoT hub over the unencrypted channel. At 2331, the IoT hub forwards the encrypted packet to the IoT service over the encrypted channel. The IoT service decrypts the packet using the session secret at 2332. At 2333 the IoT service verifies that the random number matches the random number it sent. The IoT service then sends a packet indicating that pairing is complete at 2334 and all subsequent messages are encrypted using the session secret at 2335.

Embedded Internet of Things (IOT) Hub, System, and Method

As mentioned above, adoption of IoT functionality in home appliances has been limited for a variety of reasons including, for example, a lack of wireless expertise, high certification costs (particularly when cellular is involved), and antenna size and requirements (which change based on the wireless system each antenna supports). IoT ecosystems are evolving which means there is a need for a flexible IoT implementation for appliances that can be upgraded when needed without changing the underlying appliance.

One embodiment of the invention addresses these issues by providing a modular mechanical and electrical design for the IoT hub, allowing it to be interfaced with various different types of appliances. In particular, in one embodiment, each appliance is equipped with a consistent interface slot having predetermined mechanical and electrical specifications which allows for the attachment of an embedded IoT unit (referred to herein as an "embedded IoT hub"). In addition, in one embodiment, each embedded IoT hub includes a standardized mechanical and electrical antenna interface to provide for the attachment of one or more antenna module that also have a predefined mechanical/electrical interface for attachment to the embedded IoT hub via the antenna interface.

In addition, in one embodiment, the embedded IoT hub is equipped with a local wireless communication interface such as a Bluetooth Low Energy (BTLE) controller to automatically establish a local wireless communication channel with a wireless communication device within the appliance. For example, when seated within the interface slot of the appliance, the BTLE controller within the embedded IoT hub automatically connects to a BTLE controller within the appliance. The BTLE controller within the appliance may itself be communicatively coupled to sensors or other IoT devices within the appliance. Thus, once the local wireless communication channel is established within the appliance, the appliance may provide data collected via its sensors and receive data and commands from the embedded IoT hub.

Significantly, communication with the appliance may be established as described above without re-certifying the appliance. Rather, once the appliance has been certified to establish a local wireless communication channel using BTLE (or other local wireless protocol), it does not need to be re-certified for use with the embedded IoT hub (which is certified separately from the appliance). This is a significant improvement over existing systems which require a separate, costly re-certification of each appliance (particularly when cellular is involved).

Figure 24:
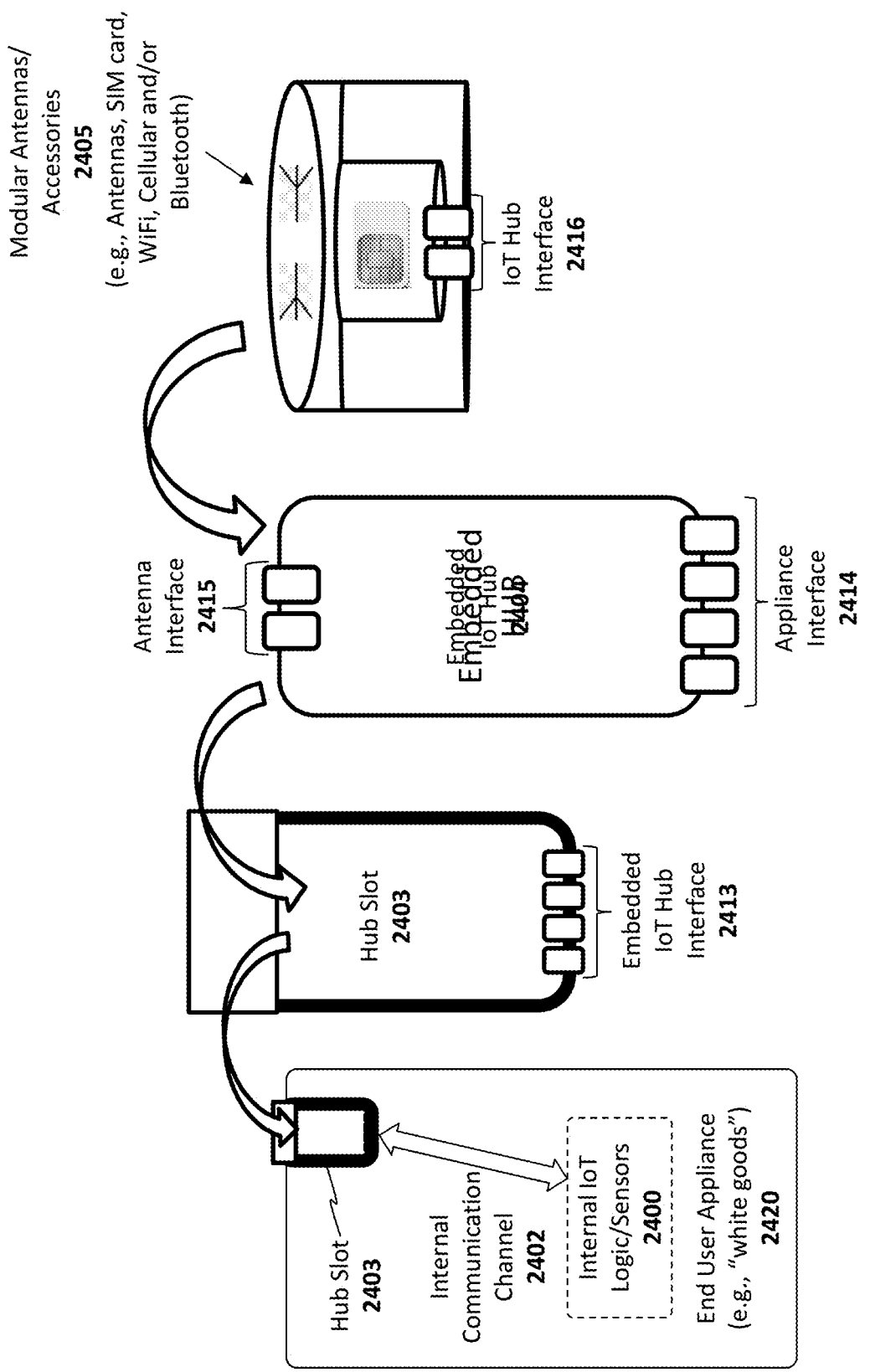
FIG. 24 illustrates an exemplary embedded hub and modular antenna system in accordance with one embodiment of the invention.

FIG. 24 illustrates a system architecture in accordance with one embodiment of the invention in which an end user appliance 2420 is configured with a standardized IoT hub slot 2401 comprising standardized electrical and mechanical specifications (some examples of which are set forth below). Specifically, the hub slot 2403 is formed using spatial dimensions corresponding to the dimensions of the enclosure of the IoT hub 2404 and also includes an embedded IoT hub interface 2413 for electrically coupling to an appliance interface 2414 on the embedded IoT hub 2404. In addition, one embodiment of the embedded IoT hub 2404 includes an antenna interface 2415 to communicatively couple with an IoT hub interface 2416 on a modular antenna 2405. As described in detail below, various different forms of modular antennas may be coupled to the antenna interface 2415 depending on the types of wireless technologies to be used to connect the appliance to the Internet. In one embodiment, modular antennas 2405 may include antennas designed for any combination of BTLE, WiFi, and Cellular communication (e.g., 4G/LTE, 5G, etc). In addition, the modular antennas 2405 may be equipped with other accessories such as subscriber identity module (SIM) cards required to connect over various different wireless networks, security chips for performing encryption and digital signatures, and barcode or QR code readers for reading barcodes/QR codes as described herein.

Figure 25:
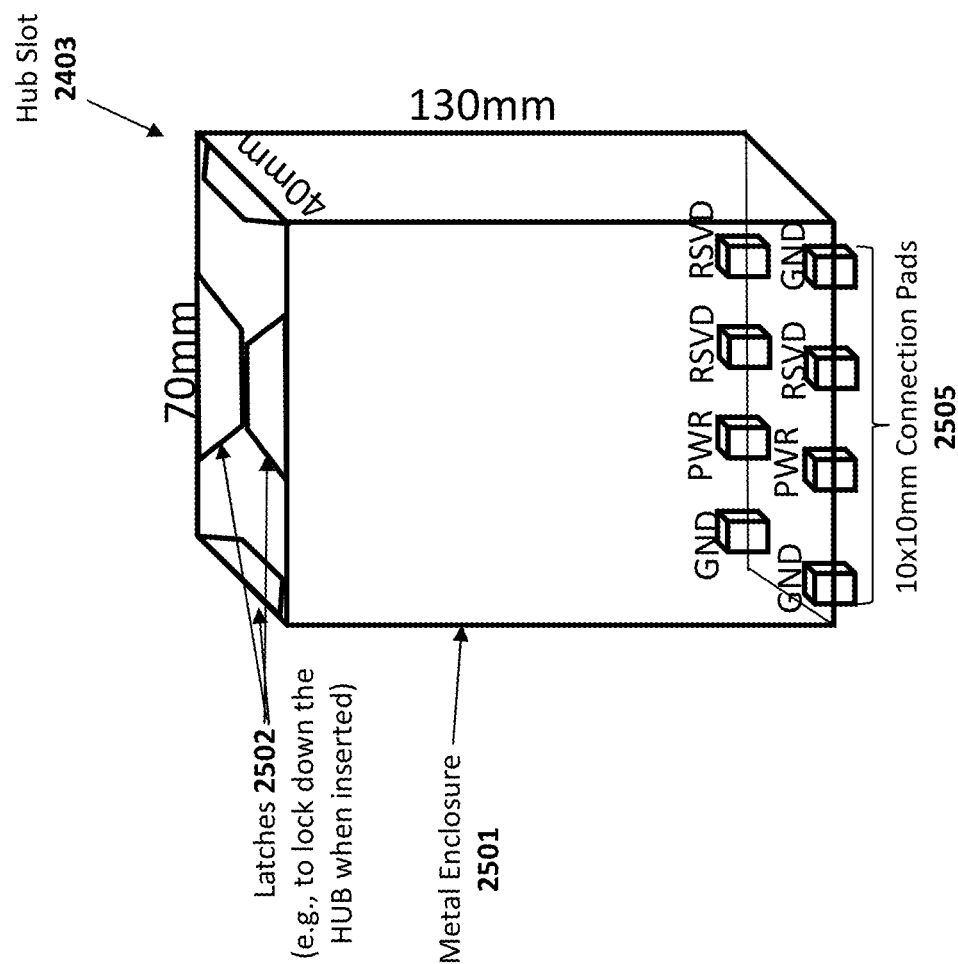
FIG. 25 illustrates an embedded hub in accordance with one embodiment of the invention.

As illustrated in FIG. 25, one exemplary embodiment of the IoT hub slot 2403 is formed from a metal enclosure 2501 with the dimensions of 130 mm×40 mm×70 mm. Of course, the underlying principles of the invention are not limited to any particular set of dimensions. An exemplary IoT hub interface 2413 is provided at the bottom of the slot and comprises a plurality of 10 mm×10 mm connection pads 2505, which interconnect with corresponding connection pads on the IoT hub (see, e.g., 7×7 mm connection pads 1501 described below with respect to FIG. 27). In addition, a set of latches 2502 are formed on top of the slot 2403 to lock down the IoT hub 2404 when inserted into the slot.

In the illustrated embodiment, 8 electrical connection pads 2505 are included including ground (GND) and power (PWR) pads which are electrically coupled to the ground plane and the power supply, respectively, of the appliance. Some number of pads (four in the example) are reserved for future electrical purposes. In an alternate embodiment, the pads may include a set of communication pads to communicatively couple the IoT hub to a wired communication channel within the appliance (e.g., Ethernet, USB, etc).

Figure 26:
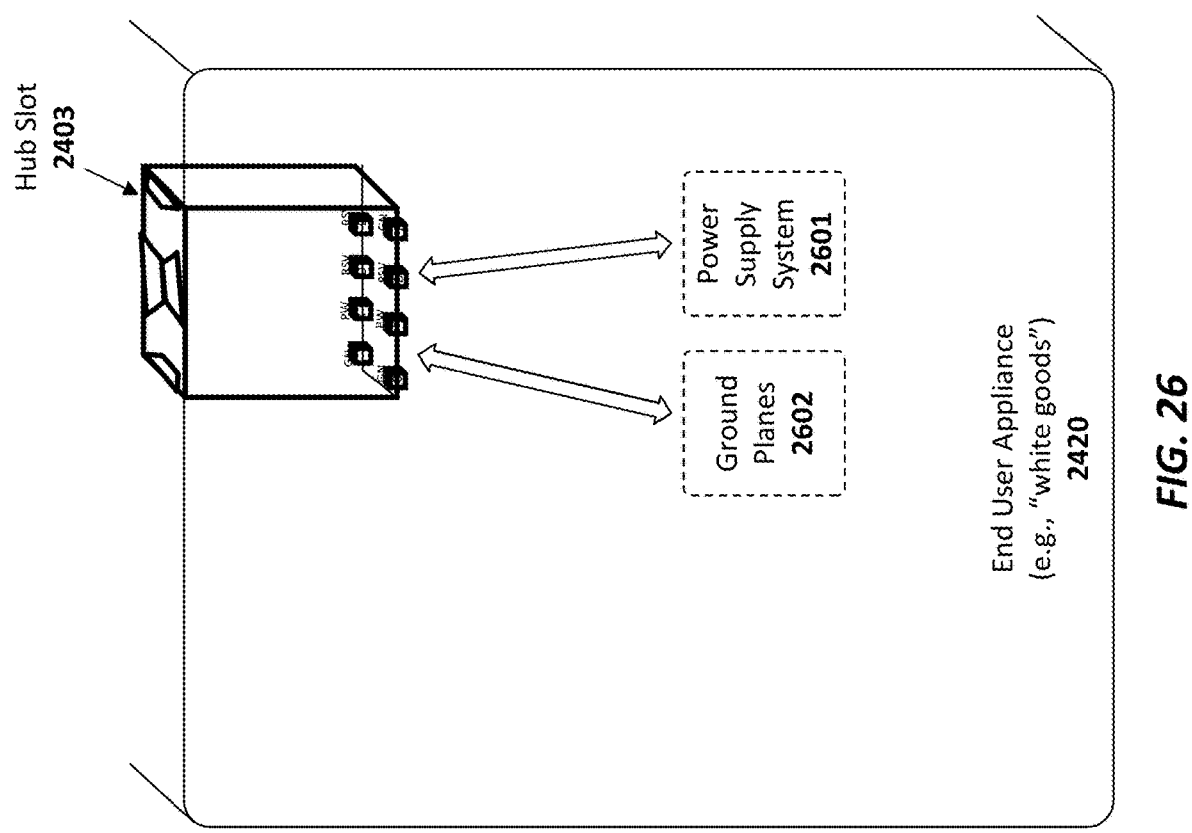
FIG. 26 illustrates an exemplary embedded hub within an exemplary appliance.

FIG. 26 illustrates additional details associated with integration of the hub slot 2403 within the appliance 2420. As mentioned, in one embodiment, the ground plane(s) 2602 of the appliance 2420 are coupled to the GND pads and the power supply system 2601 is configured to supply a voltage to the PWR pads on the hub slot 2403. In addition, in an embodiment which includes a wired internal connection, an internal communication channel (not shown) may be coupled to communication pads within the slot.

It should be noted that the slot 2403 illustrated in FIG. 26 and the other figures is not drawn to scale. In many implementations, the size of the slot will be significantly smaller relative to the appliance than what is shown in these figures (particularly with respect to larger appliances such as refrigerators, washers, dryers, etc). In addition, while illustrated at the top of the appliance 2420, in the figures, the hub slot 2403 may be placed in various alternate positions in the appliance (e.g., on the back, on the side, etc).

Figure 27:
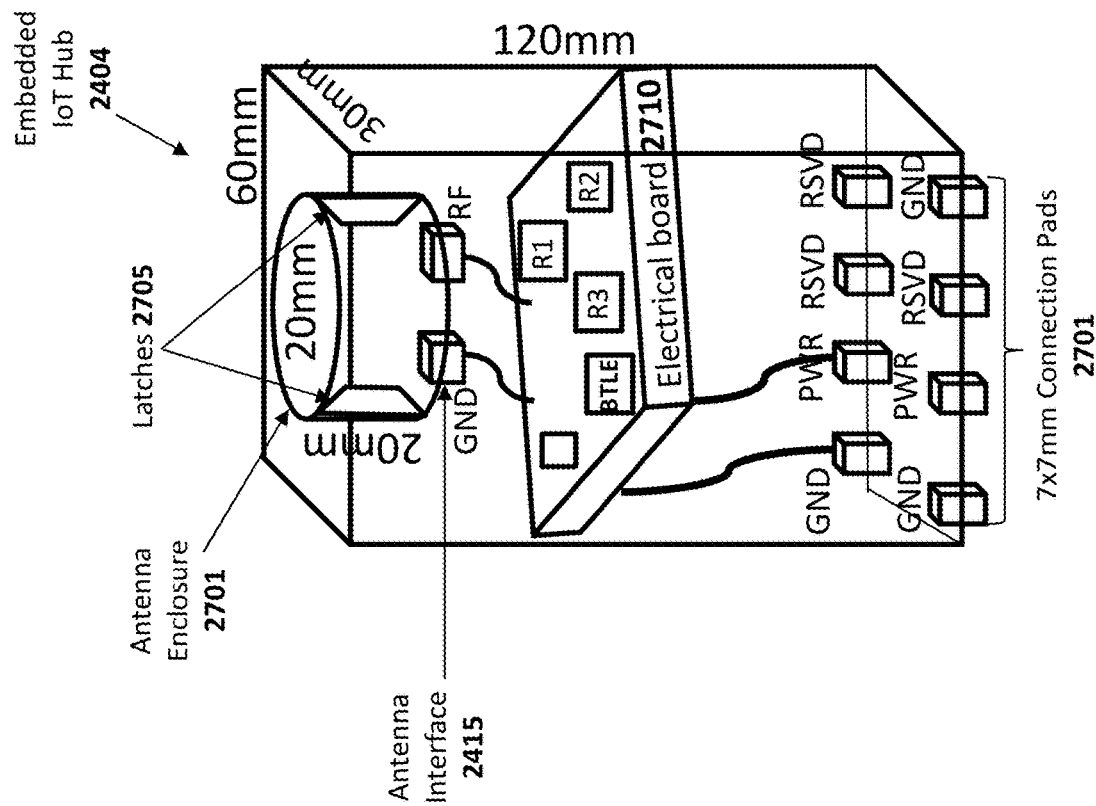
FIG. 27 illustrates an exemplary embedded hub device comprising a plurality of connection pads, an electrical board comprising one or more radio devices, and latches.

As illustrated in FIG. 27, one embodiment of the embedded IoT hub 2404 includes an enclosure designed to fit within the IoT slot 2403. In the particular example shown in FIG. 27, the enclosure is formed from dimensions of 120 mm×30 mm×60 mm, although the underlying principles of the invention are not limited to any particular set of dimensions. An electrical board 2710 such as a printed circuit board (PCB) may be coupled to the enclosure and may include a variety of different communication chips electrically coupled thereon including a BTLE chip and one or more other radio chips (R1, R2, R3). Of course, in an alternate embodiment, a single integrated circuit chip may be used which supports all of the communication protocols described herein. As mentioned, the internal electrical design of the embedded hub can vary based on the target radios that need to be supported. In the illustrated embodiment, 7×7 mm electrical connection pads on the bottom of the IoT hub 2404 match the defined locations of connection pads 2505 in the IoT hub slot 2403.

Electrical wiring (or other conductive material) connects at least one of the ground pads and one of the power pads of the hub connection pads 2701 to supply power to the electrical board 2710. In addition, a ground wire and RF wire from the electrical board 2710 are coupled to the ground and RF pads, respectively, of the antenna interface 2415.

In one embodiment, a circular antenna module enclosure 2701 formed at the top of the embedded IoT hub 2404 has a 20 mm diameter and 20 mm depth. A set of latches 2705 are provided to latch the antenna module in place when inserted into the enclosure 2701. In addition, the antenna module enclosure 2701 includes two electrical connection pads 2415 (e.g., RF and GND) that are 4×4 mm (in one embodiment). As mentioned, in one embodiment, the IoT hub 1204 will be certified as a stand-alone wireless device and go through the required Federal Communications Commission (FCC) and carrier-related certifications prior to insertion into the appliance. For certification, the IoT hub 1204 may be paired with various different antenna modules (as described below).

The embedded IoT hub 1204 described herein may support a variety of target designs including (but not limited to), the following:

1. WiFi+BTLE hub for low cost connectivity design. Though the electrical board inside the HUB will be smaller, the mechanical enclosure and design of the embedded hub should stay the same.
2. WiFi+Cellular+BTLE hub for high-end connectivity design that supports WiFi and/or Cellular. Though the electrical board inside the IoT hub will be smaller, the mechanical enclosure and design of the embedded hub should stay the same.
3. Cellular+BTLE hub for mid-level connectivity design. Though the electrical board inside the IoT hub will be smaller, the mechanical enclosure and design of the embedded hub should stay the same.
4. Cellular+BTLE+Zigbee hub for home automation high end connectivity design.
5. WiFi+BTLE+Z-Wave hub for home automation high end connectivity design.

Different antenna modules may be integrated to the embedded IoT hub 1204 to enable the above functionalities. Examples are described below with respect to FIGS. 29-31.

Figure 28:
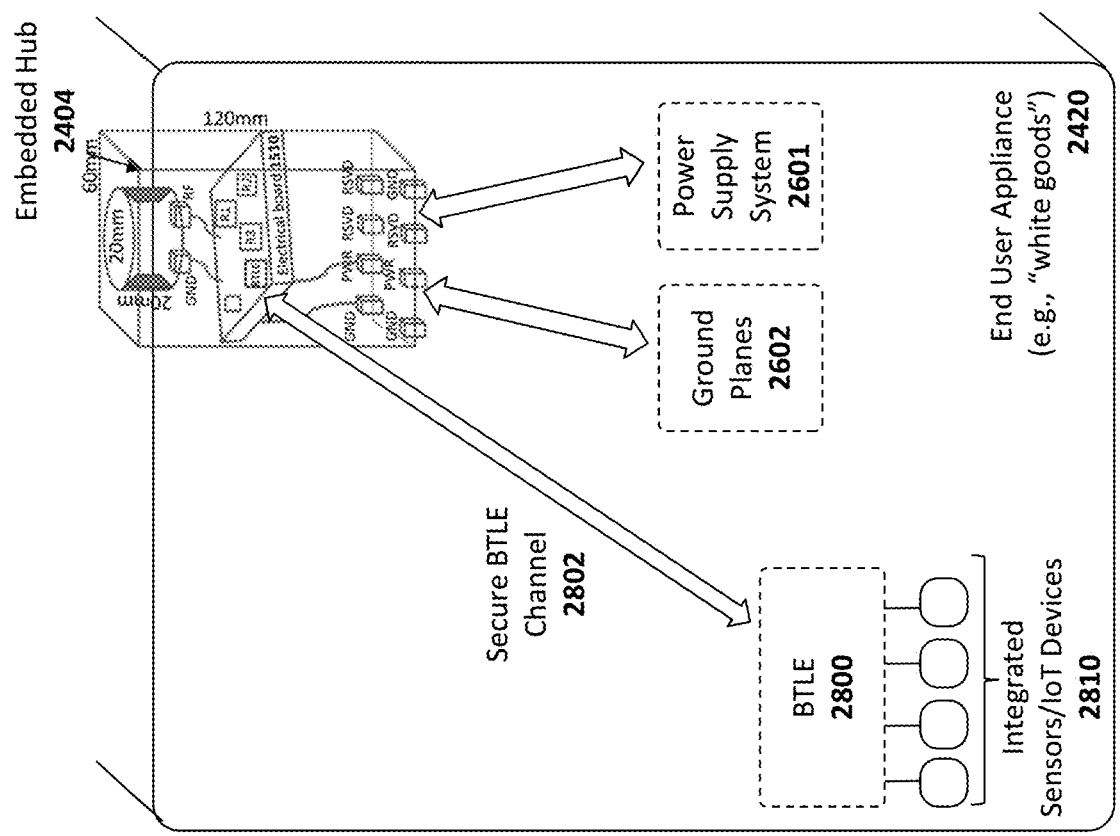
FIG. 28 illustrates an exemplary embedded hub communicating with an appliance using Bluetooth Low Energy (BTLE)

As illustrated in FIG. 28, in one embodiment, a secure BTLE channel 2802 is established between the BTLE radio/controller on the electrical board 2710 and a BTLE radio/controller 2800 integrated within the appliance 1220. The BTLE radio/controller 2800 may be configured to automatically pair with the BTLE controller on the electrical board 2710 when the appliance is purchased by an end user along with an embedded IoT hub 1204. Standard BTLE pairing techniques may also be employed. Once the connection is established integrated IoT sensors and/or IoT devices 2810 within the appliance may communicate through the embedded IoT hub over the Internet.

Figure 29A:
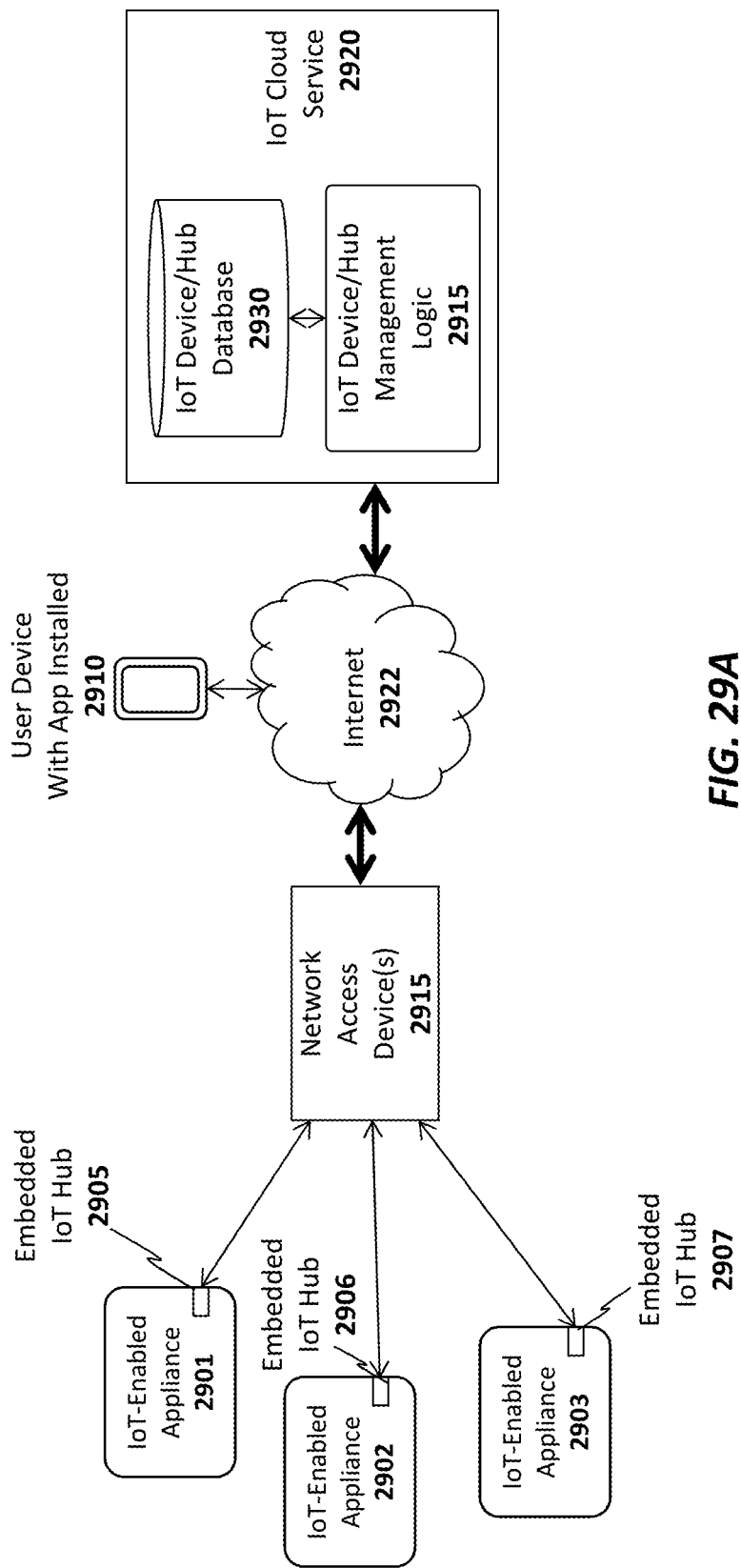
FIGS. 29A-B illustrate exemplary system architectures in which embodiments of the invention may be employed.

FIG. 29A illustrates a high level system architecture which shows three IoT enabled appliances 2901-2903 equipped with embedded IoT hubs 2905-2907, respectively, which connect the appliances over the Internet 2922 via one or more network access devices 2915 (e.g., cell towers, WiFi access points, etc). In an alternate embodiment shown in FIG. 29B, only one IoT-enabled appliance 2902 is equipped with an embedded IoT hub 2956 which acts as a central point of connectivity for the other IoT-enabled appliances, 2901 and 2903. For example, these other appliances 2901, 2903 may include IoT devices 2955, 2957 with wireless network interfaces for establishing local wireless connections (e.g., BTLE connections) with the IoT hub 2956. As in various embodiments discussed above, the IoT hub 2956 provides these devices and various other IoT devices (not shown) with connectivity over the Internet 2922.

Figure 29B:
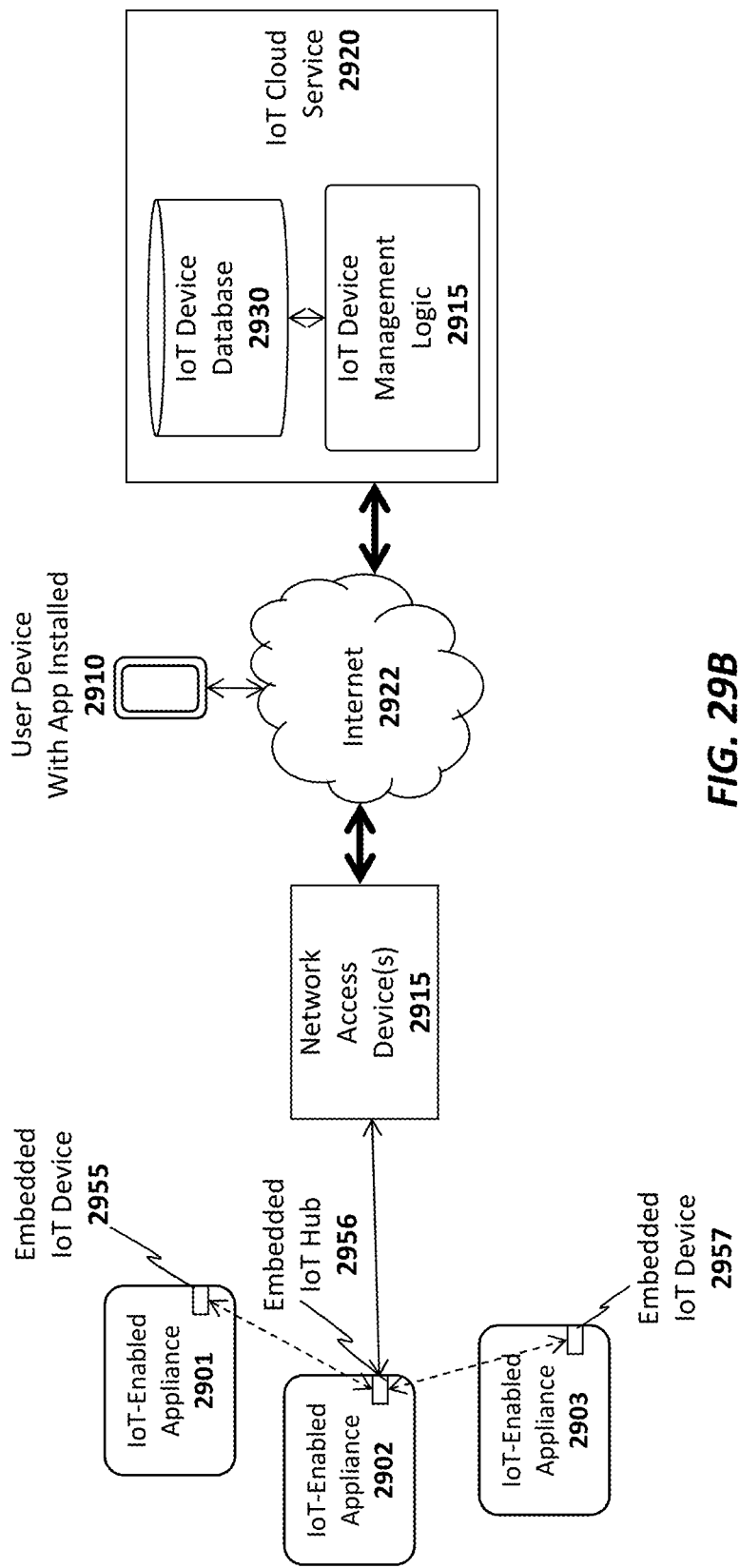

The interaction between the various system components shown in FIGS. 29A-B may occur as described above. For example, the IoT hubs 2905-2907 (or a single IoT hub 2956 in FIG. 29B) establish a communication channel with the IoT cloud service 2920 over the Internet 2922 to transmit and receive data and receive commands directed to the various appliances 2901-2903. In the illustrated embodiment, the IoT cloud service 2920 includes an IoT device/hub database 2930 comprising database records for each of the IoT hubs and IoT devices configured in the system. IoT device/hub management logic 1215 creates the database records for new IoT hubs/devices and updates the IoT hub/device records in response to data transmitted by each of the IoT hubs/devices.

The IoT device management logic 1215 may also implement the various security/encryption functions described above to add new devices to the system (e.g., using QR codes/barcodes) and use keys to encrypt communications and/or generate digital signatures when communicating with the IoT-enabled appliances 2901-2903. In one embodiment, a user may access information related to each of the IoT-enabled appliances 2901-2903 and/or control the appliances via an app installed on a user device 2910 which may be a smartphone device such as an Android® device or iPhone®. In addition, the user may access and control the IoT-enabled appliances 2901-2903 via a browser or application installed on a desktop or laptop computer.

In one embodiment, control signals such as commands transmitted from the app or application on the user device 2910 are passed to the IoT cloud service 2920 over the Internet 2922, then forwarded from the IoT cloud service to the IoT hubs 2905-2907 (or a single central hub 2956). The IoT hubs may process the control signals and/of forward the control signals to one or more of the IoT devices and/or sensors within the IoT-enabled appliances 2901-2903. Of course, the underlying principles of the invention are not limited to any particular manner in which the user accesses/controls the various IoT hubs and devices. For example, the user may transmit a control signal to turn on/off a particular IoT-enabled appliance or to take current readings from a sensor within the IoT-enabled appliance.

The embedded IoT hub 1204 described herein may be used for a variety of different applications. As described above, the embedded IoT hubs 2905-2907 may be used as the primary communication channel between the appliance and the IoT cloud service 2920, by connecting via cellular networks and/or the user's home WiFi network. In one embodiment, the embedded IoT hub may be configured to act as a WiFi extender, effectively extending the reach of the user's WiFi network. In the example shown in FIG. 29A, for example, each embedded IoT hub 2905-2907 may connect to a WiFi network access device 2915 and extend the WiFi signal to other WiFi devices in the user's home. In addition, in one embodiment, each embedded IoT hub 2905-2907 may be used to establish a direct wireless connection channel between the IoT-enabled appliances 2901-2903 and the user device 2910 with an IoT app installed thereon (i.e., to allow the user direct access via a BTLE channel, rather than communicating through the IoT cloud service 2920).

In one embodiment, each embedded IoT hub is considered an accessory which may be purchased as an add-on by the customer when the appliance is purchased. Alternatively, the embedded IoT hub may be added to the appliance by the original device manufacturer (ODM), the consumer electronics company (CE), and/or the retailer.

Figure 30:
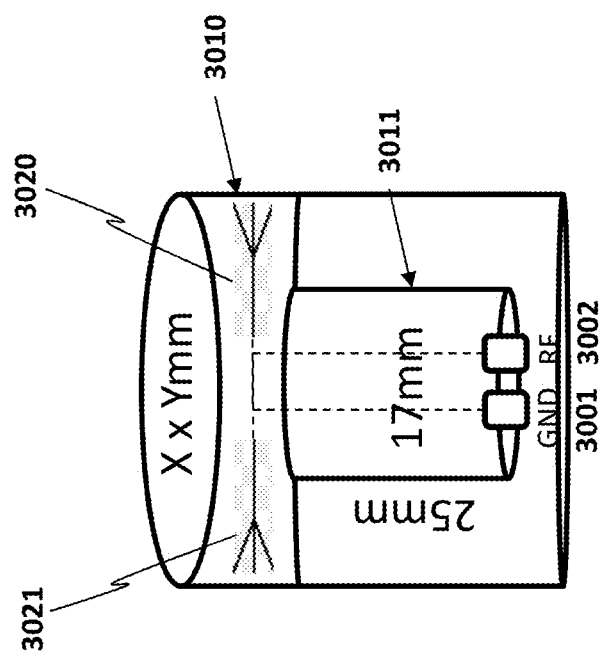
FIGS. 30-32 illustrate exemplary modular antennas configured to be coupled to embedded hubs.
Figure 31:
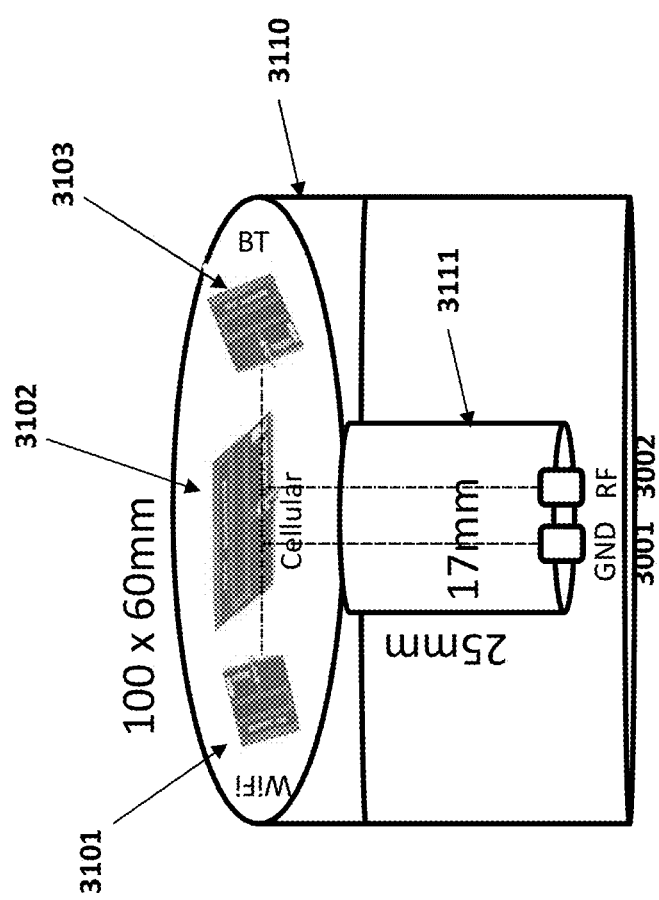
Figure 32:
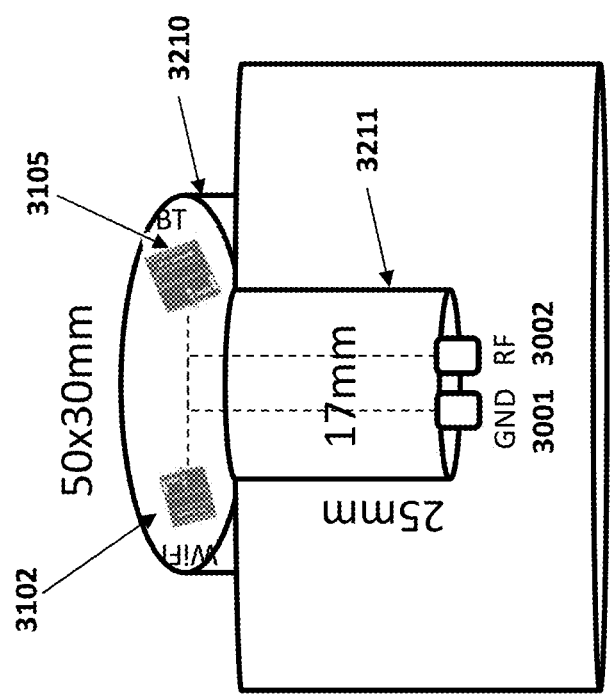

FIGS. 30-32 illustrate exemplary modular antennas which may be coupled to different embedded IoT hubs in accordance with different embodiments of the invention. These embodiments are all formed with a circular or "mushroom" shape to conserve space. In one embodiment, the antenna size may vary depending on variables such as antenna design topology, frequency bands supported, desired target performance, antenna material, the number of antennas, and the isolation requirements between the antennas. Of course, some of these variables will depend on the set of wireless communication protocols to be supported by the antenna (e.g., frequency bands and number of antennas). The mushroom design described herein solves the size problem while maintaining a standard modular design.

FIG. 30 illustrates an exemplary embodiment of an antenna module with a lower cylindrical section 3011 comprising the ground pad 3001 and RF pad 3002 and an upper cylindrical section 3010 containing the antennas 3020-3021. As illustrated, connectors running through the lower cylindrical section 3011 electrically couple the pads 3001-3002 to the antenna material 3020-3021 in the upper section 3010. While two antennas are shown in FIG. 30, various different antennas may be used (depending on the implementation).

In one exemplary embodiment, the lower cylindrical section 3011 of the module has a 17 mm diameter with a depth of 25 mm (i.e., designed to fit within the antenna enclosure 2701 shown in FIG. 27). One embodiment of this section includes 4×4 electrical pads that are defined as ground (GND) 3001 and RF feed 3002. The upper section 3010 of the antenna module is flexible and can be sized according to the antenna requirements (as indicated by X×Y mm).

FIG. 31 illustrates on particular embodiment in which the upper section 3110 includes a WiFi antenna 3101, a cellular antenna 3102, and a Bluetooth LE antenna 3103, each coupled to a GND pad 3001 and an RF pad 3002. Note that while only two pads 3001-3002 are illustrated in FIG. 31, more pads than illustrated may be used to provide connectivity for the various different antennas 3101-3103. In this example, the cellular antenna 3102 may support LTE cellular frequency bands (13/4), the WiFi antenna 3101 may support WiFi 2.4 Ghz+5 Ghz frequency bands, and the BTLE antenna 3103 may support BT 2.4 Ghz frequency bands. In one embodiment, isolation between the WiFi and Cellular antennas is at least −20 dB.

In addition, in one embodiment, the cellular antenna 3102 comprises a planar inverted-F antenna structure or an inverted-F PCB (FPCB) antenna structure and the WiFi antenna 3101 and/or BTLE antenna 3101 comprise PCB Dipole antennas. In one embodiment, the WiFi and BTLE antennas may be implemented as a single, integrated antenna. In one embodiment, the WiFi and BTLE antenna section may be implemented with an approximate size of 33×12 mm and the cellular antenna section may be implemented with an approximate size of 30×20 mm.

In one embodiment, isolation between the WiFi/BT and the cellular antennas is accomplished with a distance of 15 mm. The upper section 3110 of the mushroom shape in the embodiment shown in FIG. 31 is 100×60 mm while the lower section 3111 is 25 mm (length)×17 mm (diameter).

FIG. 32 illustrates another embodiment of the modular antenna which includes one WiFi antenna 3102 and one BTLE antenna 3105. In this embodiment, the antenna module supports the WiFi 2.4 Ghz and 5 Ghz bands and BTLE 2.4 Ghz bands. In one embodiment, the a PCB dipole antenna is used. Isolation between WiFi and BT antennas in this embodiment is 00 dB. In one embodiment, the WiFi+BT dual band antenna section is 33×12 mm. The upper section 3210 of the mushroom shape in the embodiment shown in FIG. 32 is 50×30 mm while the lower section 3211 is 25 mm (length)×17 mm (diameter).

Figure 33:
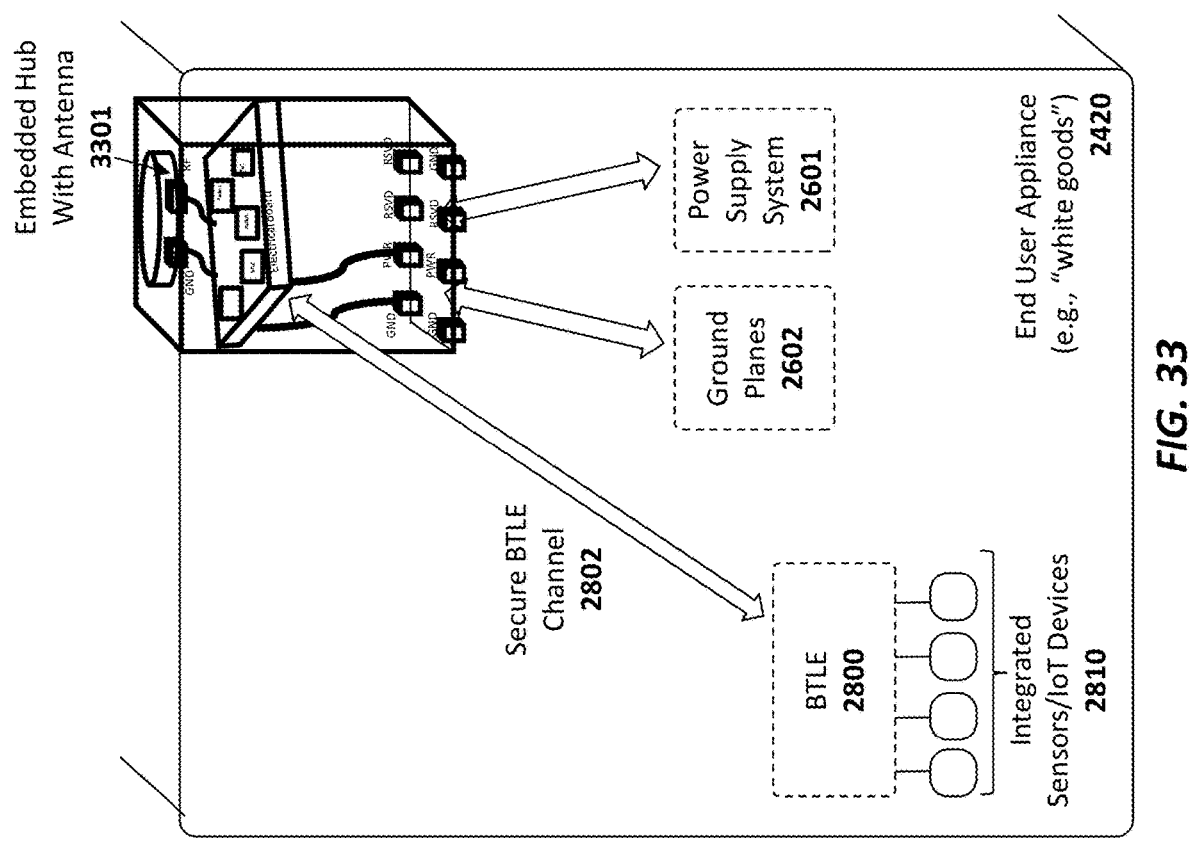
FIG. 33 illustrates an exemplary embedded hub integrated within an exemplary appliance and with a modular antenna attached thereto.

FIG. 33 illustrates an exemplary embodiment showing an embedded hub with an antenna module 3301 inserted into the slot in an end user's appliance 1220. In one embodiment, the antenna module is inserted inside the embedded IoT hub's designated opening. In one embodiment, the design of the embedded IoT hub's opening and the antenna module will guarantee the mushroom side of the antenna module (i.e., the upper section 3110) is always positioned on top or on the side of the appliance, not enclosed and surrounded by metal (which would inhibit RF reception). In one embodiment, the thickness of the mushroom section of the antenna module will guarantee a clearance between the antenna itself and the white good metal. The antenna module may be used when certifying the embedded IoT hub (i.e., multiple different combinations of IoT hubs and antenna modules may be individually certified).

In one embodiment, appliance (e.g., "white good") vendors may integrated the IoT hub slot 1203 in appliances for a small additional cost (e.g., $2.00). In one embodiment, the embedded IoT hub is designed as a stand-alone IoT hub that follows the mechanical design roles of the IoT hub slot 1203 and may include any wireless technologies chosen by the ODM. As mentioned, the embedded IoT hub may be certified one time only, to reduce time and cost, and can be licensed to consumer electronics (CE) manufacturers as long as it follows slot mechanical design.

System and Method for Intergrating and Internet of Things (IOT) Radio Module in an Appliance As described above, appliances are typically large, metal boxes that present challenges for wireless connectivity within the radio frequency (RF) band because they do not provide clean places to site an antenna. Additionally, appliances such as ovens or ranges have thermal issues because their primary function of cooking food means that the ambient temperature inside the appliance enclosure may be greater than 85° C. and in some cases greater than 100° C. These temperatures present challenges for electronics and, in particular, for active electronics such as radio modules and micro-controller (MCUs) units. These applications typically require the use of components with extended industrial temperature ratings, raising the cost and limiting the choices available to engineers. Crystal accuracy is also a significant problem as the wide temperature swings require either expensive TCXOs (Temperature Compensated Crystal Oscillators) or XTALs (crystals) with tight manufacturing tolerances with a more limited lifetime.

Antenna designs are also complicated by the fact that wide temperature swings cause changes in tuning and performance, requiring the use of specialized materials in order to mitigate the effects of wide temperature extremes on antenna performance. Thus, the wide temperature ranges seen in certain appliance applications present severe challenges for electronics, requiring the use of exotic and expensive materials, compromises in performance, and/or reductions in product lifetimes.

The embodiments of the invention implement techniques for configuring a radio module and an antenna within a handle of an appliance. Power and communication from the host device may be coupled to the radio module by routing a multi-conductor wiring harness. Radio signals from the radio module may be routed to the antenna(s) by routing a coaxial cable within the handle. As discussed below, in one embodiment, the antenna may be formed using a non-conductive gap formed where the handle mounts to the appliance outer enclosure. Alternatively, other embodiments may integrate the antenna (and potentially the RF circuitry and/or IoT device) within the structure of the handle itself.

Placing the RF circuitry and antenna in the handle provides for an environment which is significantly cooler than 85° C. because it is a surface that has to be touched by humans during normal operation of the appliance (See, e.g., UL limitations on enclosure temperature limits). This reduces the complexity and length of the RF coax cable routing, provides two natural antenna locations for diversity if desired, and allows for cheaper cable runs of just power and asynchronous serial communication (e.g., UART). This may also allow higher output power to be used because the reduced ambient temperature seen by the RF circuitry allows for greater self-heating of the module without exceeding thermal constraints as well as potentially shorter runs of coaxial cable which reduces RF signal loss in the cable.

Figure 34:
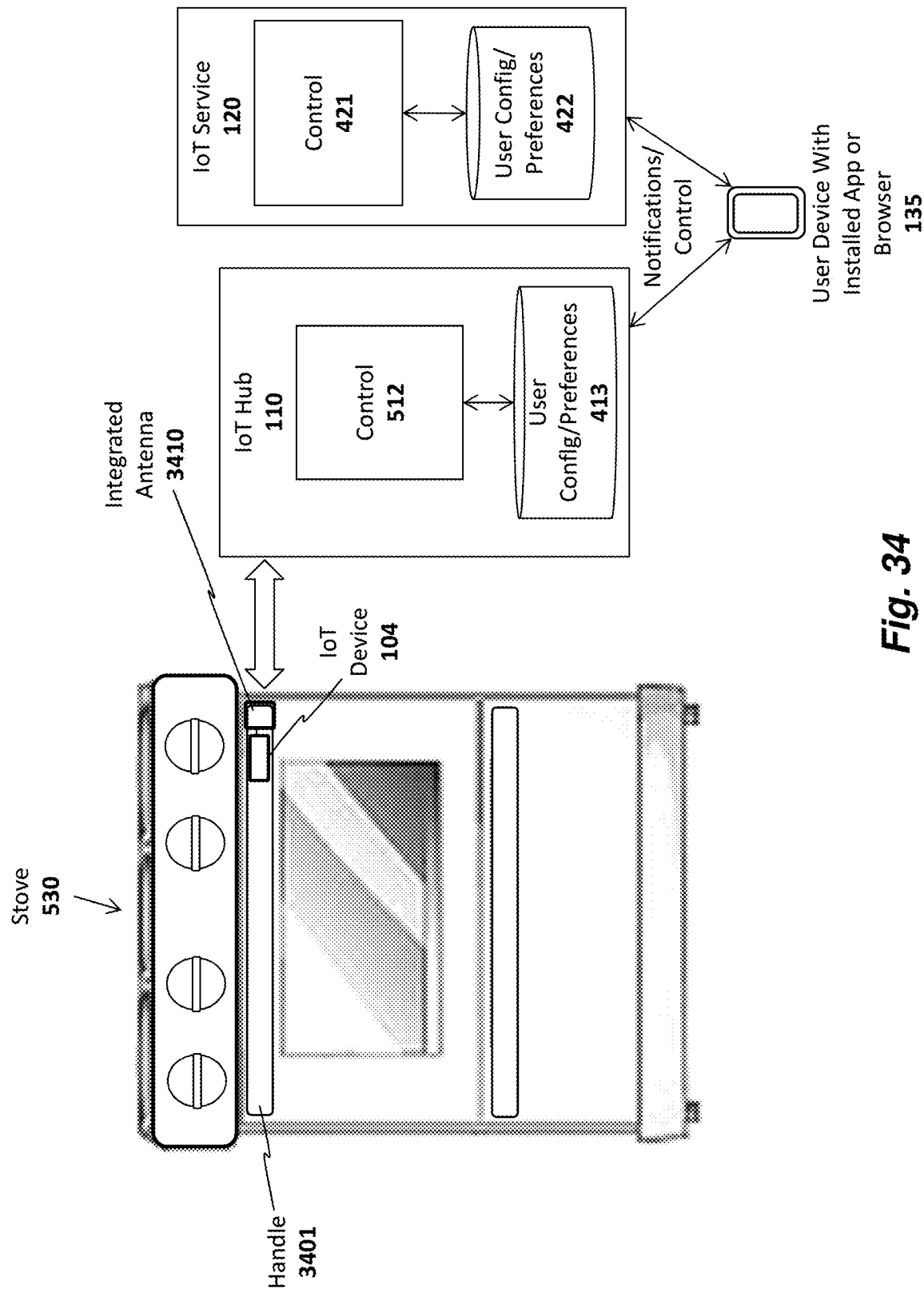
FIG. 34 illustrates an exemplary system for integrating an IoT device and/or antenna within an appliance handle.

FIG. 34 illustrates one such implementation in which a handle 3401 of a stove 530 is configured with an integrated antenna 3410 and corresponding IoT device 104 (with RF circuitry). The IoT device 104 may be positioned in a different location from what is shown and coupled to the integrated antenna via a coaxial or other type of cable. As in prior embodiments, the IoT device 104 communicates to the IoT service 120 through an IoT hub 110, which may be an independent unit and/or which may be integrated within a mobile user device 135 (e.g., running as a software hub within the user device 135). Alternatively, the IoT hub 110 may itself be embedded within the appliance 530 and configured to connect to the Internet (and IoT service 120) via WiFi or other network link (e.g., Ethernet).

Figure 35A:
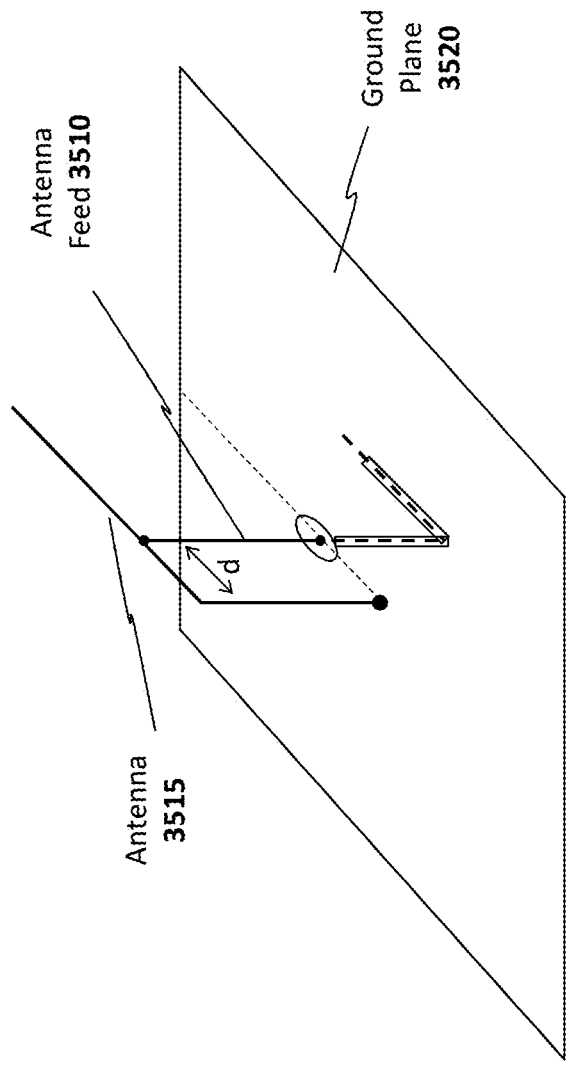
FIGS. 35A-B illustrate different types of antennas which may be integrated within an appliance handle.
Figure 35B:
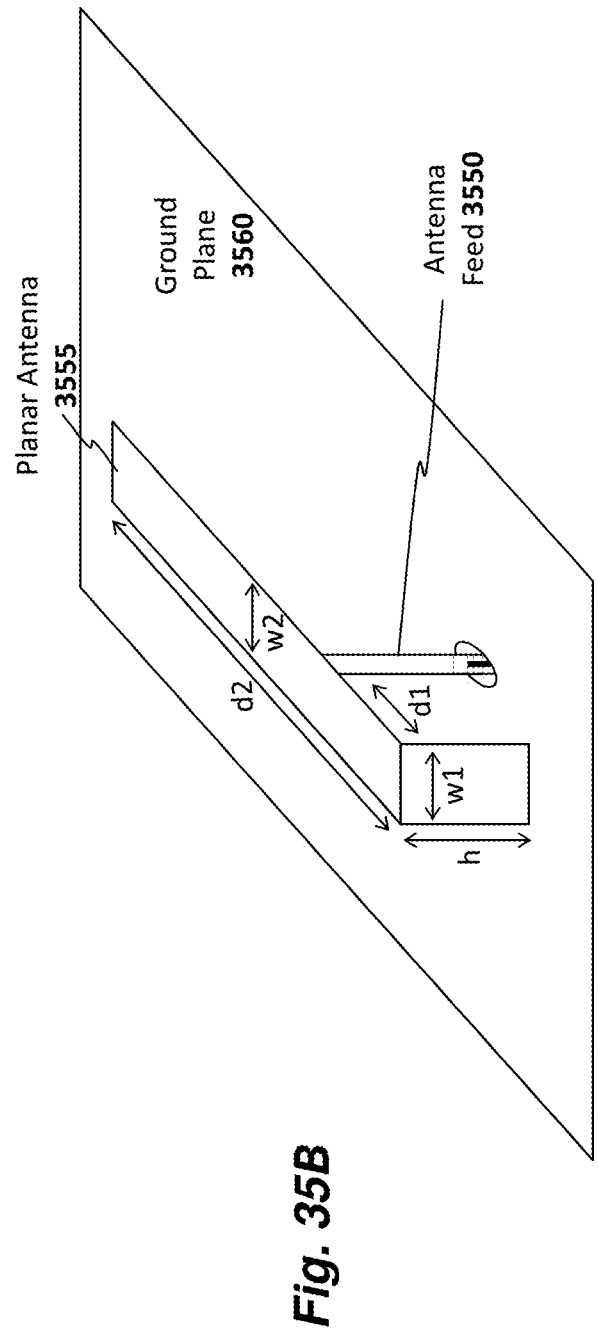

FIGS. 35A-B illustrate two types of antennas which may be integrated within an appliance. FIG. 35A illustrates an "inverted F antenna" which includes a monopole antenna 3515 running parallel to a ground plane 3520 and grounded at one end. In FIG. 35A, this intermediate point is the connection point between the antenna 3515 and antenna feed 3510. The antenna 3515 is fed from an intermediate point a distance, d, from the grounded end. A dielectric with permittivity $\varepsilon_r$ is used between the antenna 3515 and ground plane 3520. Any form of dielectric may be used (e.g., a polymer, air, glass, etc).

FIG. 35B illustrates a "planar inverted F antenna" or PIFA. In this example, a planar antenna 3555 is configured a height h above the ground plane 3560 and grounded at one end. Like the inverted F antenna, the PIFA antenna 3555 is fed from an intermediate point at a distance, d1, from the shorted/grounded end. In the illustrated example, the width w1 of the shorting post of the planar antenna (i.e., the portion coupling the end of the antenna to the ground plate 3560) is equal to the width w2 of the planar antenna 3555. Consequently, the length d2 of the planar antenna is equal to one quarter of the wavelength of the wireless signal: $d2=\lambda/4$.

Various other implementations are possible using different dimensions for $1\sqrt{\varepsilon_r}11$, w2, d1, and d2. In general, the resonant length of a PIFA antenna can be approximated as a function of it's parameters as: $d2+w2-w1=\lambda/4$. Given a dielectric with permittivity $\varepsilon_r$, this equation may be expressed as $d2+w2-w1=c/(4f*\text{squareRoot}(\varepsilon_r))$ where f is the frequency of the transmitted/received signal. Thus, in one embodiment, these variables are adjusted in accordance with the dimensions of the handle in which the antenna is integrated. Note that these design specifics are provided merely for the purpose of illustrating one particular embodiment. However, the underlying principles of the invention are not limited to these particular details. The specific design used may vary greatly when integrated within a handle.

In one embodiment, an antenna is integrated within a handle by reproducing the structures described above within a handle enclosure. For example, if the handle enclosure is made from a dielectric material such as plastic, then one or more support structures may be integrated within the internal cavity of the handle and an inverted F or PIFA antenna may be fixedly coupled the support structures. The size of the dimensions may be adjusted in accordance with the size of the handle enclosure.

Alternatively, or in addition, the conductive portion of the handle may be used to form an inverted F or PIFA antenna. This conductive portion may include any portion of the handle made from metal such as a metal support structure hidden beneath the non-conductive handle enclosure. Alternatively, as is sometimes the case with stainless steel appliances, the entire handle may be conductive. In this case, the antenna may be formed directly on or in the handle or in the connecting interface between the handle and the appliance. Some examples of these embodiments are provided below. It should be noted, however, that the underlying principles of the invention are not limited to these specific implementations.

Figure 36:
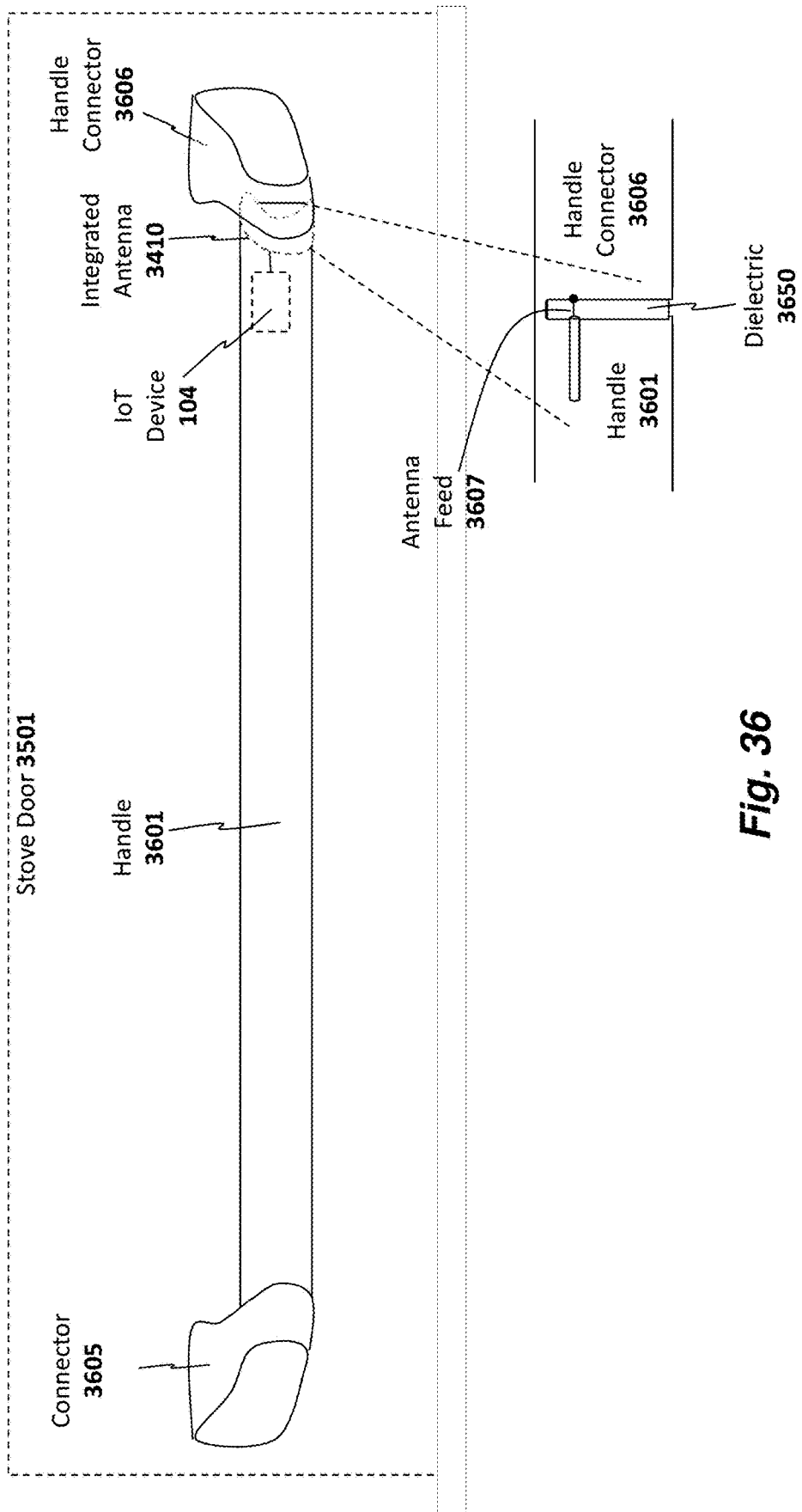
FIG. 36 illustrates an exemplary type of handle into which an IoT device and/or antenna may be integrated.

FIG. 36 illustrates one particular type of handle 3401 which is coupled to the stove door 3501 by handle connectors 3605-3606. Both the handle 3401 and handle connectors 3605-3606 may be formed from a conductive material such as stainless steel or aluminum. Alternatively, the internal structural components may be metal which is covered by a non-conductive enclosure. In either case, the antenna 3510 may be formed using the conductive interface between the handle 3601 and handle connector 3606. For example, a dielectric such as a polymer may be fixedly coupled and sandwiched between the handle 3601 and handle connector 3606 as illustrated. In one embodiment, the dielectric is air, in which case, a cavity is formed between the handle 3601 and handle connector 3606. In the particular implementation shown, the conductive portion of the handle 3601 forms the ground plate and the edge of the handle connector 3606 forms the antenna, to which the antenna feed 3607 is coupled. This arrangement may be reversed in an alternate embodiment—i.e., with the conductive portion of the handle connector 3606 forming the ground plate and the edge of the metallic portion of the handle 3601 forming the antenna.

Figure 37A:
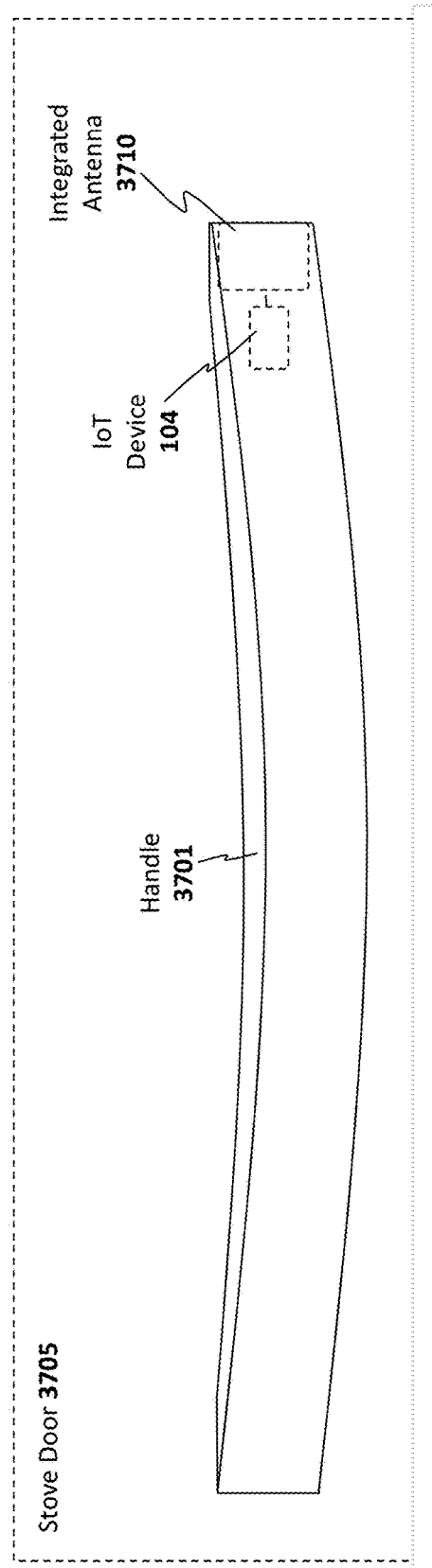
FIGS. 37A-B illustrate another exemplary type of handle into which an IoT device and/or antenna may be integrated.
Figure 37B:
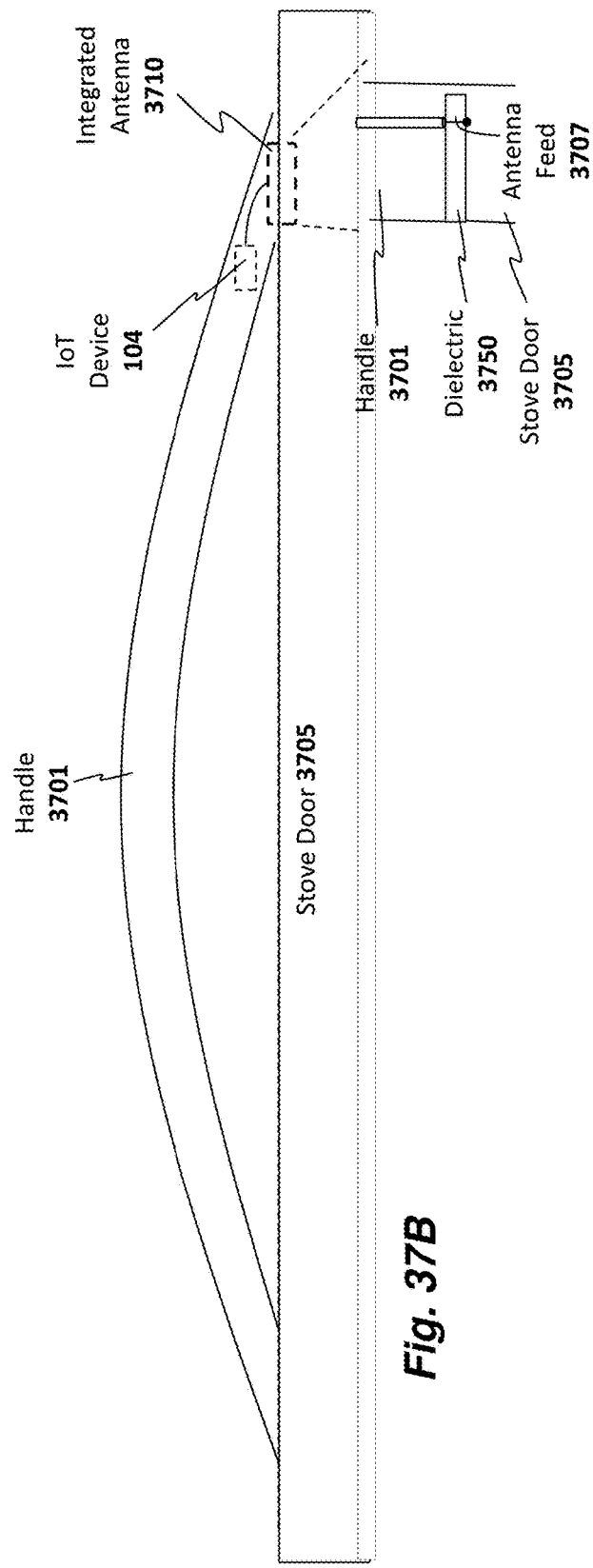

In one embodiment, the handle 3601 is connected directly to the appliance (i.e., there is no intermediate handle connector 3606). One example of this configuration is shown in FIGS. 37A-B in which the handle 3701 and stove door 3705 may be formed from stainless steel or other conductive material. The integrated antenna 3710 may be formed as illustrated, with a dielectric 3750 sandwiched between the handle 3701 and stove door 3705. A portion of the handle 3701 forms the ground plate and a portion of the stove door 3705 forms the parallel antenna. The antenna feed 3707 is coupled to the edge of the stove door as shown, positioned a specified distance from the edge of the dielectric 3750 (in accordance with the variables described above with respect to FIGS. 35A-B).

Figure 38:
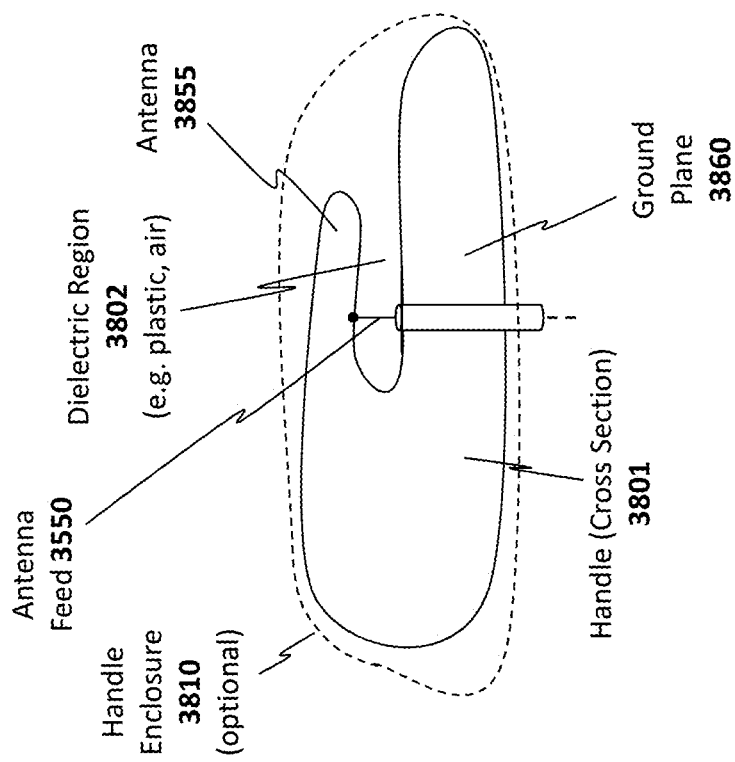
FIG. 38 illustrates an exemplary cross section of an appliance handle constructed for form a planar antenna.

As illustrated in FIG. 38, in one embodiment, the antenna may be formed fully within the handle. In particular, FIG. 38 shows a cross section of a handle 3801 comprising a conductive material. A dielectric region 3802 is formed resulting in a parallel ground plane 3860 and planar antenna 3855. As in prior embodiments, an antenna feed 3550 is electrically coupled to the planar antenna at a specified distance from the edge of the dielectric region 3802 (in accordance with the different variables described above). A dielectric handle enclosure 3810 may optionally be used for a portion or all of the handle 3801. In another embodiment, an area of dielectric material is used to cover the exposed end of the dielectric region 3802.

Figure 39:
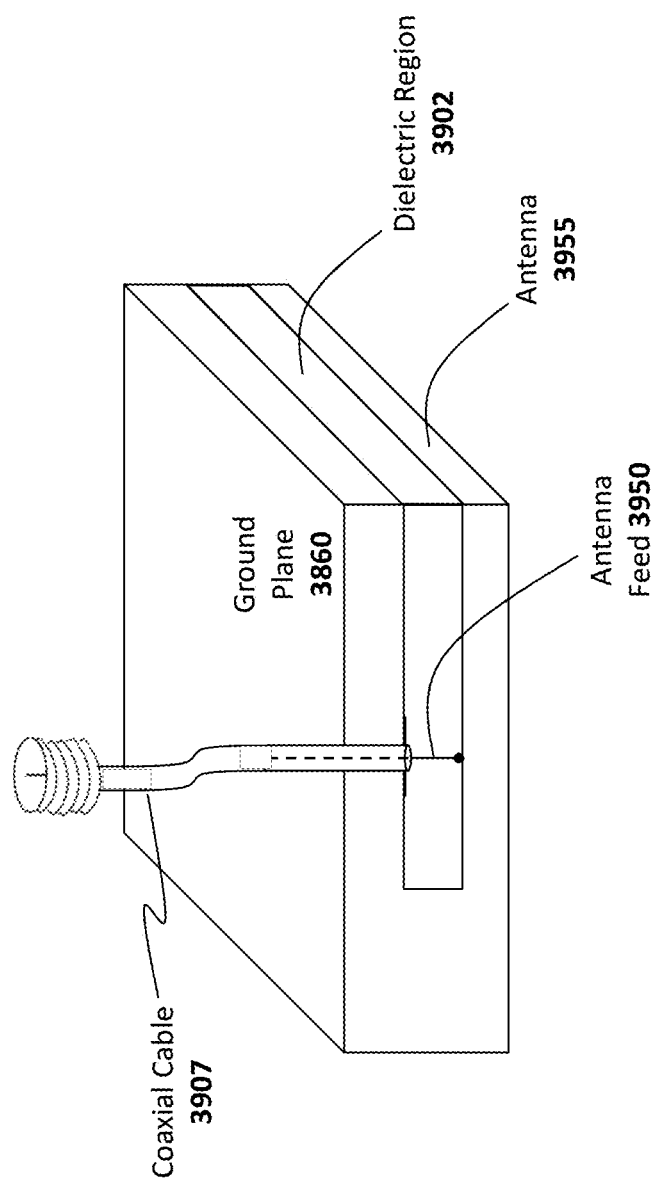
FIG. 39 illustrates an RF module in accordance with one implementation.

Thus, various arrangements are contemplated for the antenna such as exciting the slots where the handle meets the product or using PIFA designs integrated into the handle industrial design. Other implementations include feeding structures longer than the typical quarter wavelength such as a ⅝ wave antenna, which is easily tunable or launching traveling waves down embedded structures integrated into the industrial design of the handle. This solution may be useful for appliances that do not face the same temperature challenges present on an oven. Various radiating structures longer than a half wave could be implemented depending on the length and structure of the handle FIG. 39 illustrates an exemplary modular PIFA antenna which may be integrated within any form of appliance. A ground plane 3860 and antenna 3955 are formed from a conductive material (e.g., metal) with a dielectric region 3902 sandwiched in-between. The antenna feed 3950 is coupled to a coaxial cable 3907 which is coupled to the RF circuitry of an IoT device (not shown). The dimensions of the ground plane 3860 and antenna 3955 may be specified based on the size of the handle into which the PIFA antenna module is to be integrated in accordance with the equations provided above.

Figure 40:
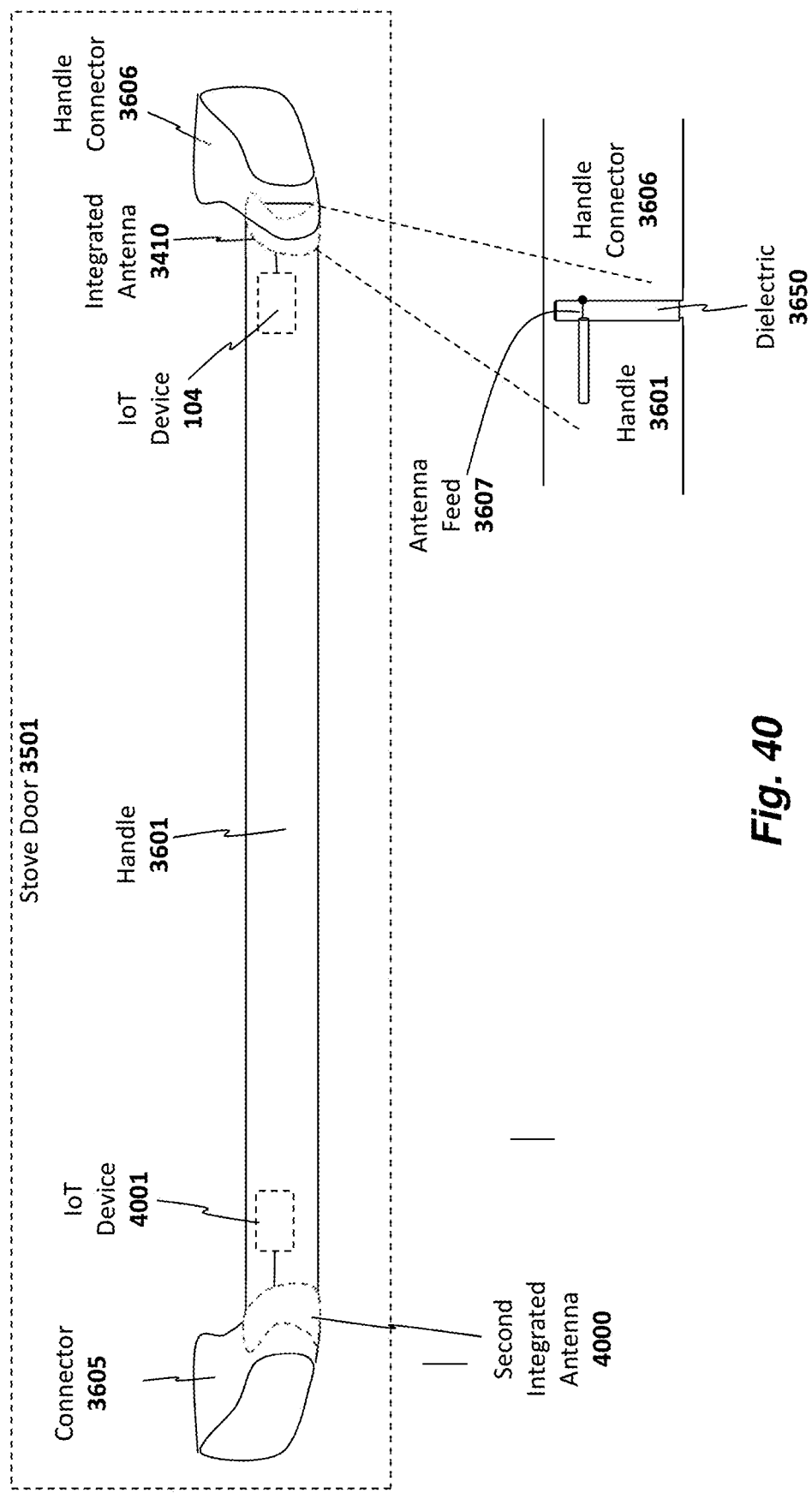
FIG. 40 illustrates one embodiment with a second integrated antenna.

In one embodiment, one or more additional integrated antennas may be included within the handle (or other portion) of the appliance for diversity. FIG. 40, for example, illustrates a second integrated antenna 4000 and IoT device 4001 positioned on the opposite end of the handle 3601 (i.e., symmetrically with respect to the first integrated antenna 3410). Similarly, FIGS. 41A-B illustrate an embodiment similar to FIGS. 37A-B but with a second antenna 4100 symmetrically arranged with respect to the first antenna 3710 and integrated within the handle 3701 for diversity.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
 a dielectric having a specified length and width defining an area;
 a ground plane comprising conductive material directly adjacent to the dielectric, the ground plane formed from one or more components of a handle or a door of a heating device;
 an antenna element comprising conductive material forming a plane adjacent to the dielectric and parallel to the ground plane, the antenna having a first dimension defining a first end and a second end, the first end electrically coupled to the ground plane; and
 an antenna feed electrically coupled to the antenna element at specified distance from the first end, the distance from the first end selected in accordance with a wavelength of a radio frequency (RF) signal to be transmitted and/or received by the antenna;
 wherein the antenna element is formed by a portion of the door to the heating device if the ground plane is formed by one or more components of the handle and wherein the antenna element is formed by a portion of the handle to the heating device if the ground plane is formed by a portion of the door.

2. The apparatus of claim 1 wherein the portion of the door is electrically coupled to the ground plane by a conductive structural element providing structural support to connect the handle.

3. The apparatus of claim 1 wherein the antenna feed comprises an internal conductor in a coaxial cable electrically coupled to a radio module of an Internet of Things (IoT) device.

4. The apparatus of claim 3 wherein the IoT device comprises at least one input port to receive signals from at least one temperature sensor to measure a temperature and a controller coupled to the radio module to digitize the temperature to generate digital temperature data.

5. The apparatus of claim 4 wherein the radio module is to transmit the digital temperature to the antenna feed, wherein the antenna element is to responsively transmit a wireless signal containing the digital temperature data.

6. The apparatus of claim 1 wherein the dielectric comprises a polymer.

7. The apparatus of claim 1 wherein the dielectric comprises a volume of air.

8. An apparatus comprising:
 a handle for a heating appliance formed to include a dielectric volume separating a first conductive planar region and a second conductive planar region, the first conductive planar region having dimensions selected in accordance with a particular radio wavelength;
a handle enclosure covering at least a part of the handle;
an antenna feed having a first end electrically coupled to the first planar region to provide digital signals to be wirelessly transmitted; and
radio circuitry coupled to a second end of the antenna feed, the radio circuitry to generate a digital signal and to be transmitted through the antenna feed to the first planar region, the first planar region to responsively generate a wireless signal having the particular wavelength;
wherein the handle enclosure covers one or more exposed ends of the dielectric volume.

9. The apparatus of claim 8 further comprising:
a dielectric enclosure to enclose at least some portions of the handle including the dielectric volume.

10. The apparatus of claim 9 wherein a first end of the first conductive planar region is electrically coupled through a conductive portion of the handle to the second conductive planar region.

11. The apparatus of claim 10 wherein the antenna feed is electrically coupled to the first planar region at a first distance from the first end of the first conductive planar region.

12. The apparatus of claim 11 wherein the first distance is selected in accordance with the particular wavelength.

13. The apparatus of claim 12 wherein the first distance is selected further in accordance with a permittivity value associated with the dielectric.

14. The apparatus of claim 8 wherein the dielectric volume comprises a polymer.

15. The apparatus of claim 14 wherein the dielectric volume comprises air.

16. The apparatus of claim 8 wherein the antenna feed comprises an internal conductor in a coaxial cable electrically coupled to a radio module of an Internet of Things (IoT) device.

17. The apparatus of claim 16 wherein the IoT device comprises at least one input port to receive signals from at least one temperature sensor to measure a temperature and a controller coupled to the radio module to digitize the temperature to generate digital temperature data.

18. The apparatus of claim 17 wherein the radio module is to transmit the digital temperature to the antenna feed, wherein the first planar region is to responsively transmit a wireless signal containing the digital temperature data.

19. An apparatus comprising:
a handle for a heating appliance;
a mechanical connector to connect the handle to the heating appliance; and
a planar inverted F antenna (PIFA) integrated within the handle and the mechanical connector, the PIFA comprising:
an antenna plane having a first end and a second end, the antenna comprising part of the handle;
a ground plane electrically coupled to the first end of the antenna plane, the ground plane comprising part of the mechanical connector;
a dielectric separating planar regions of the antenna plane and the ground plane; and
an antenna feed coupled to the antenna plane at a specified distance from the first end,
wherein the antenna plane includes a length and width selected in accordance with a wavelength of a signal to be transmitted and/or received by the antenna plane.

20. The apparatus of claim 19 wherein the specified distance is selected in accordance with a desired impedance.

21. The apparatus of claim 20 wherein the specified distance is selected further in accordance with the length and width of the antenna plane.

22. The apparatus of claim 21 wherein the length and width of the antenna plane are selected in accordance with both a desired wavelength of a transmitted/received wireless signal and a permittivity value associated with the dielectric.

23. The apparatus of claim 22 wherein the dielectric comprises a polymer.

24. The apparatus of claim 22 wherein the dielectric comprises air.

25. The apparatus of claim 19 wherein the antenna feed comprises an internal conductor in a coaxial cable electrically coupled to a radio module of an Internet of Things (IoT) device.

26. The apparatus of claim 25 wherein the IoT device comprises at least one input port to receive signals from at least one temperature sensor to measure a temperature and a controller coupled to the radio module to digitize the temperature to generate digital temperature data.

27. The apparatus of claim 26 wherein the radio module is to transmit the digital temperature to the antenna feed, wherein the first planar region is to responsively transmit a wireless signal containing the digital temperature data.

* * * * *